US005903822A

United States Patent [19]

Sekine et al.

[11] Patent Number: 5,903,822

[45] **Date of Patent: *May 11, 1999**

[54] PORTABLE RADIO AND TELEPHONES HAVING NOTCHES THEREIN

[75] Inventors: Syuichi Sekine, Chiba-ken; Tadahiko Maeda, Kanagawa-ken, both of Japan

[73] Assignee: Kabushiki Kaisha Toshiba, Kawasaki, Japan

[ * ] Notice: This patent is subject to a terminal disclaimer.

[21] Appl. No.: 08/593,131

[22] Filed: Feb. 1, 1996

Related U.S. Application Data

[63] Continuation of application No. 07/996,168, Dec. 23, 1992, Pat. No. 5,517,676.

[30] Foreign Application Priority Data

| | | | |
|---|---|---|---|
| Dec. 26, 1991 | [JP] | Japan | 3-343794 |
| Mar. 27, 1992 | [JP] | Japan | 4-100139 |

[51] Int. Cl.[6] ................................ H04B 1/38; H01Q 1/24

[52] U.S. Cl. ................................ 455/89; 343/702

[58] Field of Search ................................ 455/89, 90, 128, 455/129, 269, 280, 281, 282, 300, 347, 351; 343/702, 767; 379/58, 59

[56] References Cited

U.S. PATENT DOCUMENTS

| | | | |
|---|---|---|---|
| 4,491,843 | 1/1985 | Boubouleix | 455/269 |
| 4,805,232 | 2/1989 | Ma | 455/280 |
| 5,151,946 | 9/1992 | Martensson | 379/59 |
| 5,517,676 | 5/1996 | Sekine et al. | 455/89 |

FOREIGN PATENT DOCUMENTS

| | | | |
|---|---|---|---|
| 3836406 | 5/1990 | Germany | 455/58 |
| 0175826 | 7/1991 | Japan | 455/58 |
| 3-285425 | 12/1991 | Japan | 455/89 |

*Primary Examiner*—Reinhard J. Eisenzopf
*Assistant Examiner*—Thanh Le
*Attorney, Agent, or Firm*—Oblon, Spivak, McClelland, Maier & Neustadt, P.C.

[57] ABSTRACT

A portable radio and telephone equipment for transmitting and receiving an electric wave. The portable radio and telephone equipment includes: an antenna for transmitting and receiving an electromagnetic wave; a housing connected to the antenna, having a notch therein; and an internal circuit, connected to the antenna by way of the housing, for generating and receiving the electromagnetic wave. The portable radio and telephone equipment includes: an antenna for transmitting and receiving an electromagnetic wave; an upper portion of a housing connected to the antenna; and a lower portion of a housing connected to the upper portion of the housing via a conductor wire, so that the housing is divided into two portions in order to vary distribution pattern of the electromagnetic wave.

5 Claims, 54 Drawing Sheets a=3/16λ a=1/5 λ

ℓ= λ/16 (0.0625 λ)

ℓ=5/48 λ (0.104 λ)

ℓ=3/16 λ (0.188 λ)

ℓ = λ/4 (0.25 λ)

ℓ=5/16 λ (0.313 λ)

( a )

( b )

( c )

PORTABLE RADIO AND TELEPHONES HAVING NOTCHES THEREIN

This is a Continuation of application Ser. No. 07/996,168 filed on Dec. 23, 1992, U.S. Pat. No. 5,517,676.

BACKGROUND OF THE INVENTION

1. Field of the Invention

The present invention relates to portable equipment such as a portable radio or telephone for transmitting and receiving information using electromagnetic wave.

2. Description of the Prior Art

In conventional portable radios, an external electromagnetic wave influence causes an internal system such as a transmitting unit and a receiving unit to malfunction and to deteriorate a transmitting performance. Therefore, in order to avoid such a problem, there is provided an electric shield of a metallic nature in a conducting body of the portable radio equipment so as to cut off the external electromagnetic wave influence.

However, it is confirmed by the inventors of the present invention that a high-frequency current flowing through the electric shield causes an adverse effect on a radiation pattern which is radiated from an antenna of the portable radio. It is presumed that a vertically polarized wave among the electromagnetic wave is relatively large and thus it is likely to be favorable that a gain of the vertically polarized wave in the vertical direction is large.

An example of the conventional portable radio equipment where the electric shield is provided is shown in FIG. 1. In the same figure, the reference numeral 102 shows a housing serving as the electric shield, and the reference numeral 103 shows an antenna. A simulation for the radiation characteristics of the electromagnetic wave in the radio-frequency of an L band is carried out using a model of the portable radio shown in FIG. 1. With reference to FIG. 1, dimensions for the housing 102 are that a width thereof is 0.4λ, a depth 0.15λ and a height 0.5λ, where λ indicates a wavelength. The simulation is carried out using a small-sized model which is equipped with a λ/4-monopole antenna and whose antenna can interface with a feeder without a matching circuit. A result of the simulation is shown in FIG. 2.

FIG. 2 shows the calculated result of the radiation pattern of the vertically polarized wave around the antenna being placed In the center with respect to (A) x-z plane, (B) x-y plane and (C) y-z plane. As shown in FIG. 1, an x coordinate is placed in a width direction, a y coordinate is in a depth direction and a z coordinate is in a parallel direction to an axis of the λ/4-monopole antenna. The electromagnetic simulator for arbitrary models is made on a super-computer employing a spatial network method. An electromagnetic field in the vicinity of the model was calculated by applying the simulator to an ordinary portable telephone model for the L band. A parameter for three dimensional lattice network is 80×70×90 (Δd), where a unit length of the lattice, Δd, is λ/40. A far-field radiation pattern is calculated from the electromagnetic field on a surface of a closed-area over the model.

Referring to a result of the simulation pattern, the radiation pattern for the x-y plane (B) which shows a pattern for a cross section vertical to the antenna is omnidirectional (radiate the same in all directions). On the other hand, in the radiation pattern with respect to the y-z plane (C), a maximum radiation direction is indicated at approximately 50 degrees tilted from a y axis against a z axis and in a negative z-axis direction. As a result of normalization by a maximum radiation gain (a normalized pattern is a dimesionless number with a maximum value of unity), the radiation pattern with respect to the y-z plane (C) indicates a characteristic of deterioration by approximately 5 dB from the maximum radiation gain, compared to the maximum radiation gain on the x-z plane.

FIG. 3 shows respective radiation patterns which are theoretically optimum, corresponding to FIG. 2.

However, in a λ/2-dipole antenna, the maximum radiation direction shall theoretically lie in 90 degrees from an antenna axis in the plane including the antenna axis. Therefore, the fact that the maximum radiation direction is deflected as observed in the radiation pattern of the y-z pattern (C) as the above simulation result demonstrates that the radiation pattern of the antenna itself is affected and disturbed by the radio-frequency current flowing through the electrically shielded housing 102.

Since a large radio-frequency current may flow through the housing due to current distribution of the antenna itself, the radiation pattern is much affected in the λ/4-monopole antenna. When the height of housing is converted to a corresponding electrical length and the converted electrical length is approximately equal to the electromagnetic wavelength, a current whose phase is opposite to the radio-frequency current flows on the antenna. As a result, the radiation pattern in the horizontal direction in the portable radio is cancelled out against each other, thus causing to deteriorate the radiation gain in the horizontal direction. In this connection, when the portable radio is designed, without considering an effect of the housing, by calculating the radiation pattern with respect to the antenna alone, a desired electromagnetic radiation pattern can not be obtained because of the influence of the housing even if the portable radio is designed such that the maximum radiation shall be obtained in 90 degrees against the antenna axis.

FIG. 4 shows a model of a portable radio equipment employing an inverted F antenna. In the same figure, the reference numeral 103 designates an antenna, the reference numeral 106 is a short-circuit wire, and the reference numeral 106 designates a feeder for a signal. FIG. 5 shows a calculated result of a radiation gain pattern for the model. In this case, too, a maximum radiation direction in a radiation pattern of a (C) y-z plane is deflected from the horizontal direction (y-axis direction), thus indicating that the radio-frequency current flowing through the housing affects to deteriorate the radiation pattern.

As described above, though the electric shield is provided to cut off the influence by the external electromagnetic wave, conventionally there exists a problem where the radiation characteristic of antenna alone is disturbed by the radio-frequency current flowing through the housing and thus the desirable radiation characteristic for the portable radio can not be obtained.

SUMMARY OF THE INVENTION

It is therefore an object of the present invention to provide a portable radio equipment capable of reducing affect caused by radio-frequency currents flowing through shielding means such as a housing and thus capable of improving a radiation pattern thereof.

To achieve the object, there is provided a portable radio equipment comprising: an antenna for transmitting and receiving an electromagnetic wave; a housing connected to the antenna, having a notch therein; and an internal circuit, connected to the antenna by way of the housing, for generating and receiving the electromagnetic wave. The portable radio and telephone equipment may also comprise: an antenna for transmitting and receiving an electromagnetic wave; an upper portion of a housing connected to the antenna; and a lower portion of a housing connected to the upper portion of the housing via a conductor wire, so that the housing is divided into two portions in order to vary distribution pattern of the electromagnetic wave.

Other features and advantages of the present invention will become apparent from the following description taken in conjunction with the accompanying drawings.

BRIEF DESCRIPTION OF THE DRAWINGS

FIG. 42 shows a portable radio equipment which is characterized in that a part of the circumference of the housing 102 is enclosed by a ferromagnetic material 111 such as a ferrite ring or the like.

FIG. 49 shows a typical portable radio equipment in practical use equipped with a display 320, a speaker 314, a microphone 313, a numeric key pad 320 and so on.

FIG. 55B shows the portable radio equipment where the external body is wrapped with a paper board with copper foil on;

FIG. 56 shows results of the radiation pattern for the portable radios shown in FIG. 55.

FIG. 58 shows a portable radio equipment having a meandering shape viewed from a side thereof.

DETAILED DESCRIPTION OF THE PREFERRED EMBODIMENTS

Features of the present invention will become apparent in the course of the following description of exemplary embodiments which are given for illustration of the invention and are not intended to be limiting thereof. Embodiments of the present invention will now be described with reference to the drawings.

Embodiment No. 1

Figure 6:
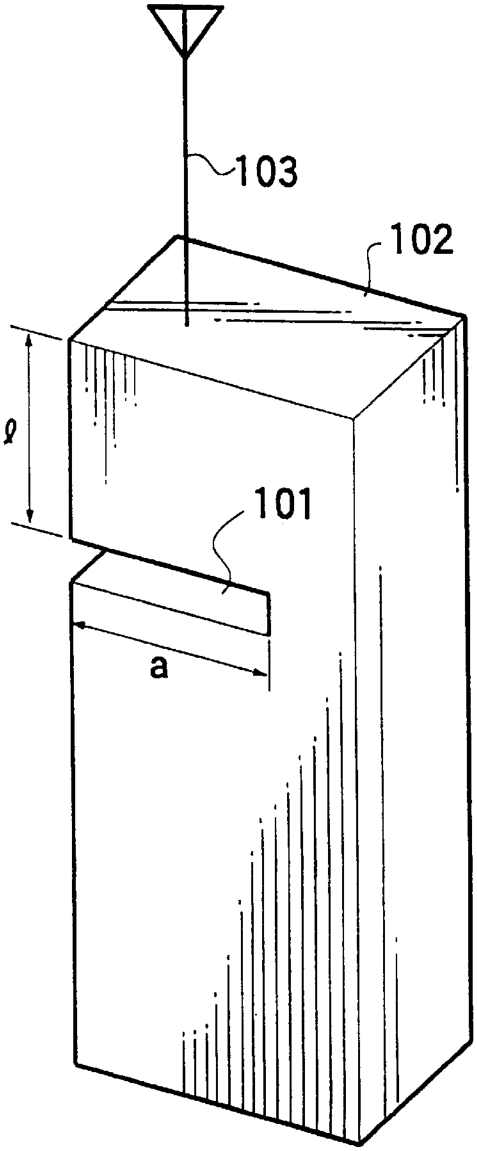
FIG. 6 shows a portable radio equipment according to the first embodiment for the present invention.
Figure 5A:
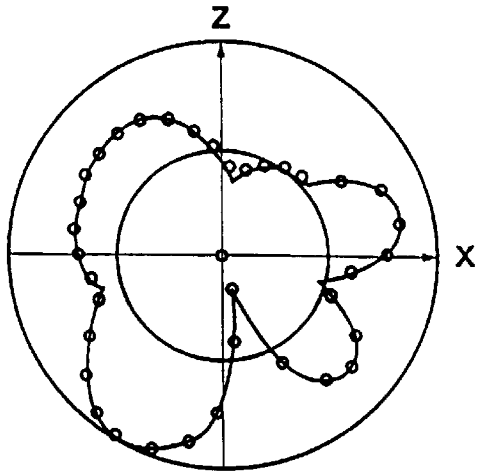
FIG.5A PRIOR ART
FIG. 5 shows a calculated result of a radiation gain pattern for the model shown in FIG. 4.
Figure 5B:
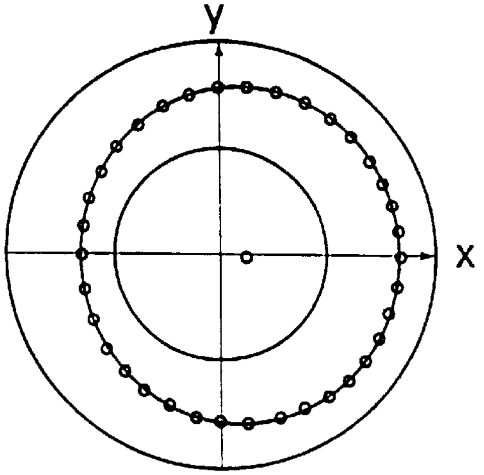
FIG.5B PRIOR ART
Figure 5C:
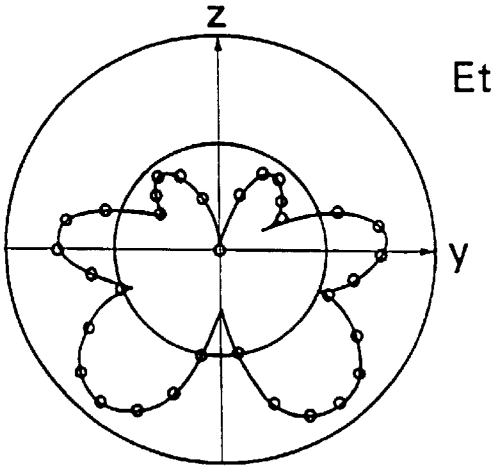
FIG.5C PRIOR ART

FIG. 6 shows a portable radio equipment according to the first embodiment for the present invention. In the same figure, a transmitting unit and a receiving unit are not shown. With reference to FIG. 6, the reference numeral 102 designates a housing serving as an electric shield and the reference numeral 103 is an antenna. The reference numeral 101 indicates a notch provided in the housing 102.

Figure 7:
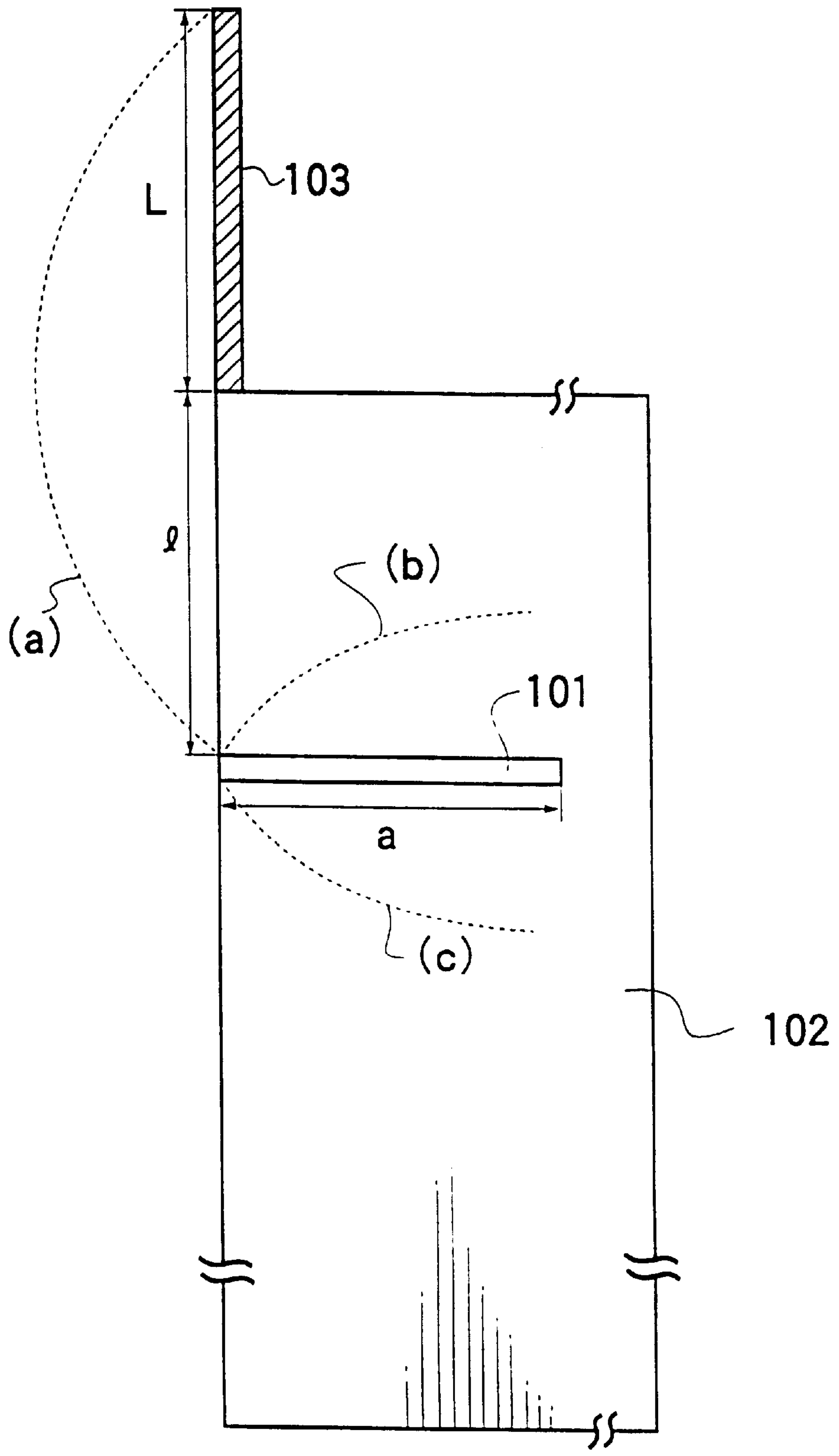
FIG. 7 shows a current distribution on the portable radio, indicated with broken lines, where there is provided the notch in the housing shown in FIG. 6.

FIG. 7 shows a current distribution on the portable radio, indicated with broken lines, where there is provided the notch in the housing 102. Suppose that the antenna 103 is a 1/4-wavelength monopole antenna (1/4 wavelength will be referred to as 1/4 λ hereinafter). The notch 101 is provided in the vicinity of 1/4 λ away from a feeding point of the antenna 103 (indicated with 1 in FIG. 7), and the notch is approximately 1/4 λ long.

Thus, a length from the top end of the antenna 103 to a left end of the notch 101 is approximately 1/2 λ in terms of measurement in electrical length. Therefore, a current distribution is one which is indicated with broken lines (a).

Since the length of the notch 101 is approximately 1/4 λ, the current distribution around the notch 101 shall be as indicated with broken lines (b) and (c). It is to be noted that since the respective current distributions (b) and (c) exhibit the same amplitudes with opposite phase to each other, electromagnetic waves radiated from those currents are cancelled out. In other words, since there disappears a portable radio's contribution to electromagnetic wave radiation due to the notch 101, a radio-frequency current flowing through the housing attributive to the radiation can be reduced and a desired radiation pattern can be obtained by simply providing a notch in the housing.

There will be shown a simulation result of a radiation pattern in the portable radio in which there is provided the notch 101 in the housing 102.

Figure 8:
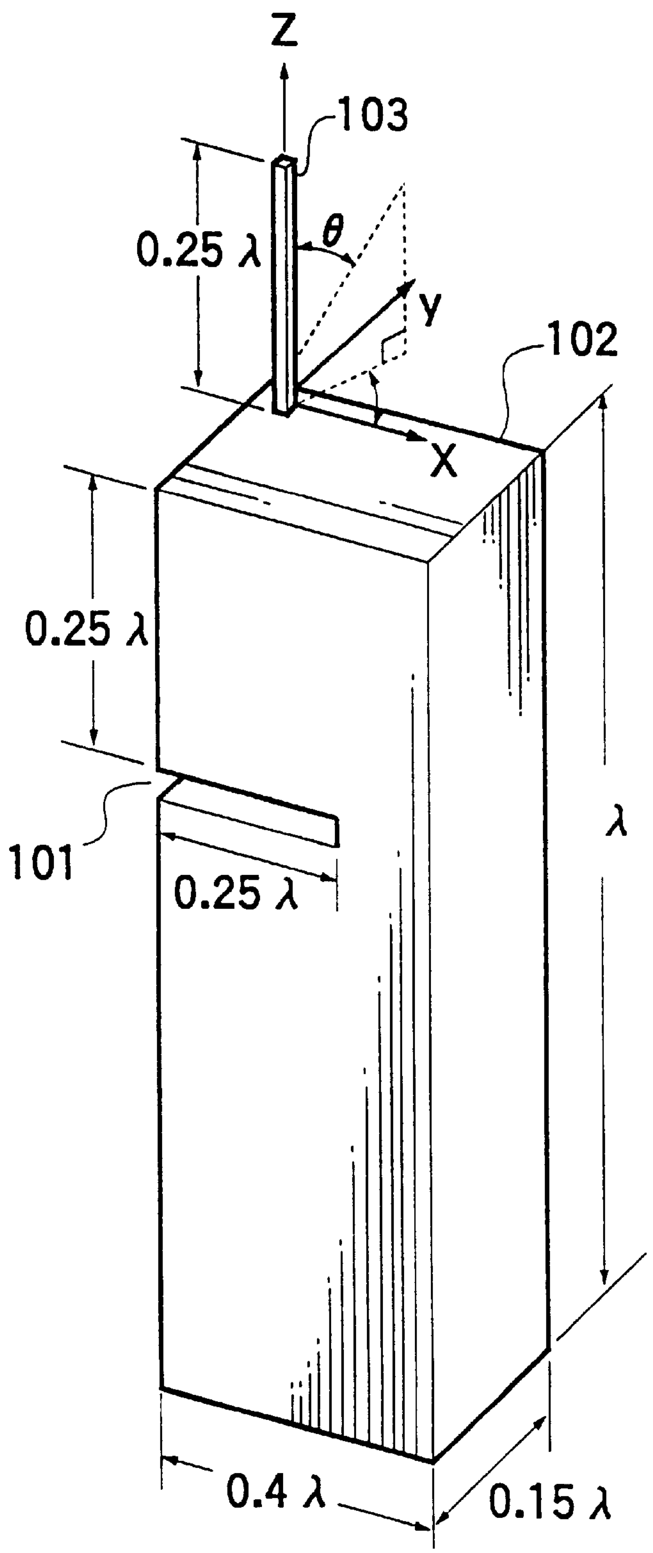
FIG. 8 shows a model of the portable radio where there is provided the notch in the housing, in order to perform a simulation.

FIG. 8 shows a model of the portable radio where there is provided the notch 101 on the housing 102, in order to perform the simulation. In this model, a length from the feeding point of the antenna 103 to the notch 101 is 1/4 λ and the notch 101 is 1/4 λ long.

Figure 1:
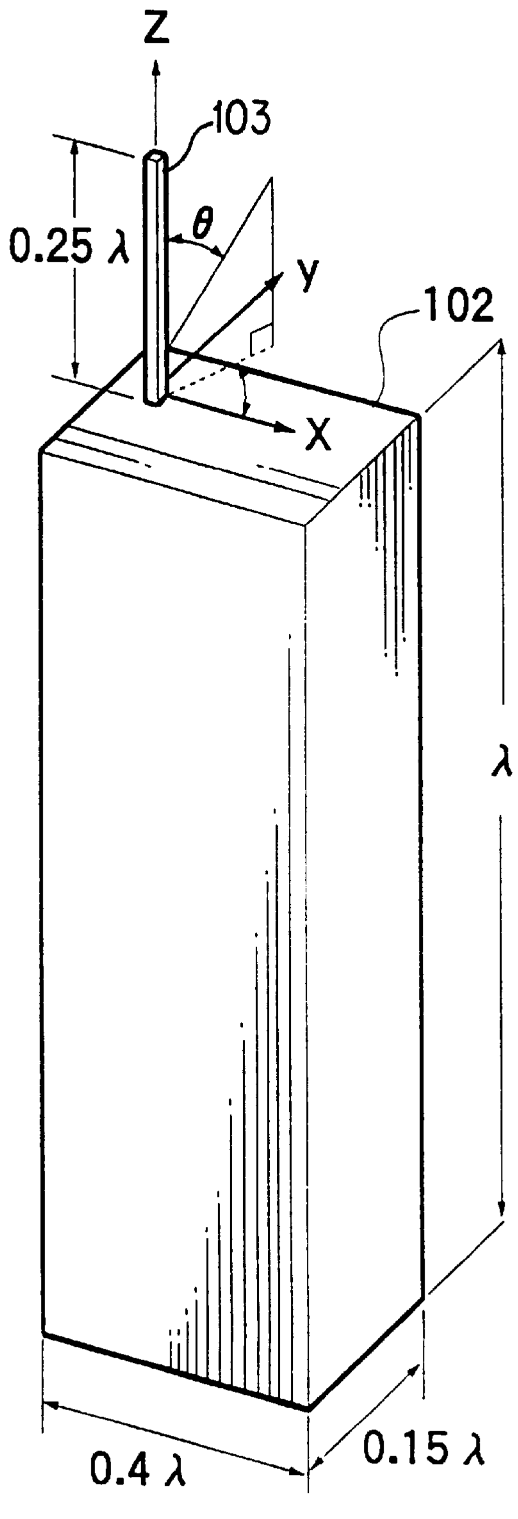
FIG.1 PRIOR ART
FIG. 1 shows an example of the conventional portable radio equipment.
Figure 2A:
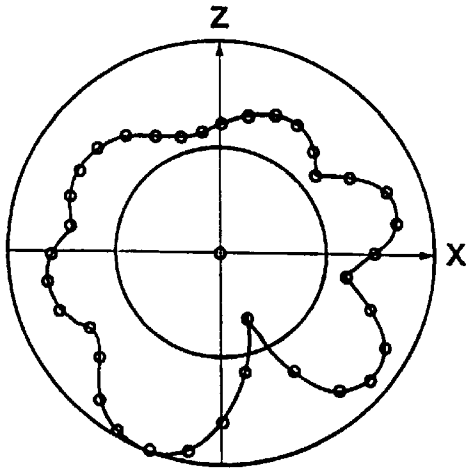
FIG.2A PRIOR ART
FIG. 2 shows calculated results of the radiation pattern of the vertically polarized wave around the antenna being placed in the center with respect to x-z plane (FIG. 2A), x-y plane (FIG. 2B) and y-z plane (FIG. 2C) in the conventional practice.
Figure 2B:
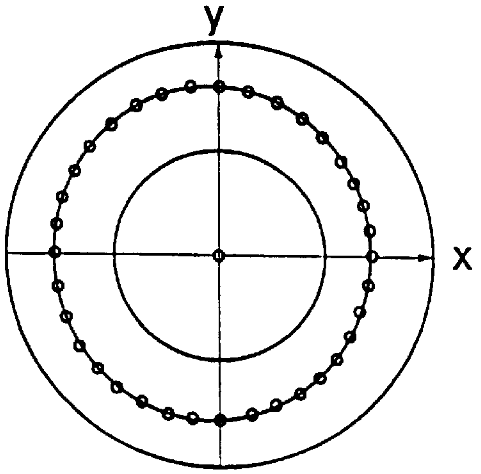
FIG.2B PRIOR ART
Figure 2C:
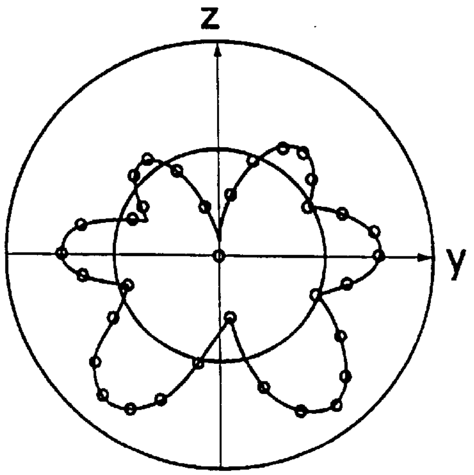
FIG.2C PRIOR ART
Figure 3A:
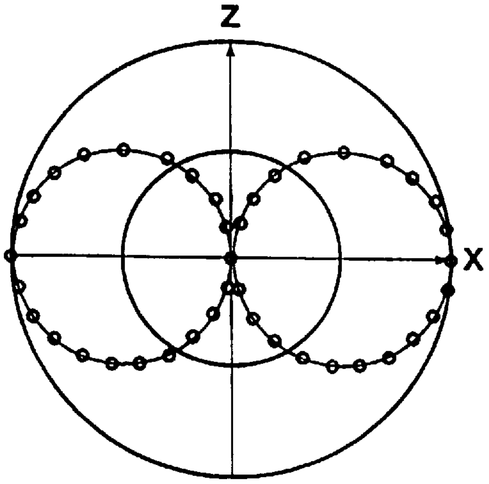
FIG. 3 shows respective radiation patterns which are theoretically optimum, corresponding to FIG. 2.
Figure 3B:
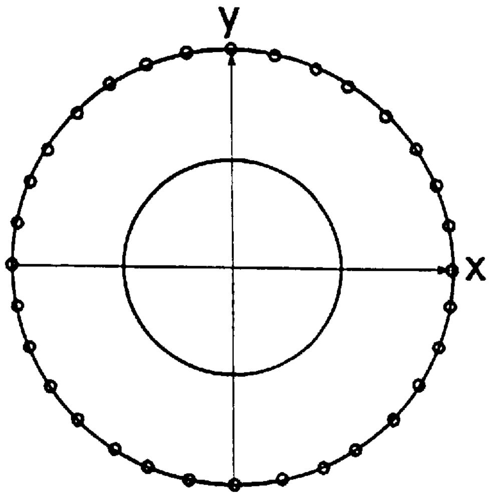
Figure 3C:
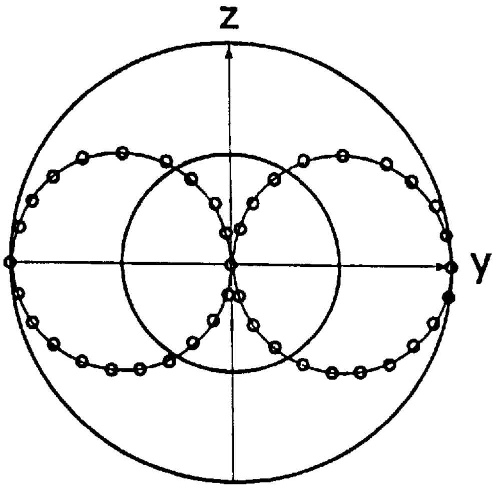
Figure 4:
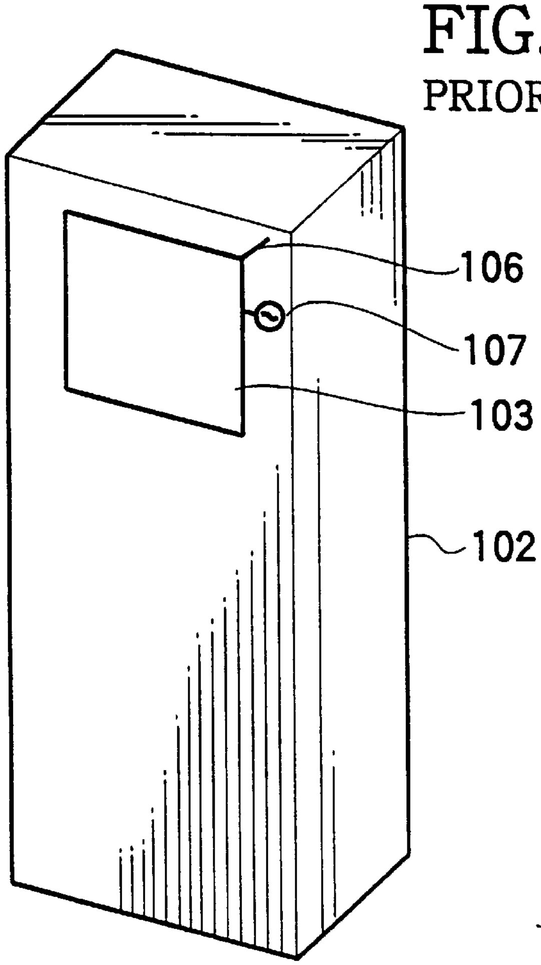
FIG.4 PRIOR ART
FIG. 4 shows a model of a conventional portable radio employing an inverted F antenna.
Figure 9A:
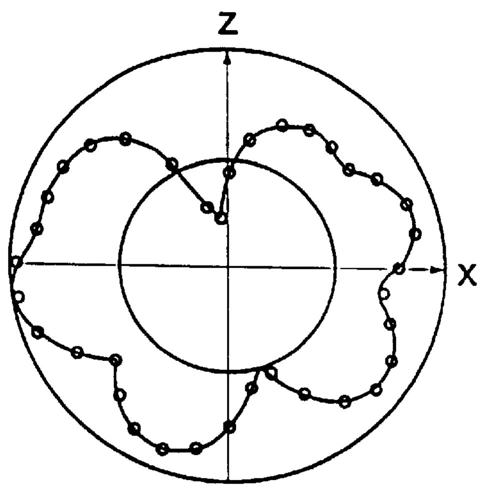
FIG. 9 shows the radiation pattern obtained from the above model shown in FIG. 8.
Figure 9B:
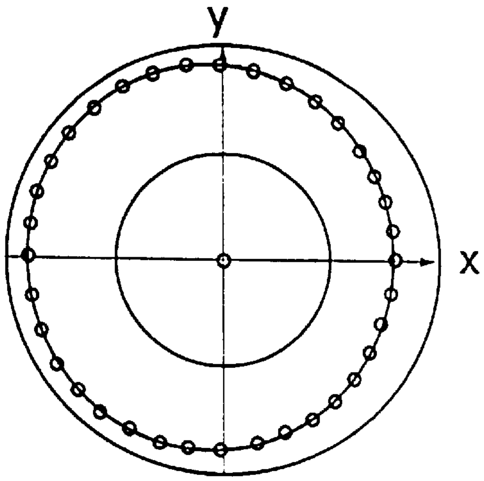
Figure 9C:
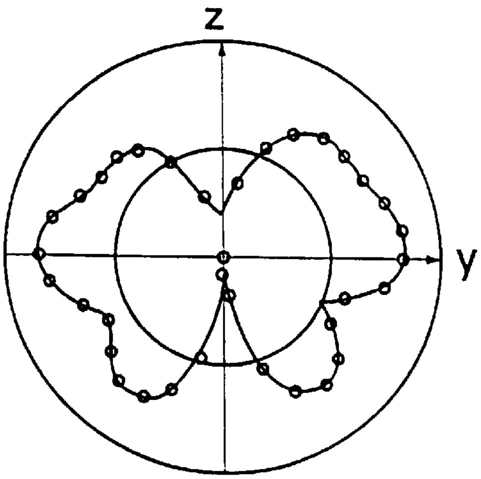

FIG. 9 shows the radiation pattern obtained from the above model shown in FIG. 8. In the same figure, a coordinate system is same as in FIG. 2 and FIG. 3, and the antenna 103 is placed vertical to an x-y plane. Thus, there is shown an omnidirectional (circular) characteristic in the x-y plane. In the x-z or y-z plane including an axis of the antenna, the expected maximum radiation directions lies in an x axis of the x-z plane and in a y axis of the y-z plane. Accordingly, compared to the radiation patterns for the conventional portable radios shown in FIG. 2, the radiation patterns for the portable radio equipment according to the present invention are improved since the affect by the radio-frequency current flowing through the housing is reduced.

Figure 10:
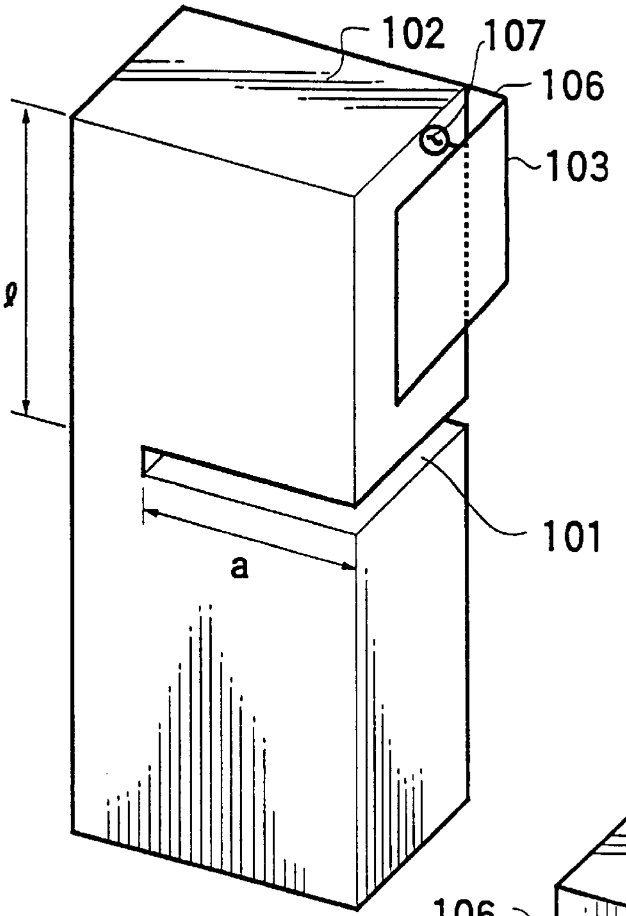
FIG. 10 shows a portable radio using an inverted F antenna, the portable radio having a notch therein.
Figure 11:
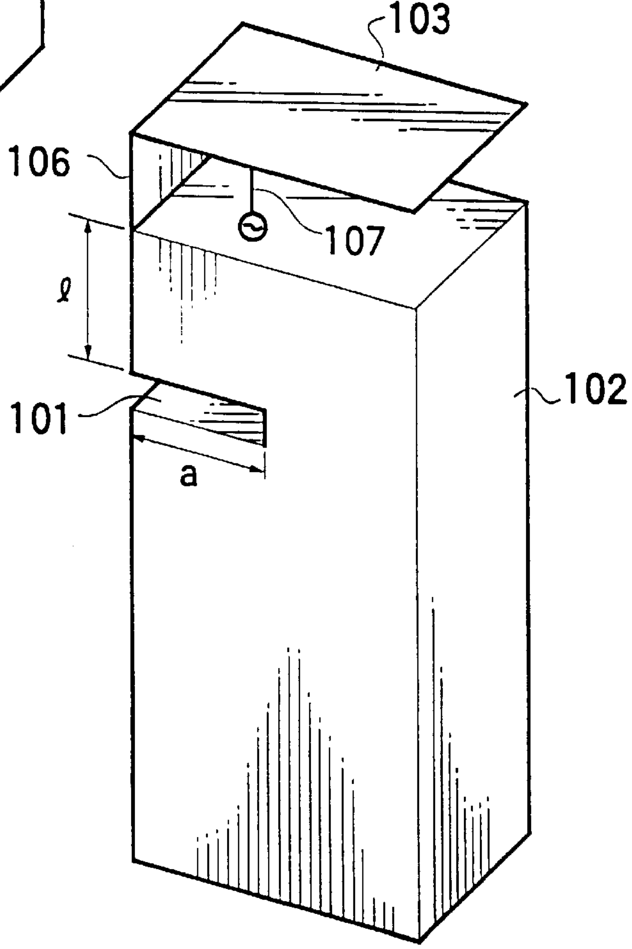
FIG. 11 shows a portable radio using a miniature antenna 103 placed over the top surface of the portable radio.
Figure 12:
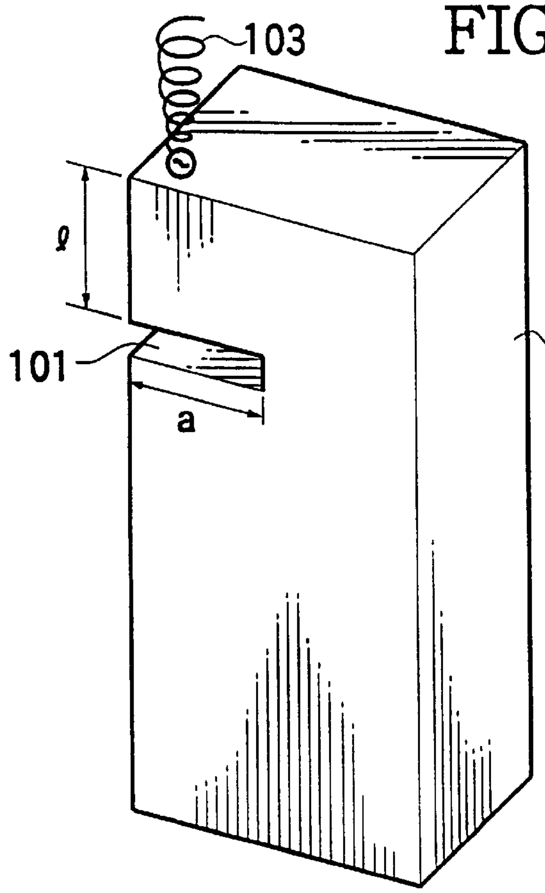
FIG. 12 shows a portable radio using a helical antenna.

In FIG. 10, FIG. 11 and FIG. 12, examples which use other antennas than the 1/4 λ monopole antenna are shown.

FIG. 10 shows a portable radio using an inverted F antenna. In the same figure, The housing 102 is connected to the inverted F antenna 103 via a short-circuit wire 106 and the feeder 107. There is provided a notch 101 of length a, the notch is away from a feeder by length l (approximately 1/4 λ). FIG. 11 shows a portable radio using a miniature antenna 103 placed over the top surface of the portable radio. FIG. 12 shows a portable radio using a helical antenna 103. In both FIG. 11 and FIG. 12, there are provided notches with length a and positioned at l so that the distribution of the radio-frequency current flowing through the housing 102 varies to reduce its influence to the radiation pattern.

Figure 13:
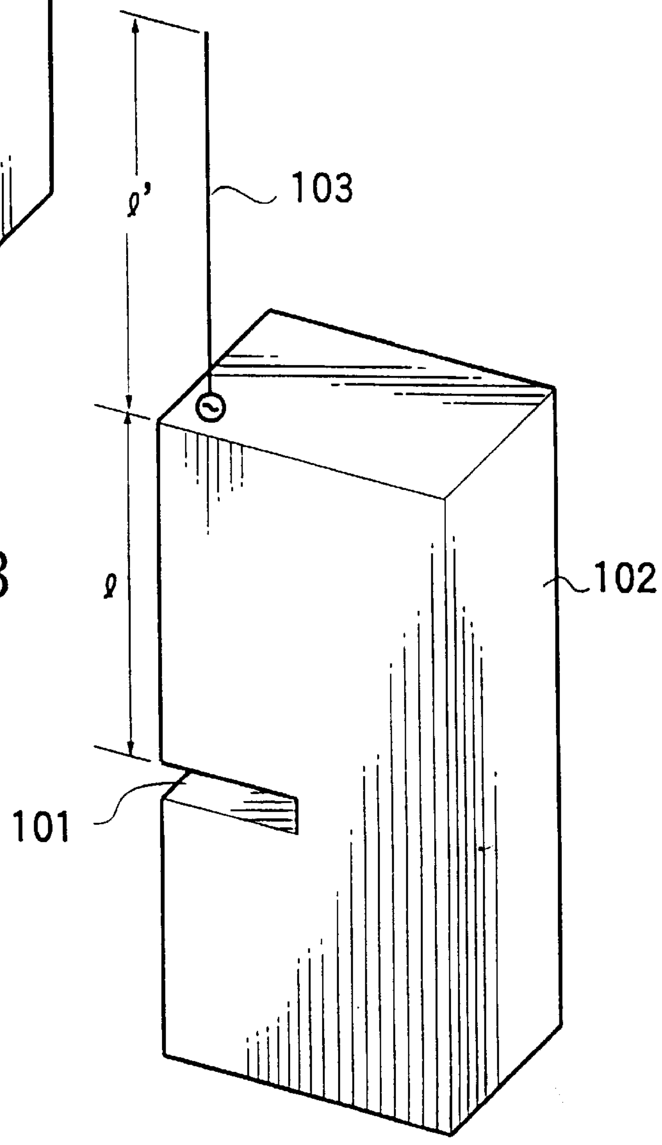
FIG. 13 shows another example of the portable radio where a range of antenna length l' varies from approximately 3/5 λ to 3/10 λ and the notch 101 is provided at a distance l from the feed point to the notch.

FIG. 13 shows another example of the portable radio where a range of antenna length l' varies from approximately 3/5 λ to 3/10 λ and the notch 101 is provided at a distance l from the feed point to the notch so that the distribution of the radio-frequency current flowing through the housing 102 is changed. Thereby, the radiation characteristics of the portable radio can be improved and a gain of the antenna can be increased.

Figure 14:
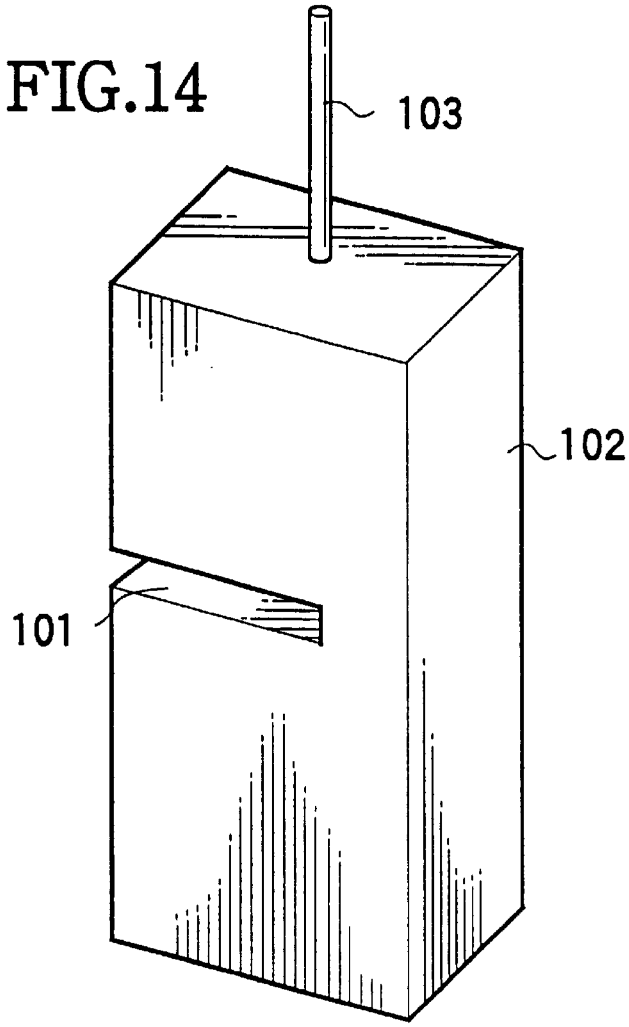
FIG. 14 shows still another example of the portable radio where the antenna is provided in a center of a top of the housing.

In a portable radio as shown in FIG. 14 where the antenna 103 is provided in a center of a top of the housing 102, there can be obtained the same effect where the high-frequency current distribution is changed to improve the radiation characteristics.

Next, FIGS. 15 through 18 show the radiation patterns in relation to the length a of notch for a being 3/16 λ, 1/5 λ, 1/4 λ and 1/3 λ, respectively.

Figure 15A:
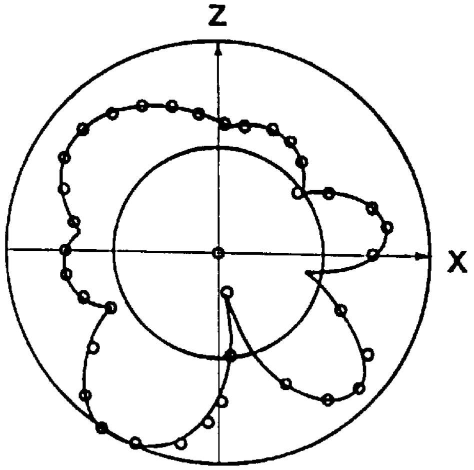
FIGS. 15 through 18 show the radiation patterns in relation to the length a of notch for a being 3/16 λ, 1/5 λ, 1/4 λ and 1/3 λ, respectively.
Figure 15B:
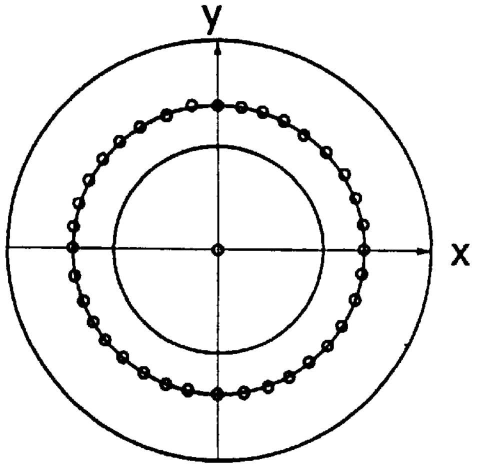
Figure 15C:
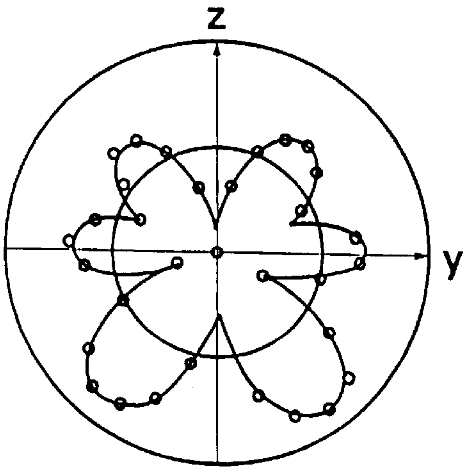
Figure 16A:
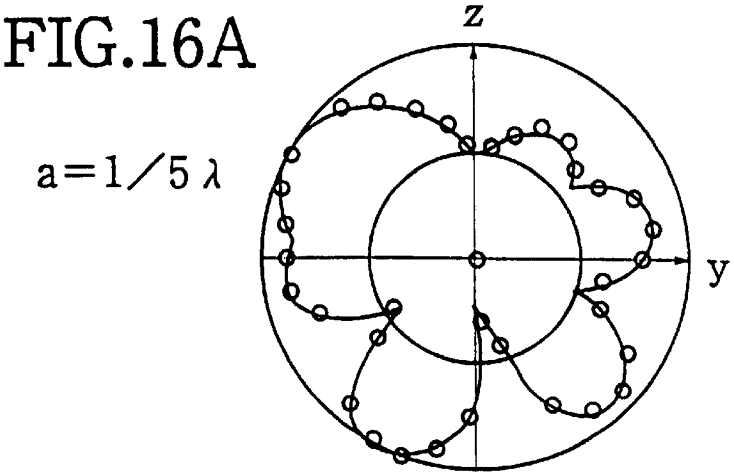
Figure 16B:
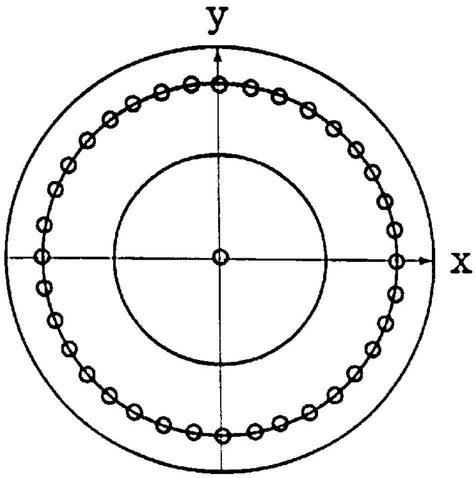
Figure 16C:
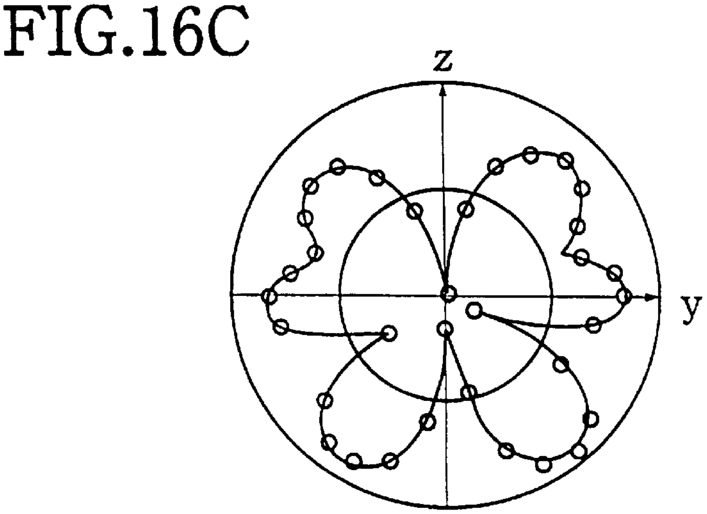
Figure 17A:
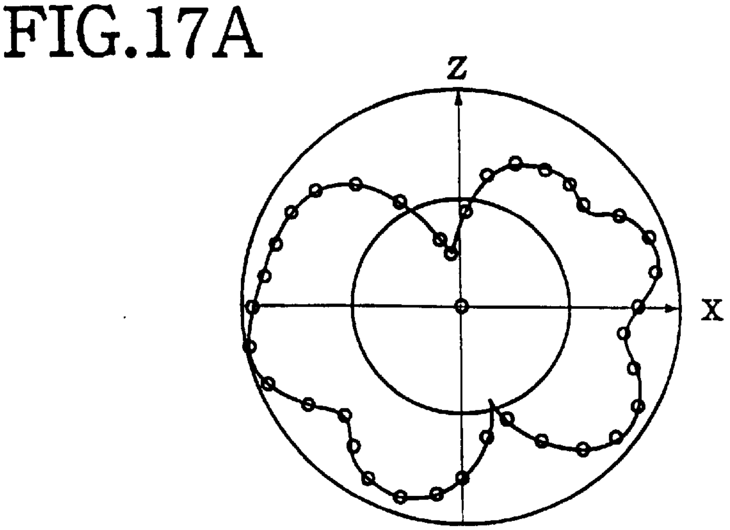
Figure 17B:
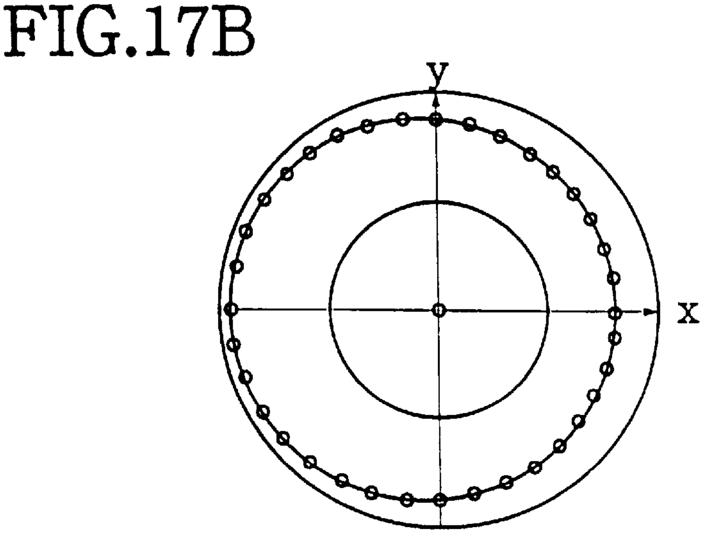
Figure 17C:
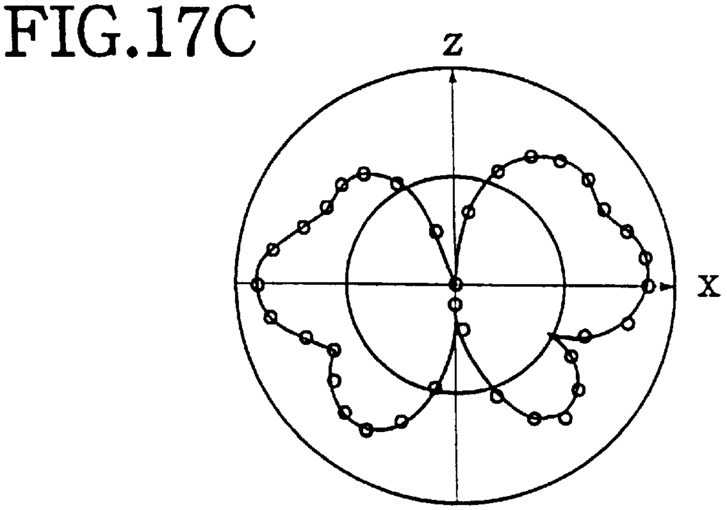
Figure 18A:
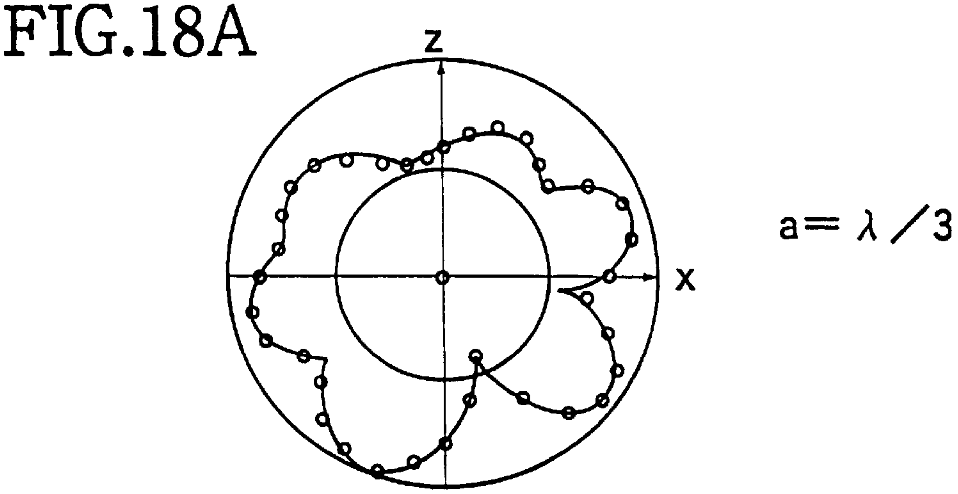
Figure 18B:
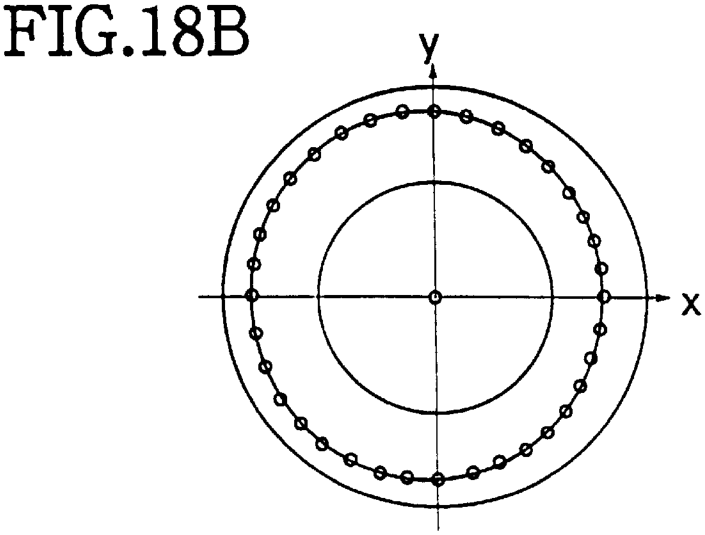
Figure 18C:
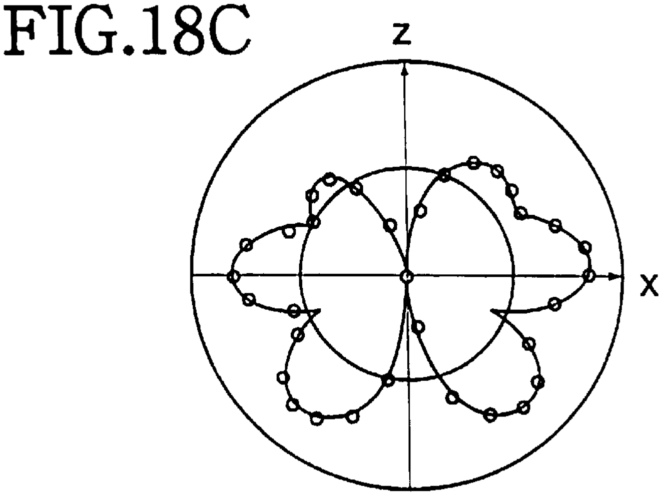

Comparing those radiation patterns, with reference to FIG. 15 with the length of notch being 3/16 λ, the maximum radiation direction in the y-z plane (FIG. 15C) lies in a right downward inclined direction and a left downward inclined direction, thus indicating that there is little effect by providing the notch. On the contrary, with reference to FIG. 16 with the length of notch being 1/5 λ, the radiation pattern in the y-z plane (FIG. 16C) shows the same level of gain in the horizontal direction and the right downward inclined as well as the left downward inclined directions, thus indicating that there is a certain effect obtained by providing the notch. In particular, with reference to FIG. 17 and FIG. 18 with the length of notches being 1/4 λ and 1/3 λ, respectively, the maximum radiation direction lies in the horizontal direction, thus indicating that there is a significant effect obtained by providing the notch. As observed above, varying the length of notch can change the radiation pattern of the portable radio. Further, there can be obtained a most desirable radiation pattern by combining the length of notch, a shape of notch, a position of notch and the number of notch.

Figure 19:
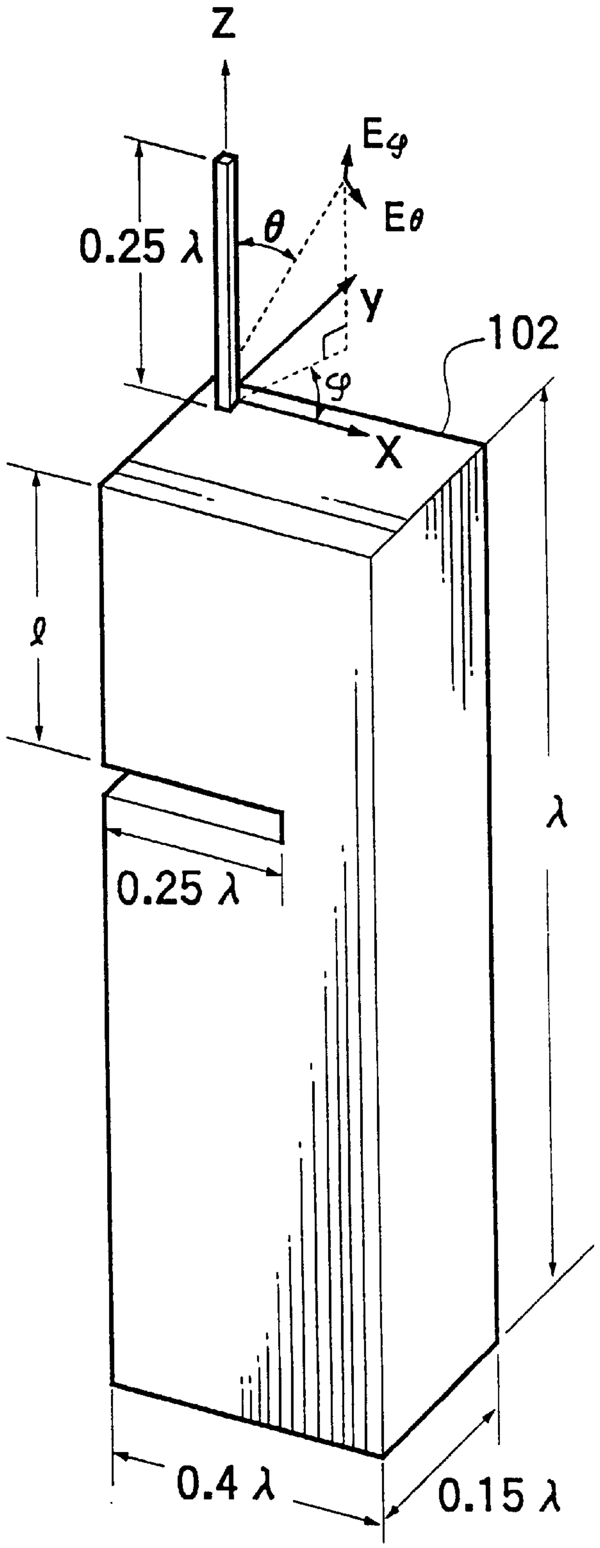
FIG. 19 shows a model of the portable radio where the notch is located at a distance l from the feed point of the antenna, the length of antenna is 0.25 λ, the width of the housing 102 is 0.4 λ, and the depth of the housing 102 is 0.15 λ, and the length of notch is 0.25 λ.

Now, attention is directed to the position of the notch, as compared to the length of notch as described above. Let us use a model shown in FIG. 19 where the notch is located at a distance l from the feed point of the antenna, the length of antenna is 0.25 λ, the width of the housing 102 is 0.4 λ, and the depth of the housing 102 is 0.15 λ, and the length of notch is 0.25 λ. FIGS. 20 through 24 show the radiation patterns in relation to the position of notch with the distance l being 1/16 λ, 5/48 λ, 3/16 λ, 1/4 λ and 5/16 λ, respectively.

Figure 20A:
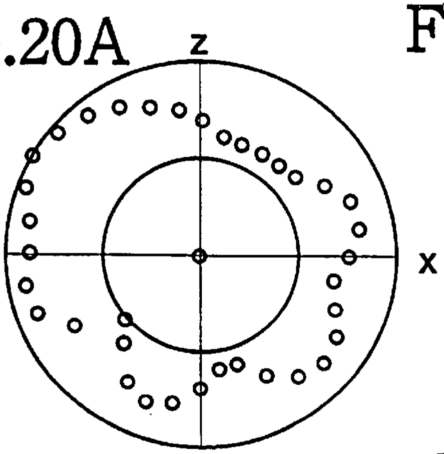
FIGS. 20 through 24 show the radiation patterns in relation to the positions of notch with the distance l being 1/16 λ, 5/48 λ, 3/16 λ, 1/4 λ and 5/16 λ, respectively.
Figure 20B:
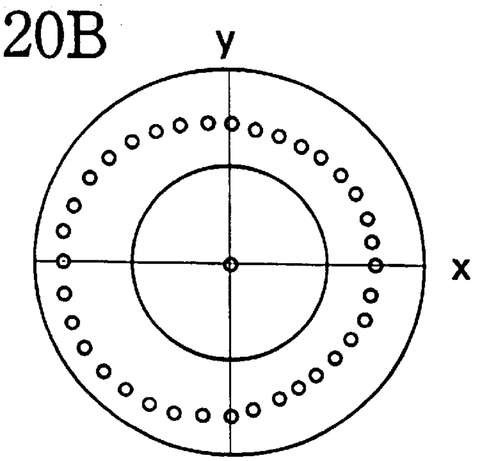
Figure 20C:
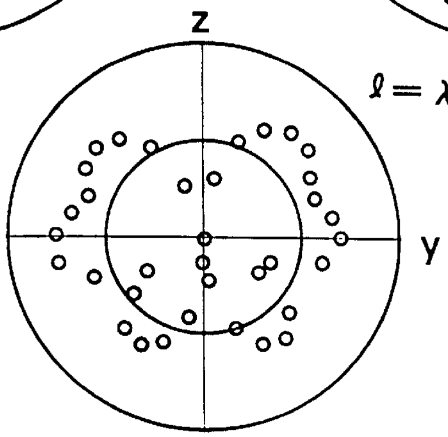
Figure 21A:
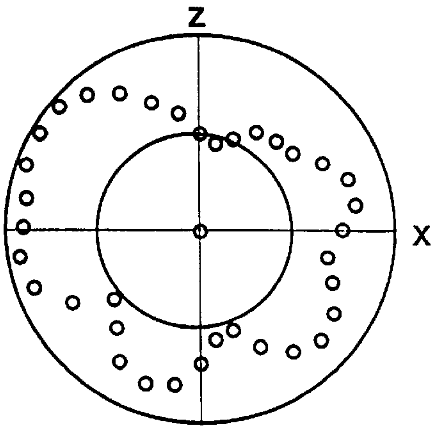
Figure 21B:
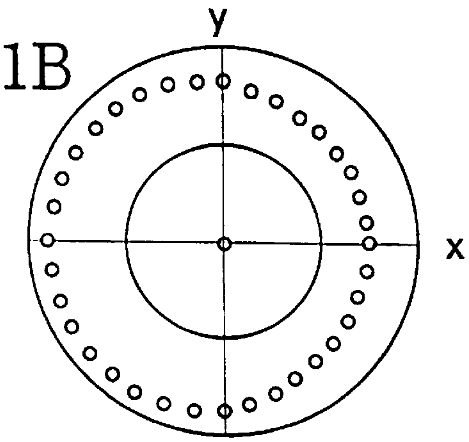
Figure 21C:
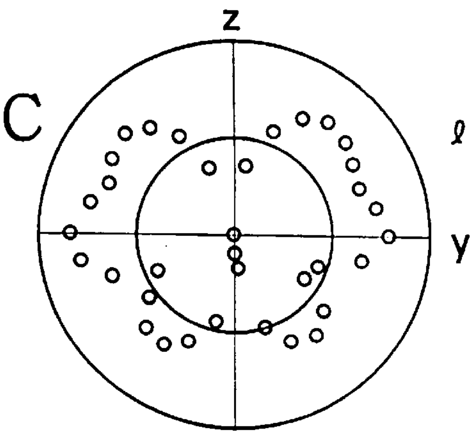
Figure 22A:
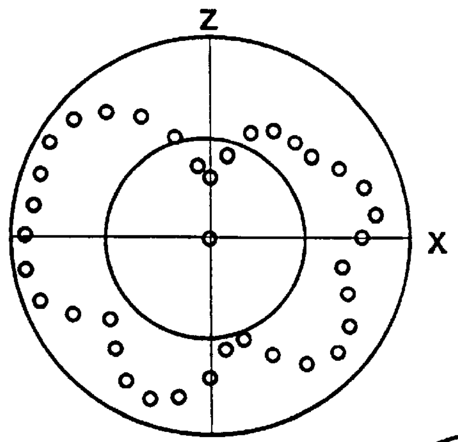
Figure 22B:
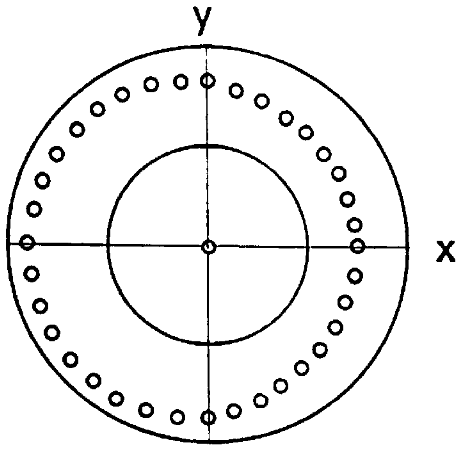
Figure 22C:
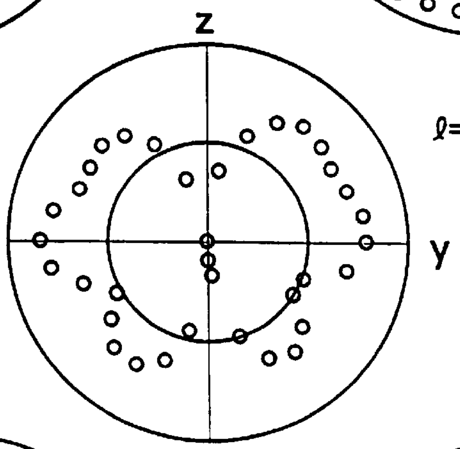
Figure 23A:
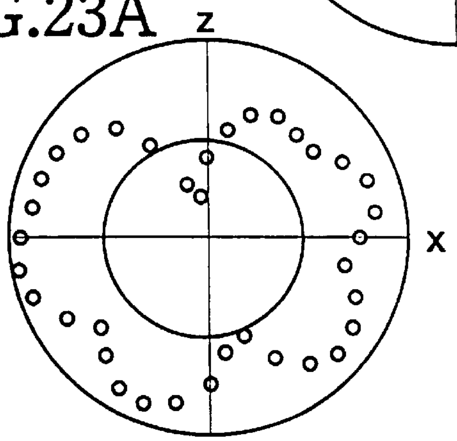
Figure 23B:
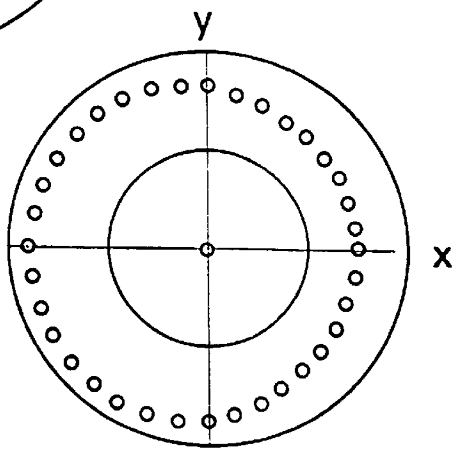
Figure 23C:
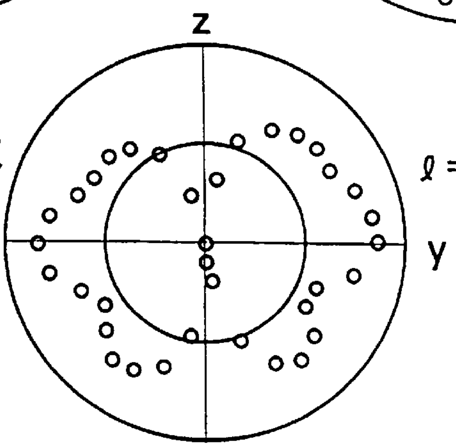
Figure 24A:
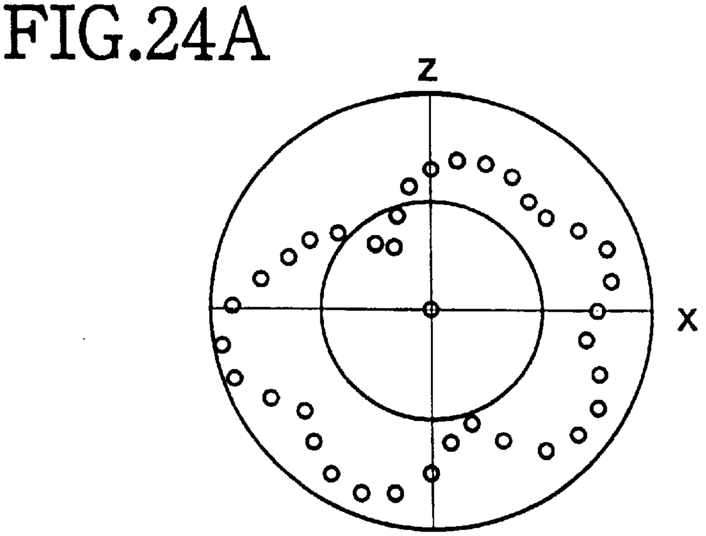
Figure 24B:
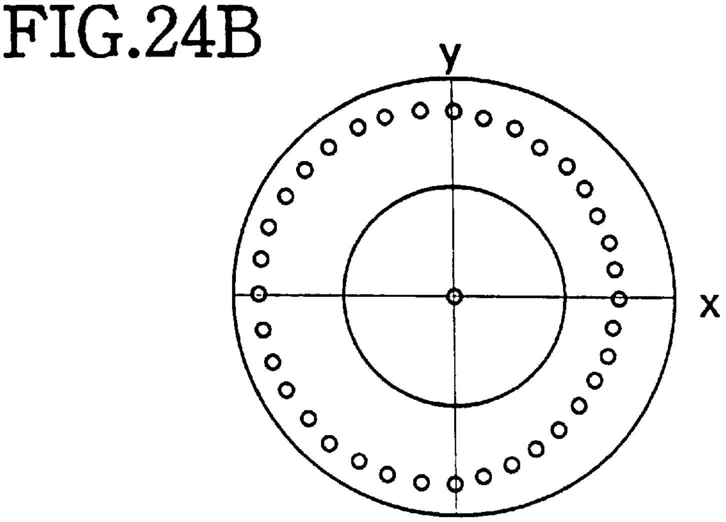
Figure 24C:
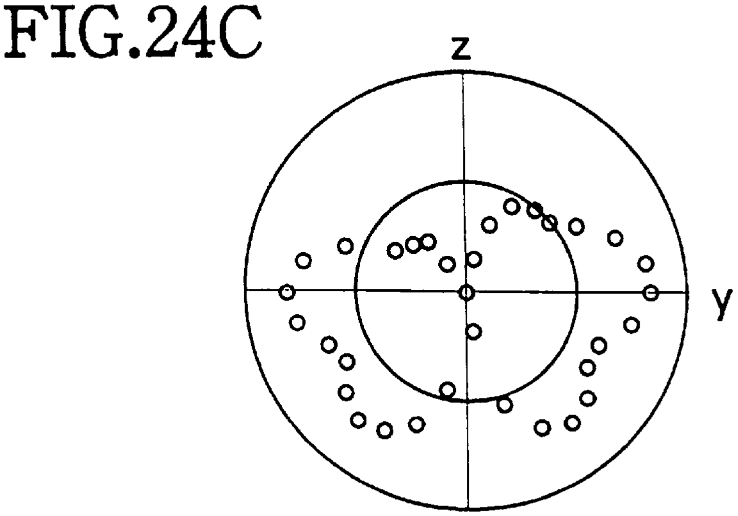

Compared the radiation patterns shown in FIGS. 20 through 24 to ones of the portable radio having no notches (FIG. 2), with reference to FIG. 20 where the notch is located at a distance l of 1/16 λ, though the radiation characteristic is changed by providing the notch, there are some improvements and some minor deteriorations in the horizontal plane (FIG. 20B). However, with reference to FIG. 21 where the notch is located at approximately 0.1 λ (5/48 λ), there is only improvement and no deterioration. With reference to FIGS. 22 through 24 where the notch locations are from 5/48 λ to 5/16 λ, there is observed no deterioration. According to the above data, if the notch is located off by more than approximately 0.1 λ, there is observed a positive effect of providing a notch and the radiation pattern in the horizontal direction is improved. The above results indicate that the location of the notch can be not only at approximately 1/4 λ but also at other distances to have a positive effect of having notch in the housing of the portable radio equipment. Therefore, the distance l of the notch can be adjusted according to a certain condition.

Figure 25:
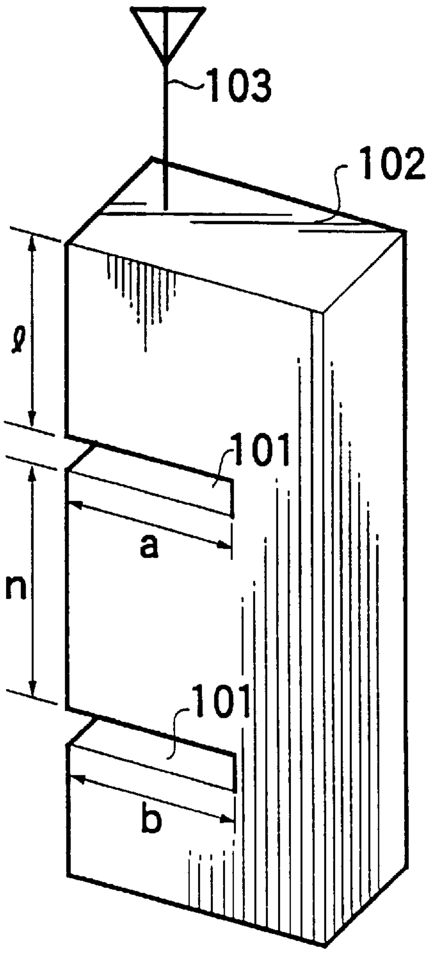
FIG. 25 shows a portable radio where there are provided two notches in the same side of the housing.
Figure 26:
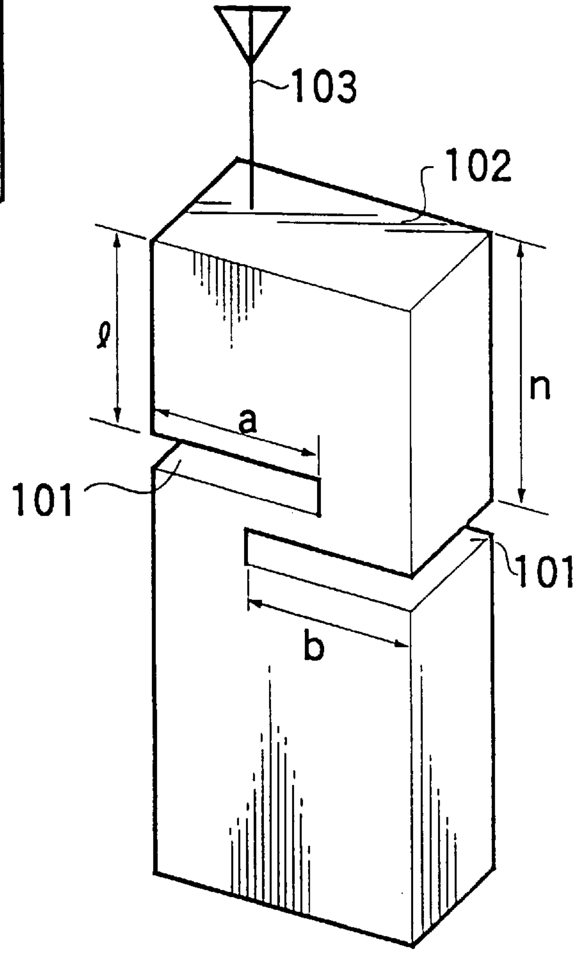
FIG. 26 shows an example of the portable radio where there are provided two notches one of which is provided from a side of the housing while the other notch is provided in the opposite side of the housing.

Next, FIG. 25 and FIG. 26 show an example of the portable radio having a plurality of notches 101 in combination to vary the distribution of the radio-frequency current flowing through the housing 102 so that the radiation characteristics of the portable radio can be improved.

FIG. 25 shows a portable radio where there are provided two notches in the same side of the housing 102. With reference to FIG. 25, there are provided two notches of length a, b on the side close to the feed point of λ/4 antenna. Suppose that the length a, b of notches and distance l from the feed point to the first notch are approximately λ/4, and distance n from the first notch to the second notch is approximately λ/2.

In the above configuration shown in FIG. 25, as have described in regard to FIG. 7, the first notch lies in a loop of the radio-frequency current and, moreover, the second notch placed at a distance of approximately λ/2 from the first notch also lies in the loop of the high-frequency, thus the radiation characteristics being further improved. It shall be appreciated that though the effects of radiation characteristics are somewhat less effective when l and n are set to other than λ/4 and λ/2, respectively, the position and length of the notches can be designed freely according to a designing situation.

FIG. 26 shows an example of the portable radio where there are provided two notches one of which is provided from a side of the housing 102 while the other notch is provided in the opposite side of the housing 102. Suppose that respective length of the notches are a and b, and a distance from the top end of the housing to the first notch 101 is indicated with l and a distance from the top end of the housing to the second notch 101 is indicated with n. In this embodiment represented by FIG. 26, by providing the two notches at a relatively close distance therebetween and providing one notch from one side and other from the opposite side, the radio-frequency current can be concentrated around the two notches.

In the above embodiment represented by FIG. 26, the distribution of radio-frequency current is localized in a concentrated area, moreover, there are provided two notches at an opposite direction to each other so that phases of the radio frequency can be made to coincide. A significant effect can be obtained when length a, b is approximately λ/4, and distance l is approximately λ/4 and distance n is designed to be longer than l.

Embodiment No. 2

Figure 27:
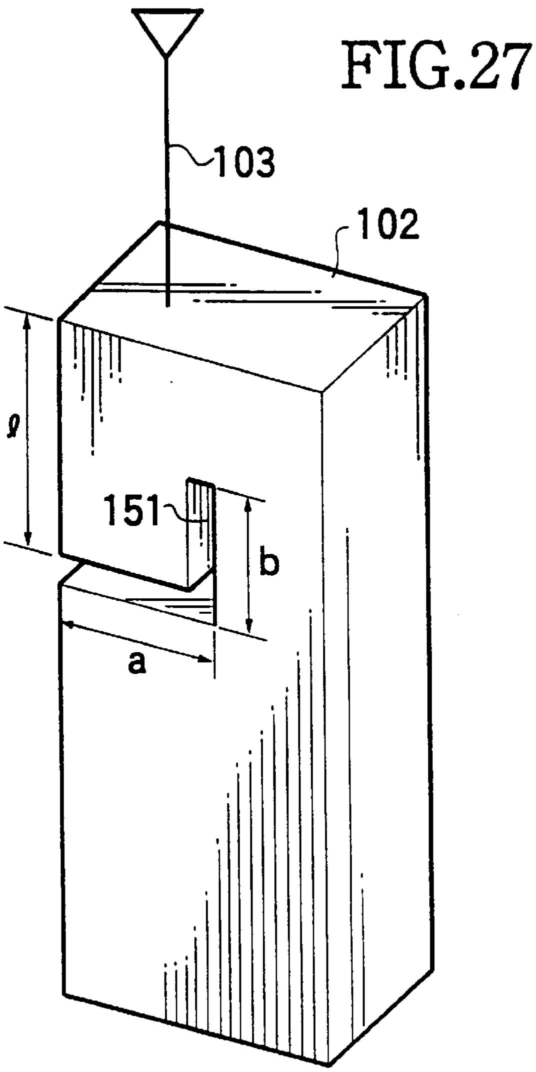
FIG. 27 shows a portable radio equipment having an L-shaped notch.
Figure 28:
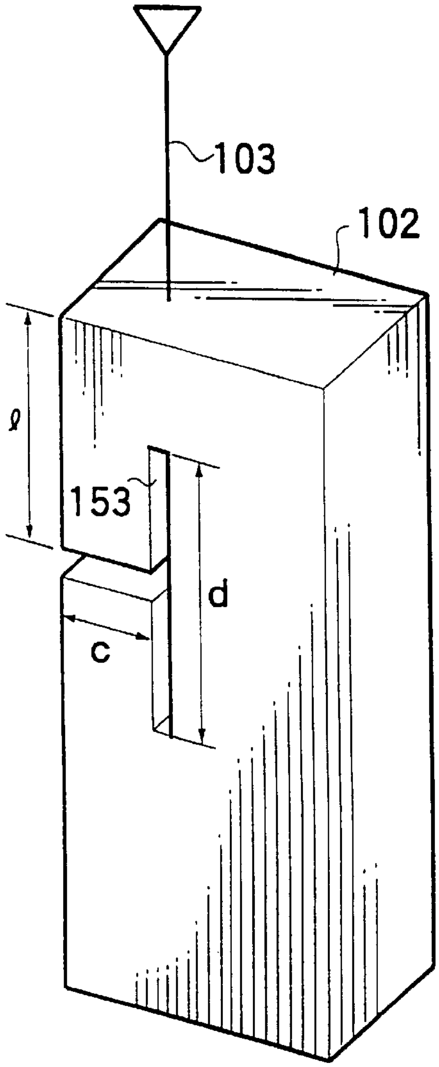
FIG. 28 shows a portable radio equipment having a T-shaped notch.

FIG. 27 and FIG. 28 show portable radio equipment having different types of notches 101.

FIG. 27 shows a portable radio equipment having an L-shaped notch 151. In the same figure, let respective length of the notch 151 be a for a horizontal line and b for a vertical line as shown in the figure. In this embodiment, the length of the notch 151 is adjusted such that (a+b) equals to approximately λ/4.

FIG. 28 shows a portable radio equipment having a T-shaped notch 153. In the same figure, let respective length of the notch 153 be c for a horizontal line and d for a vertical line as shown in the figure. In this embodiment, the length of the notch 153 is adjusted such that (c+d) equals to approximately λ/4.

In above embodiments as shown in FIG. 27 and FIG. 28, length l from the feeding point of the antenna 103 is set to approximately λ/4 and the total length of the notch is set to approximately λ/4, in other words, a total circumference of the notch that equals to (a+b+b+a) is set to approximately λ/2, so that the same effect can be obtained as set forth as in FIG. 6. The embodiments represented by FIG. 27 and FIG. 28 can be useful when size of a conductive body, i.e. housing, is relatively small.

Figure 29A:
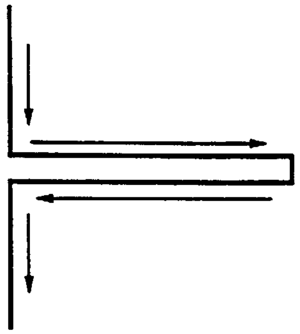
FIG. 29A shows directions of the current flowing around an I-shaped notch.
Figure 29B:
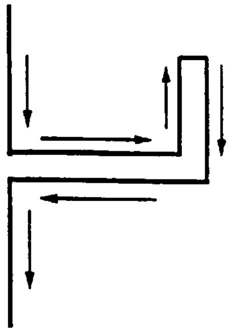
FIG. 29B shows directions of the current flowing around the L-shaped notch.
Figure 29C:
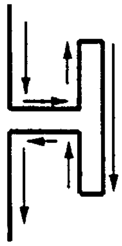
FIG. 29C shows directions of the current flowing around the T-shaped notch.

FIG. 29 illustrates directions of the current flowing around the notch. FIG. 29A shows directions of the current flowing around an I-shaped notch. FIG. 29B shows directions of the current flowing around the L-shaped notch. FIG. 29C shows directions of the current flowing around the T-shaped notch.

With reference to FIG. 29A through FIG. 29C, the currents flowing along the notch are considered that the current flowing along an upper side of the notch is opposite in direction and same in amplitude to the current flowing along a lower side of the notch so that the currents are cancelled out, thus not contributing affects thereof to the radiation. Therefore, by providing such notches as illustrated in FIG. 29, it is possible to minimize the affect of the radio-frequency flowing through the housing 102 on the radiation pattern. When the width of the portable radio equipment is shorter than λ/4, it is difficult to provide the I-shaped notch in the housing 102. In that case, the L-shaped and T-shaped notches will be useful. In other words, when the width of the portable radio equipment is less than λ/4 and it is physically difficult or impossible to provide a notch due to a restriction caused by arrangement of internal units of the housing such as a transmitting unit or a receiving unit, a degree of freedom in terms of designing a notch as well as the portable radio equipment as a whole is increased by adopting an L-shaped or T-shaped notch as illustrated in FIG. 29.

Figure 30:
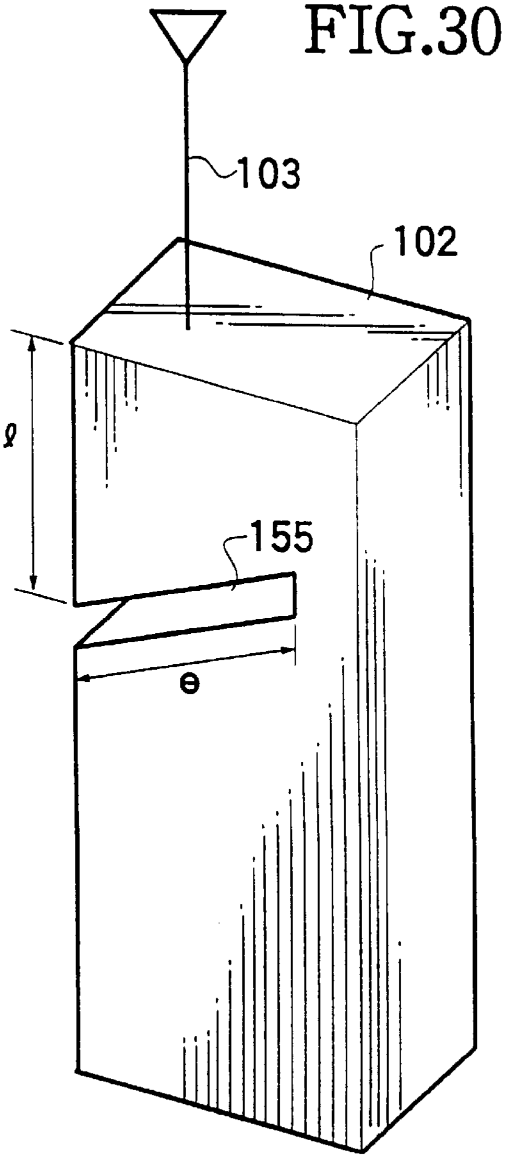
FIG. 30 shows a portable radio equipment having a longitudinally tilted notch.
Figure 31:
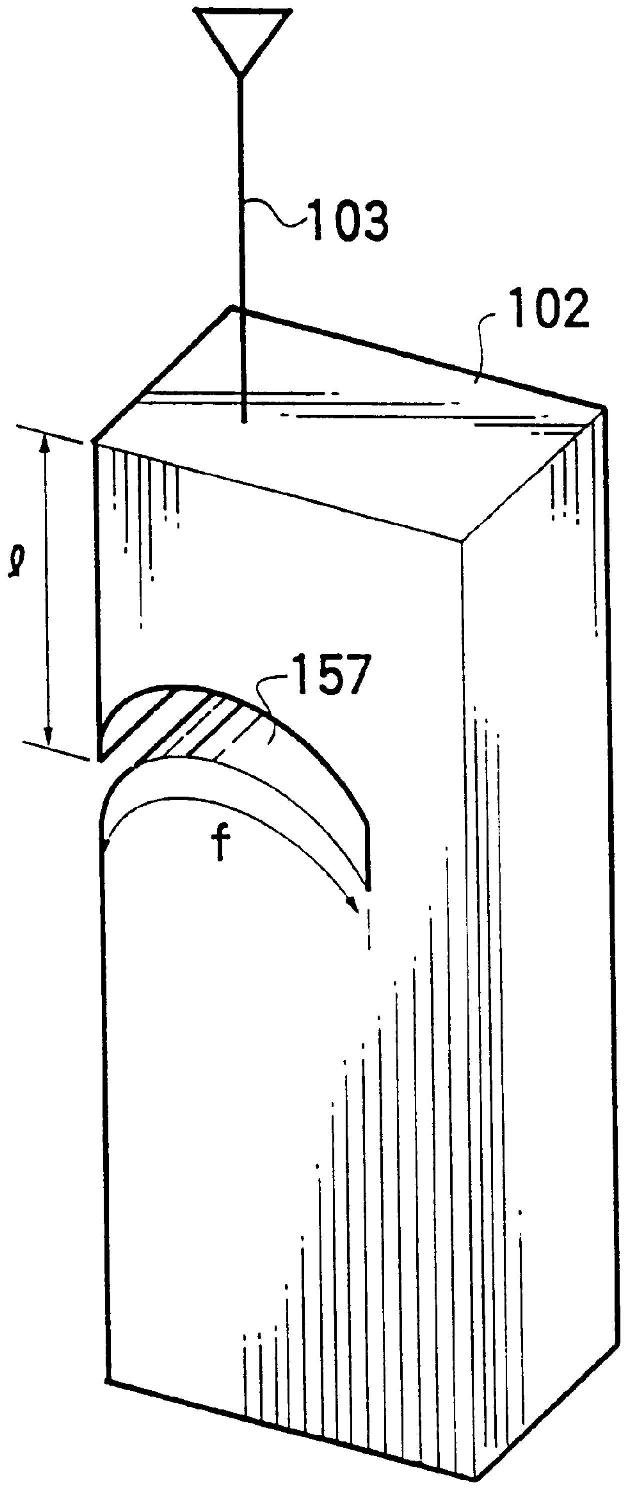
FIG. 31 shows a portable radio equipment having a smoothly curved notch.

FIG. 30 and FIG. 31 show another embodiment in providing a notch to the housing 102.

FIG. 30 shows a portable radio equipment having a longitudinally tilted notch 155. FIG. 31 shows a portable radio equipment having a smoothly curved notch 157. By providing the tilted notch and curved notch to the housing 102 as illustrated in FIG. 30 and FIG. 31, there can be obtained the same effect as in FIG. 6. In other words, by providing such notches as in FIG. 30 and FIG. 31, the distribution of current flowing through the housing is altered so as to reduce the affect thereof on the radiation pattern.

Embodiment No. 3

Figure 32:
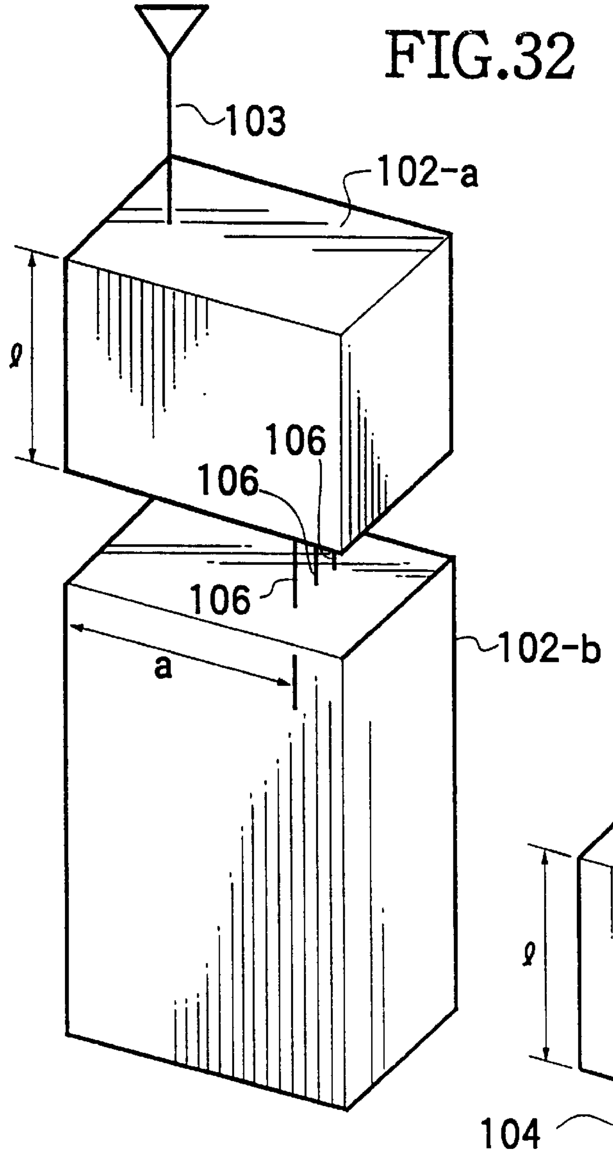
FIG. 32 shows a portable radio equipment where the housing is divided into two portions and each divided portion of the housing is electrically connected by a short-circuit wire.
Figure 33:
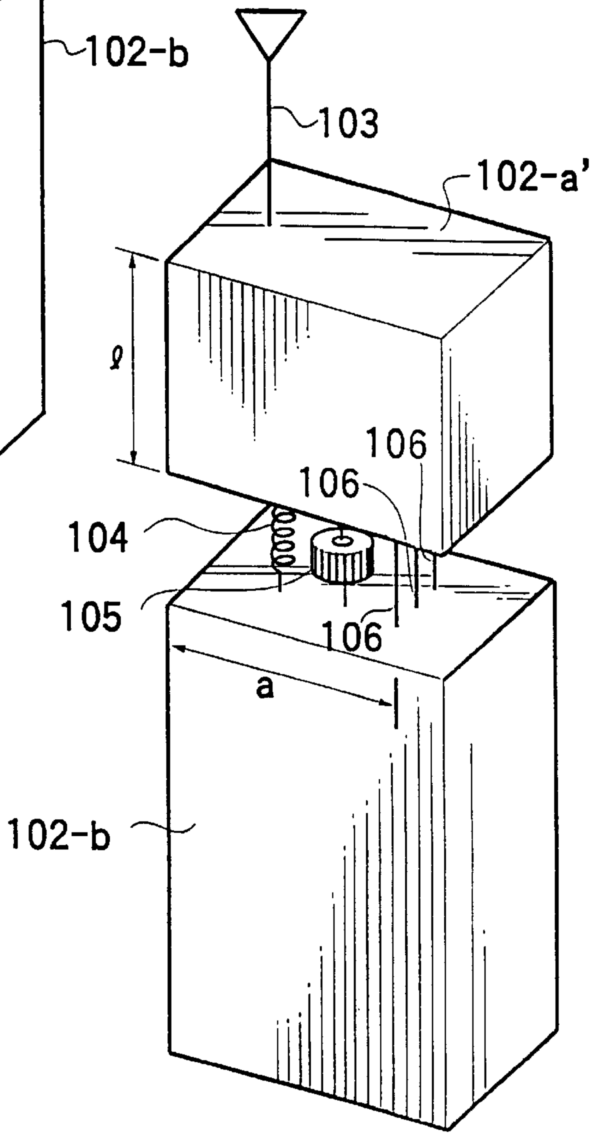
FIG. 33 shows a portable radio equipment where the housing is divided into two portions and each divided portion of the housing is connected by a coil or a ferrite ring.

FIG. 32 shows a portable radio equipment where the housing is divided into two portions and each divided portion of the housing is electrically connected by a conductor wire so that the distribution of the radio-frequency current on the housing can be changed. In the same figure, the housing is divided at a distance of approximately λ/4 indicated with l from a feeding point of the antenna 103 (divided into a housing 102-*a* and a housing 102-*b*), and there is provided a short-circuit wire 106 at a distance of approximately λ/4 indicated with a from a side of the housing so as to short-circuit the respective housings 102-*a* and 102-*b*.

In such a configuration as illustrated in FIG. 32, the current flowing through the housing flows from the housing 102-*a* to which the antenna 103 is connected, to the housing 102-*b* via the short-circuit wire 106. Therefore, by combining the two separate conductive bodes (housings) and the short-circuit wire 106, there can be obtained the same effect as in the portable radio equipment having the notch 101, so that the affect of the radio-frequency current can be reduced. The conductor wire which connects the divided housing portions may be of a face plate type or a wire type, and an increased effect may be obtained by providing the conductor wire as close to an edge portion of the housing as possible. In practice, the two separated housing portions can be supported by an integrated module using a plastic for example, so that enough strength in a junction portion connecting the two separate housing can be obtained.

There will be a case where respective internal systems in the housing 102-*a* and the housing 102-*b* have to be electrically connected. In that case, the housings 102-*a* and 102-*b* can be connected via a coil 104 or a ferrite ring 105 or the like. Since such elements are considered to be electrically opened when the radio frequency becomes high to a certain degree, the radio-frequency current does not flow through such elements even when such elements are used as signal wires connecting the internal systems in the respective housings 102-*a* and 102-*b*. Thus, such elements as the coil 104 or the ferrite ring 105 can be utilized in order to increase a degree of freedom in terms of an electrical connection between the separated housings.

Figure 34:
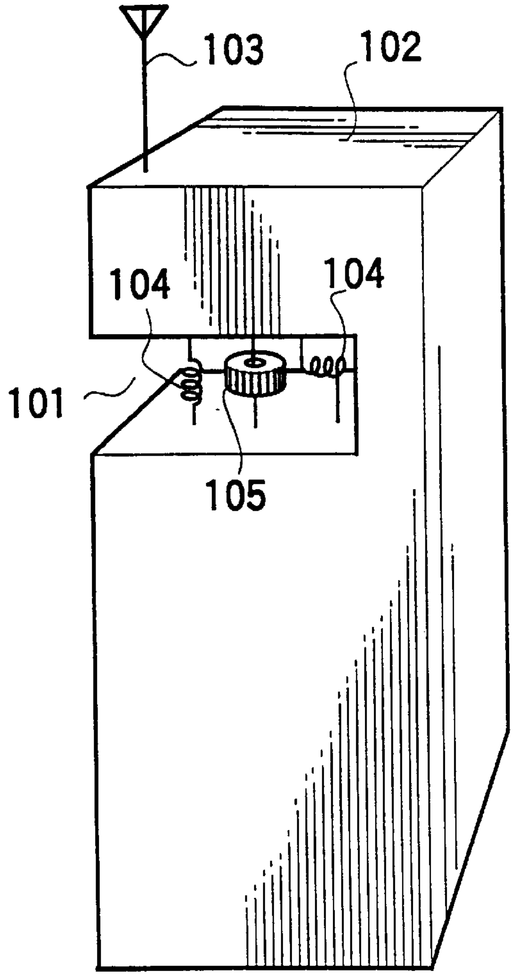
FIG. 34 shows a portable radio equipment having a notch 101 where there is provided a coil or a ferrite ring in the notch.

FIG. 34 shows a portable radio equipment having a notch 101 where there is provided a coil 104 or a ferrite ring 105 in the notch 101 so as not to short-circuit the notch. A self-inductance value for such elements as the coil 104 and the ferrite ring 105 are preferably at least a few μH so that a desired length for the notch can be secured.

In the present invention, there is provided means for changing the current distribution on the housing so as to change the current distribution of the radio frequency and thereby improve the radiation characteristic of the whole portable radio equipment. Therefore, since the less the radio-frequency current is generated on the housing the less the electromagnetic wave is radiated, the longer the width of the notch 101 becomes the greater the improvement on the radiation characteristic becomes.

In the third embodiment, strength in the whole portable radio equipment can be secured by inserting, between the notch, a dielectric such as a glass epoxy FRP, a Tefron base plate or a usual plastic so as to fix the housings, thereby obtaining the same effect as described before.

Figure 38:
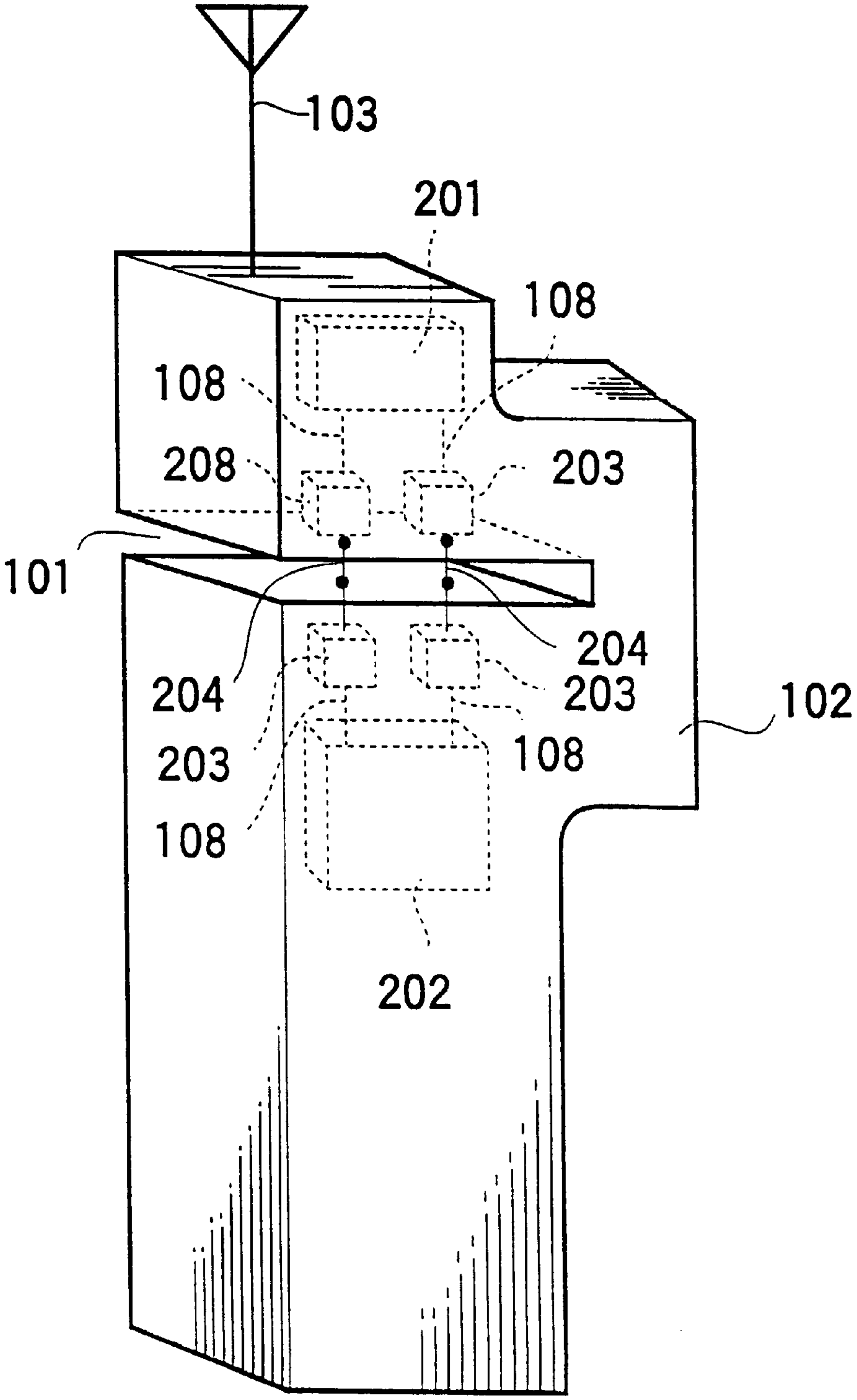
FIG. 38 shows a portable radio equipment having a notch 101 where there is provided an optical fiber 204 for communicating a signal between an upper portion of the housing and a lower portion of the housing.

There is shown another example for the third embodiment in FIG. 38. FIG. 38 shows a portable radio equipment having a notch 101 where there is provided an optical fiber 204 for communicating a signal between an upper portion of the housing and a lower portion of the housing. In this embodiment, the notch 101 is provided at a distance of approximately λ/4 from a top end of the housing and the length of the notch 101 is approximately λ/4 long. The shape of the hosing 102 is arbitrary to a certain degree. The antenna 103 is set on either end of a longitudinal side of the housing 102. In FIG. 38, the reference numerals 201 and 202 show internal circuits, for example, 201 for a transmitting or receiving circuit and 202 for a control circuit, a synthesizer or a receiving or transmitting circuit.

In this embodiment represented by FIG. 38, the embodiment is characterized in that there is provided the optical fiber 204 for communicating the signal between an upper portion and an lower portion of the notch via the optical fiber 204 which is non-conductive. In other words, the transmitting/receiving circuit 201 and the control circuit 202 are connected via an electric signal wire 108 through which an electric signal is inputted and outputted. The electric signal communicated through the electric signal wire 108 is converted to an optical signal by a photoelectrical transfer unit 203, and thereafter the optical signal is transferred through the optical fiber 204 bridging between the notch 101, and then the optical signal is converted to an electric signal by a photoelectrical transfer unit 203 so that the signal is transferred through the electric signal wire.

Figure 39:
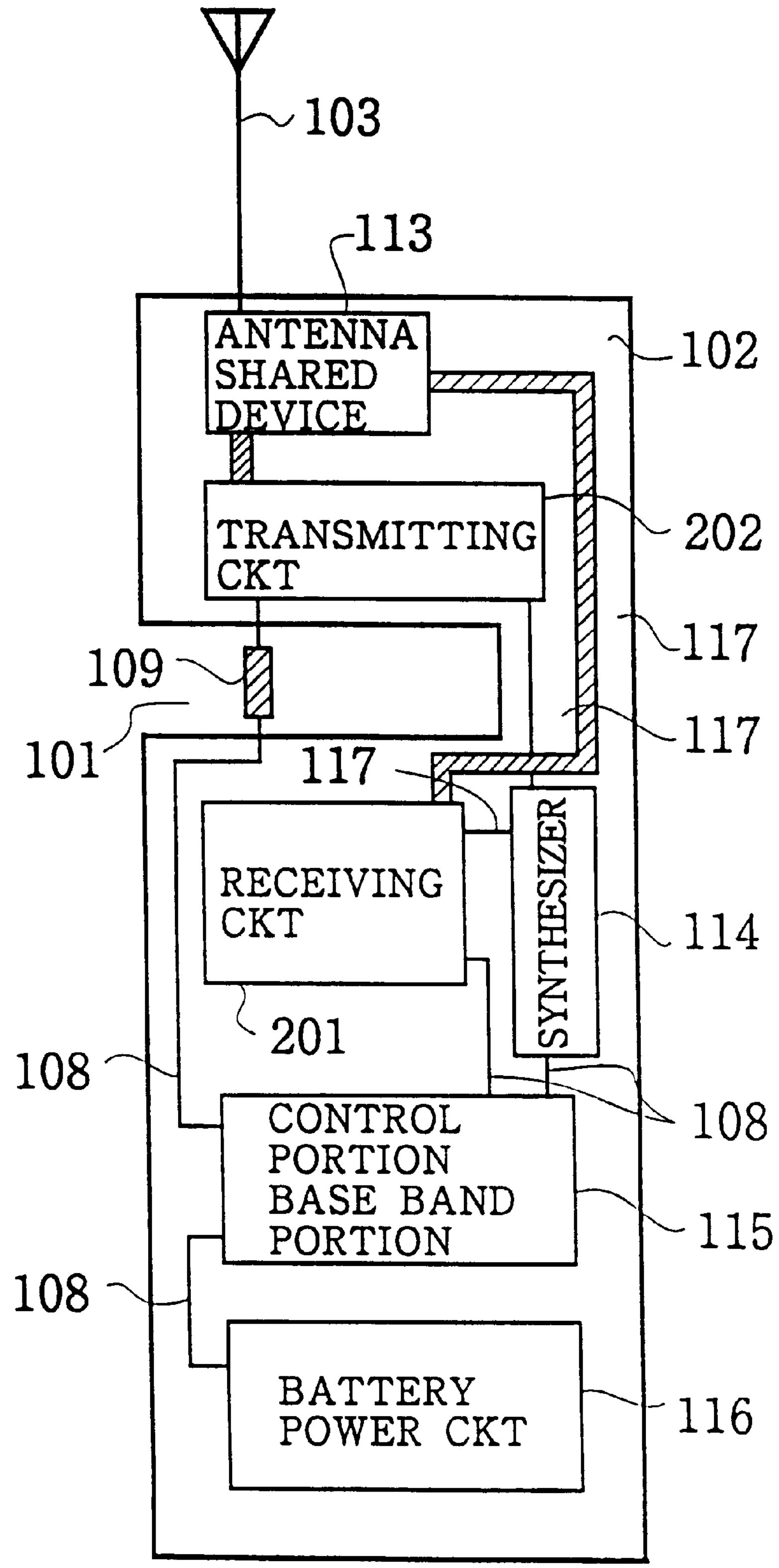
FIG. 39 shows a portable radio equipment utilizing a high resistance wire in place of the optical fiber shown in FIG. 38.

Accordingly, by employing the nonconductive material for the signal wire crossing through the notch 101, an electromagnetic radiation can be prevented and the communication of signals between the notch 101 can be performed without a loss of the effect of having the notch 101. With reference to FIG. 38, the internal circuits 201 and 202 are, for instance, circuits such as a control circuit or the like which deal with a signal of relatively low frequency. An external circuit 110 is for a key pad or a display (see FIG. 40). FIG. 39 shows a portable radio equipment utilizing a high resistance wire 109 in place of the optical fiber 204 shown in FIG. 38.

With reference to FIG. 39, the reference numeral 201 designates a receiving circuit, 202 a transmitting circuit, 113 an antenna shared device, 114 a synthesizer, 115 a control circuit and 116 is a power source. The reference numeral 117 indicates a radio-frequency cable for transferring the radio-frequency signal. There is provided the signal wires from the control circuit 115 to the transmitting circuit 202, and among such signal wires the high-resistance wire is utilized for a portion crossing the notch 101 and for the rest of area there are used cables for baseband digital or analog signal. In this embodiment represented by FIG. 39, the transmitting circuit 202 and the receiving circuit are separately disposed in the upper portion and the lower portion of the housing, respectively, so that the number of type of the signal to be transferred through the notch 101 can be reduced and the number of the signal wires can also be reduced.

Figure 40:
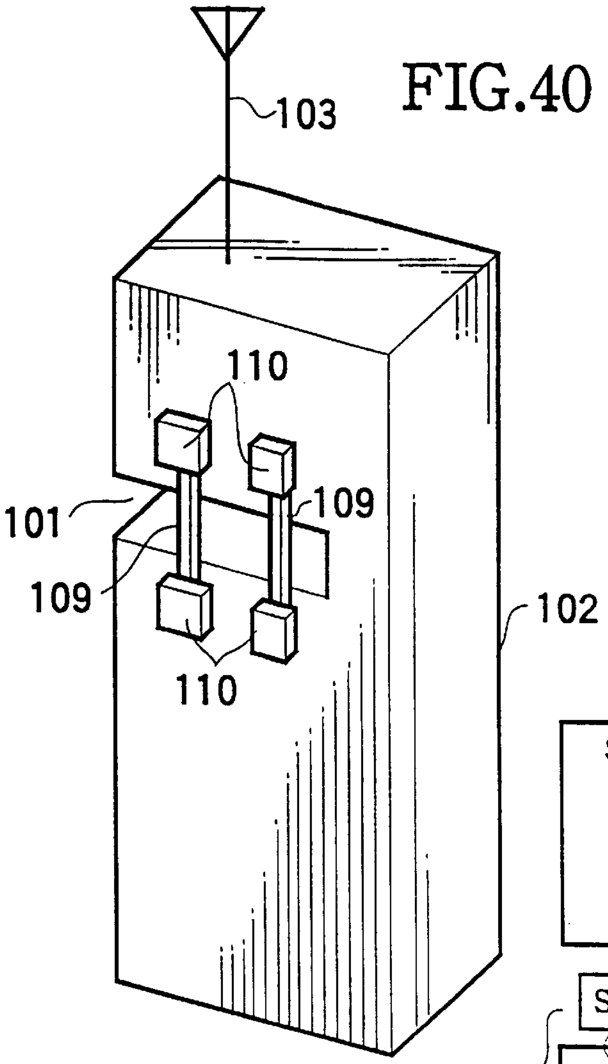
FIG. 40 shows a portable radio equipment where whole signal wires used for an external circuit are the high-resistance wires.

FIG. 40 shows a portable radio equipment where whole signal wires used for an external circuit 110 are the high-resistance wires 109. In particularly the external circuit 110, there exists a great influence of the electromagnetic wave radiated form the current flowing through the signal wire. Therefore, by replacing the signal wires (for connecting the external circuits disposed in the upper and lower portion of the notch 101) by the high-resistance wires, the influence of the electromagnetic wave upon the radiation characteristic can be reduced.

Figure 41:
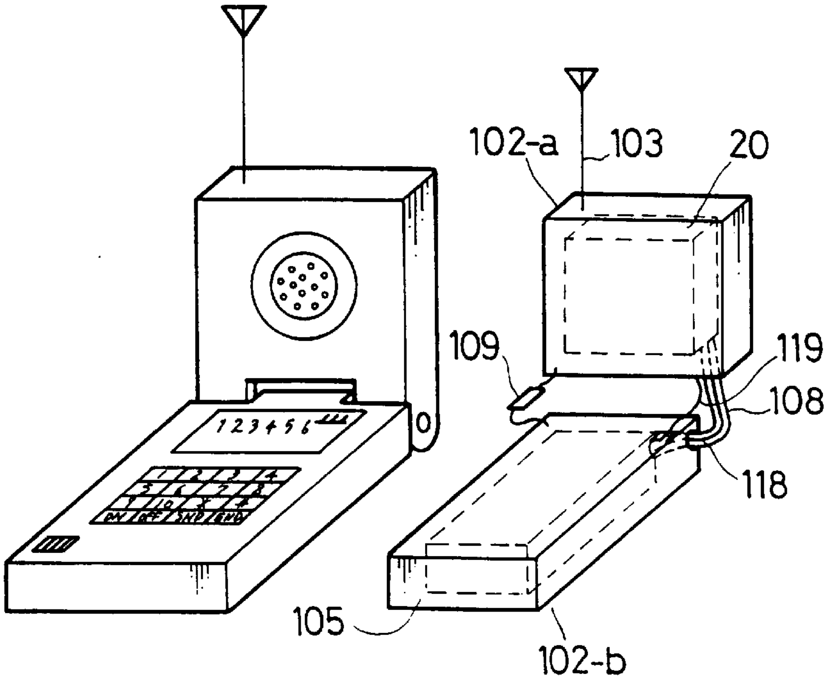
FIG. 41 shows a folding type portable radio equipment.

FIG. 41 shows a folding type portable radio equipment. The folding type portable radio equipment comprises an antenna 103, a housing 102-*a* and a housing 102-*b*. In the housing 102-*a*, there is arranged a high-frequency circuit serving as an internal circuit such as a transmitting or receiving circuit. In the housing 102-*b*, there is arranged a low-frequency circuit serving as an internal circuit such as the control circuit 115 or the power circuit 116.

With reference to FIG. 41, an electric signal wire 108, a high-resistance wire 109 and a ground wire and so on are used for a signal wire connecting the housing 102-*a* and the housing 102-*b*. Therefore, fluctuation of impedance caused by kink or twist can be minimized compared to the high-frequency signal wire. Accordingly, the folding type portable radio equipment can be realized by a relatively simple and easy configuration thereof.

In the folding type portable radio equipment, when the housing 102-*b* of the equipment is placed horizontal to a ground surface, the antenna 103 can be kept vertical to the ground surface by fixing the housing 102-*a* in a vertical position to the ground surface. Since the most of electric waves arriving from a base station presumably contains vertically polarized waves, the wave can be effectively transmitted and received by pointing the antenna in the vertical direction regardless of direction where the housing 102-*b* is held.

Embodiment No. 4

Figure 42:
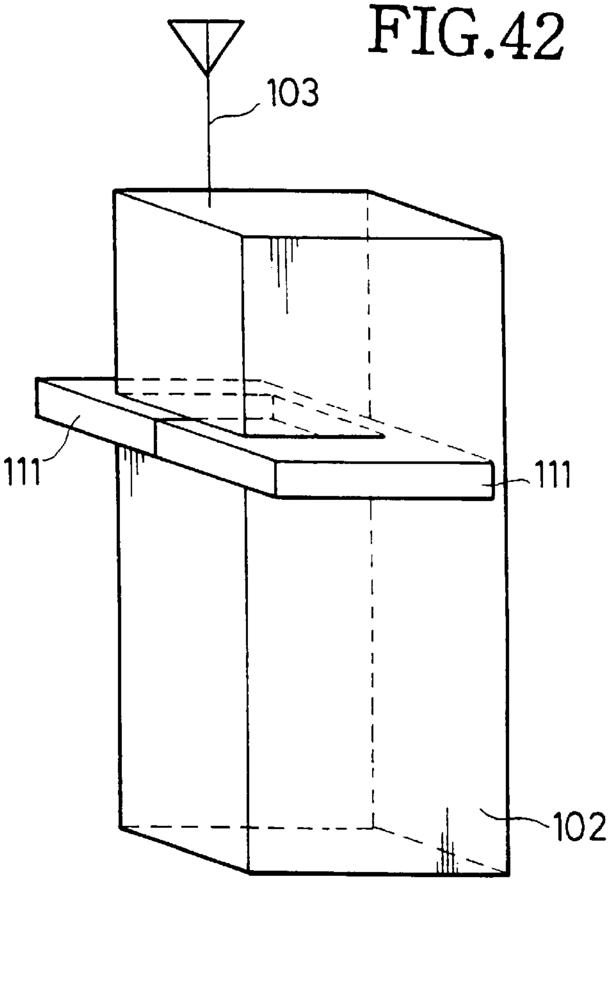

FIG. 42 shows a portable radio equipment which is characterized in that a part of the circumference of the housing 102 is enclosed by a ferromagnetic material 111 such as a ferrite ring or the like. Since in general the ferromagnetic material 111 presents a high resistance in a high-frequency area, the distribution of the radio-frequency current flowing through the housing 102 can be changed by enclosing the part of the housing 102 with the ferromagnetic material. Differing from the embodiments where the housing has the notch therein, the distribution of the radio-frequency current flowing through the housing 102 can be changed without deforming the housing in any way. Therefore, the electric wave radiation characteristic can be improved without deforming or rearranging base plates, circuit parts or signal wires and so on already provided in the housing.

Figure 43:
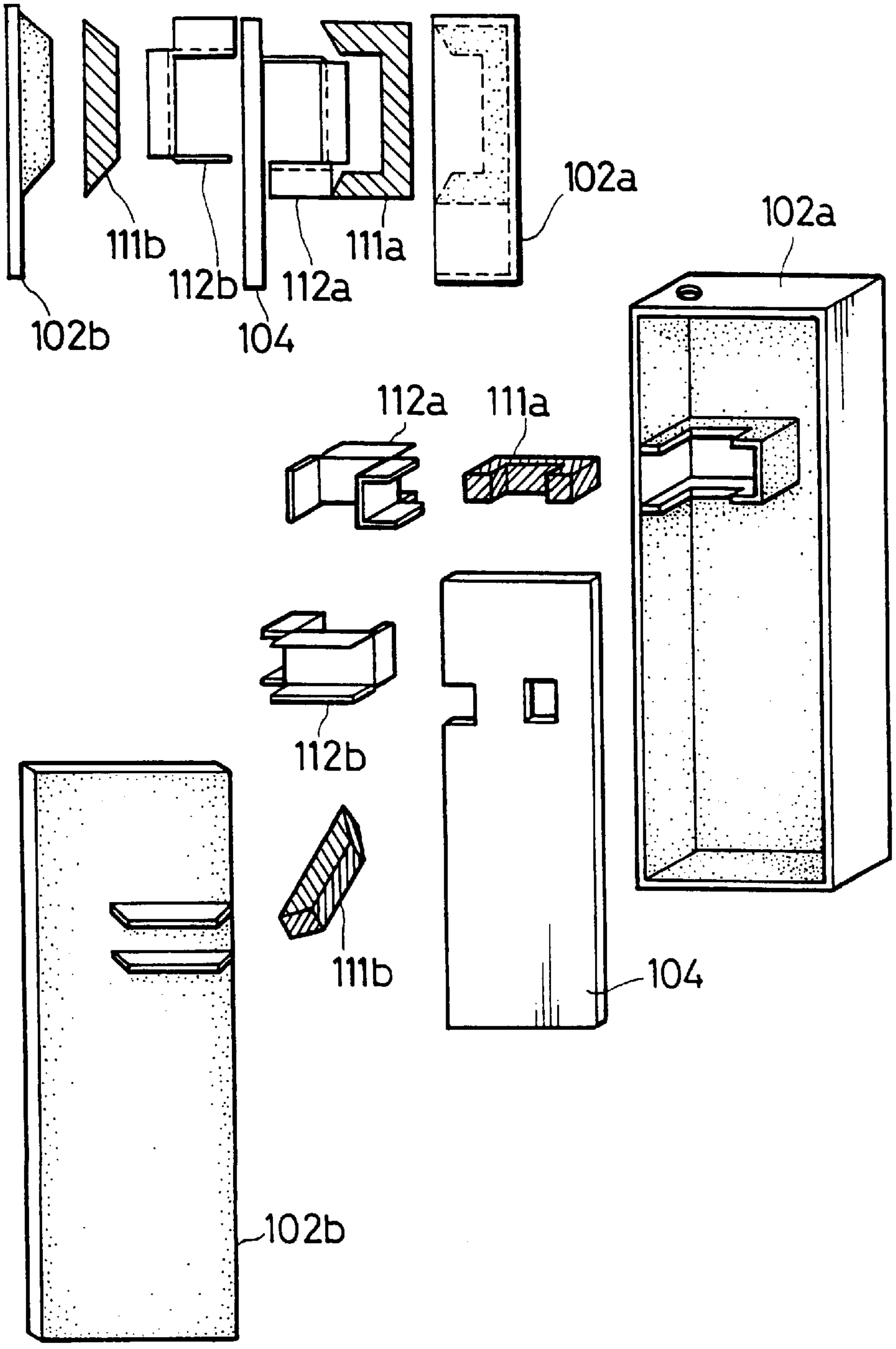
FIG. 43 shows an arrangement for constructing the portable radio equipment in which the ferromagnetic material 111 is attached around a part of the circumference of the housing 102 shown in FIG. 42.

FIG. 43 shows an arrangement for constructing the portable radio equipment in which the ferromagnetic material 111 is attached around a part of the circumference of the housing 102 shown in FIG. 42. With reference to FIG. 43, a ferrite 111*a* (⊐-shaped portion indicated with hatched lines) and a ferrite 111*b* are provi ded in a ⊐-shaped portion of the housing 102-*a* and the housing 102-*b*, respectively. Anything may be suitable if the housing is of conductive nature. The housing may be such that a dielectric such as a plastic serving as an outer frame is provided where in an inner surface of the outer frame there may be provided a conductive thin film and conductive coating or the like. The housing 102*a* and 102*b* are arranged so that the ferrite 111*a* and the ferrite 111_b_ do not contact with the housing 102_a_ and 102_b_, respectively. Metals 112_a_ and 112_b_ combined are arranged to be electrically contacted to an outside of the ⊐-shaped portion of the housings 112-_a_ and 112-_b_ so that a an inside of a ring constituted by combining the ferrites 111_a_ and 111_b_ is electromagnetically shielded. Accordingly, there is provided an electromagnetic shield against the outside of the housing 102 and the inside of the ferrite ring, and a high-frequency signal component tending to penetrate the ferrite ring can be shielded.

Embodiment No. 5

In the embodiments, the housing 102 for the electric shield Is constituted using the conductive material such as the metal plate or the like. In this fifth embodiment, a nonconductive frame body is covered with the conductive material, thus functioning as the electric shield.

Figure 35:
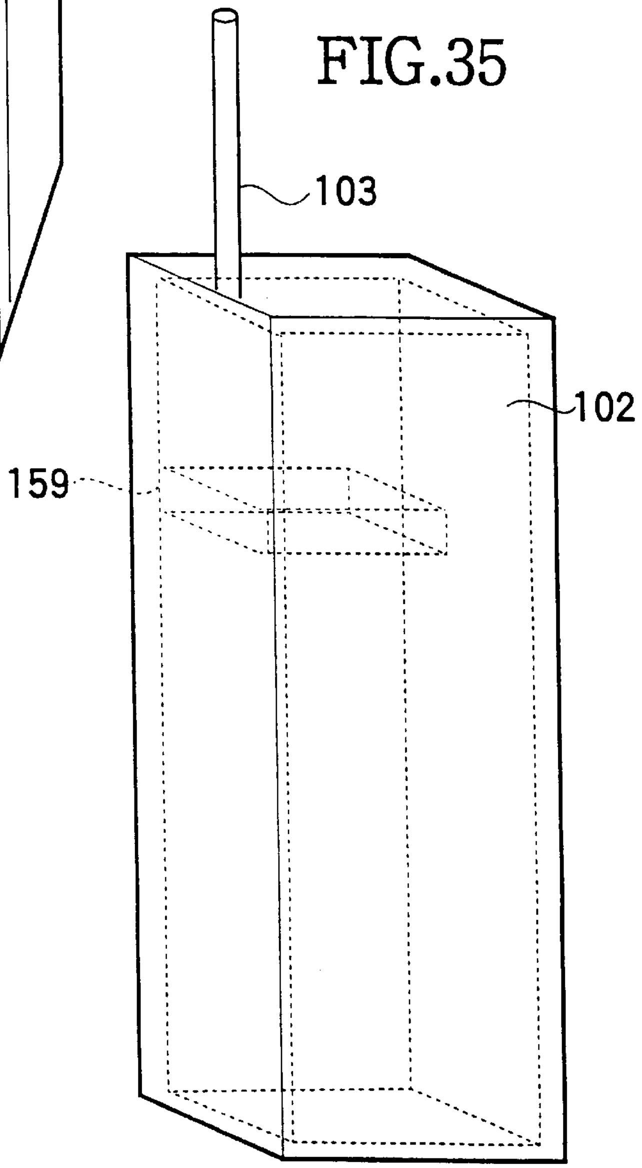
FIG. 35 shows that a conductive coating is applied inside a plastic frame body so as to form a housing 102.

FIG. 35 shows that a conductive coating is applied inside a plastic frame body so as to form a housing 102.

The fifth embodiment is characterized in that there is provided a partition plate in which the conductive coating is applied. It is to be noted that in this embodiment there is not provided any notch but the partition plate.

By this configuration as described above, the distribution of the radio-frequency current flowing through the conductive material is changed so as to improve the radiation characteristic in the same manner as in the previous embodiments.

Figure 36:
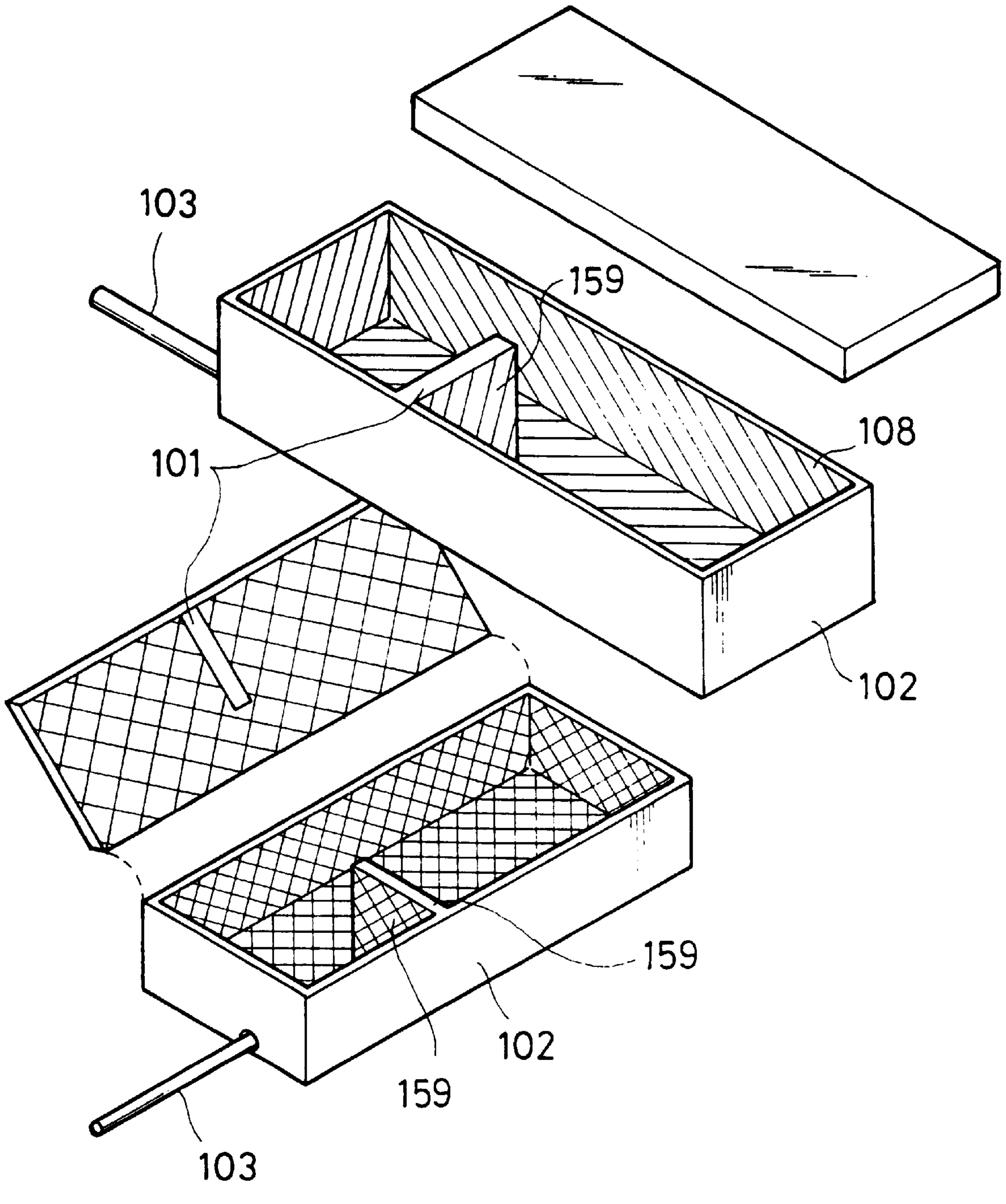
FIG. 36 shows construction of the frame body and the partition plate 159 in the fifth embodiment shown in FIG. 35.

FIG. 36 shows construction of the frame body and the partition plate 159 in the fifth embodiment. The conductive coating is applied to portions marked with hatched lines (108) in FIG. 36 so that the inside of the frame body and the outside of the frame body can be electrically shielded to each other.

Figure 37:
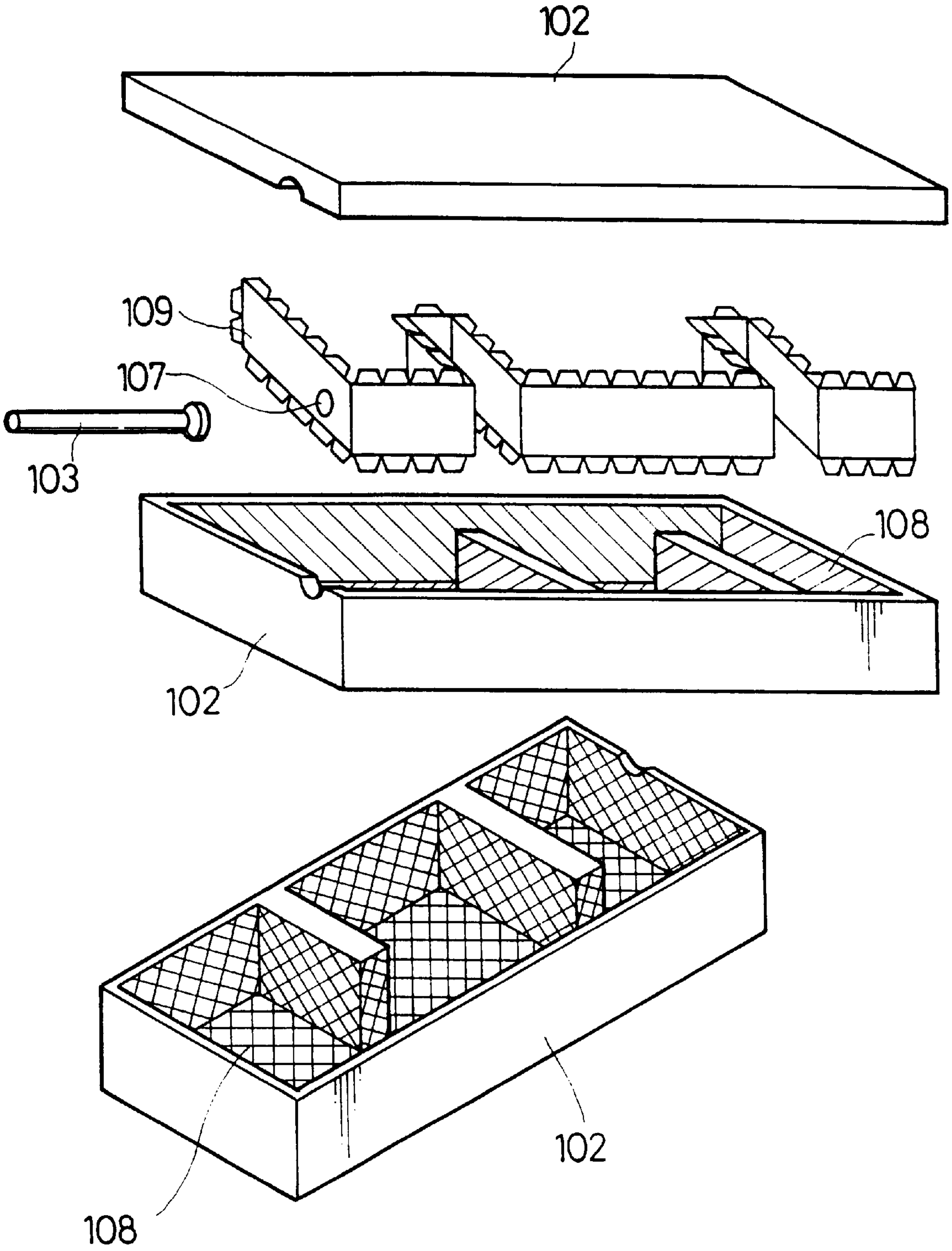
FIG. 37 shows a portable radio equipment where there are provided two partition plates in the housing 102 and shows that in addition to that the conductive coating is applied to the nonconductive frame body for the electric shield, there is used a conductive material 107, 109 such as a metal plate or the like in the vicinity of the antenna 103 and the partition plates.

FIG. 37 shows a portable radio equipment where there are provided two partition plates in the housing 102 and shows that in addition to that the conductive coating is applied to the nonconductive frame body for the electric shield, there is, for electrically shielding purpose, used a conductive material 107, 109 such as a metal plate or the like in the vicinity of the antenna 103 and the partition plates. Accordingly, by providing the metal plate along the partition plate as well as the inner circumference of the housing shown in FIG. 37, the conductive characteristic may be gained to improve the effect thereof.

Embodiment 6

The present invention is characterized in that the radiation pattern of the electromagnetic wave is improved by providing the notch in the housing. In addition to the feature of the present invention characterized in having the notch in the housing, it is possible to have a diversity function by switching the distribution of the radio-frequency current flowing through the housing so as to change the radiation pattern of the electromagnetic wave.

Figure 44:
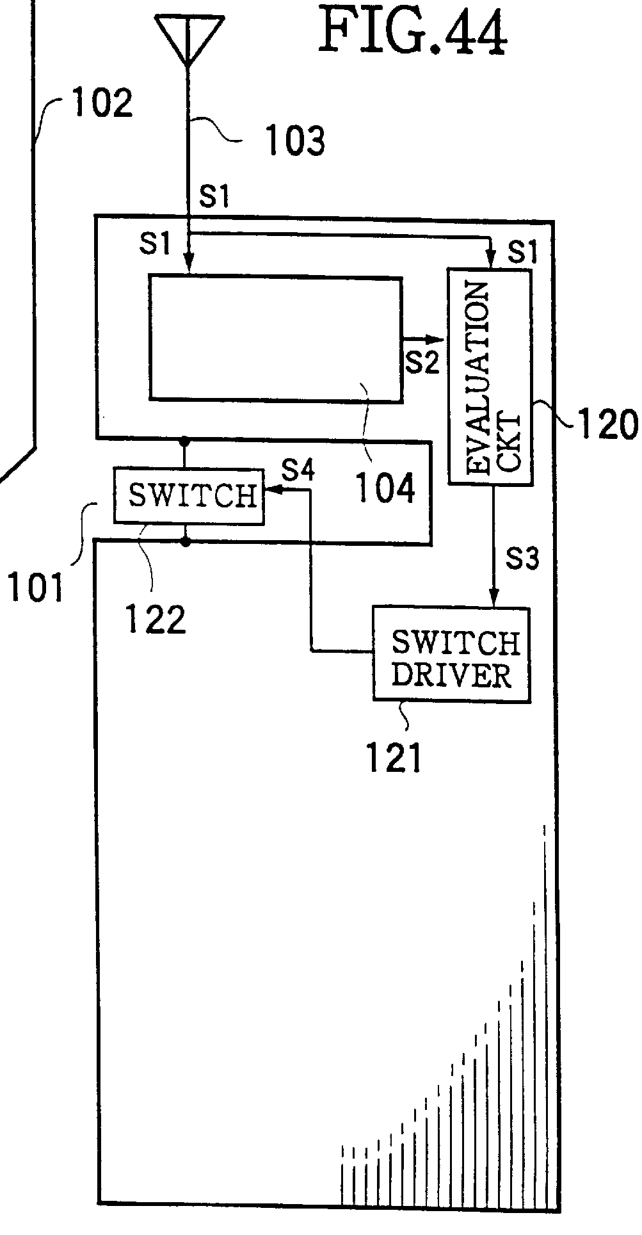
FIG. 44 shows an example of a portable radio equipment where the current distribution on the housing can be switched by an electrical switch.

FIG. 44 shows an example of a portable radio equipment where the current distribution on the housing can be switched by an electrical switch. In this embodiment, the electric wave which arrives at the portable radio equipment is received by the antenna 103, and a signal S1 received by the antenna 103 is fed to a receiving circuit 104 and a evaluation circuit 120. In the evaluation circuit 120, an error rate of an input signal S1 is detected and a transmitting and receiving state is evaluated. For example, when a time-division multiplex access is utilized for a communication system, evaluation is carried out using the input signal S1 during a time zone of no transmitting or receiving in your own portable radio equipment after confirming by an input signal S2 that a radio terminal in use by yourself is not transmitting or receiving. In such manner as mentioned above, a disturbance against the transmission and receive due to a noise generated at the time of switching can be eliminated without information being interrupted during communication.

The evaluation circuit 120 sends out a evaluation signal S3 to a switch driver 121 in terms of a signal strength of the input signal S1. The evaluation signal S3 is given on the basis of, say, a voltage, current and so on. In the switch driver 121, sent to the electrical switch 122 is a control signal S4 which instructs the electrical switch 122 to close or open the electrical switch 122 based on the evaluation signal S3 sent from the evaluation circuit 120. Upon receipt of the control signal S4, the radio-frequency electrical switch 122 provided in the proximity of an open end of the notch 101 switches over between a short-circuit and open of the open end of the notch 101.

In a practical use, a diversity system of the radio terminal is first operated at a test mode of transmission or receive. Namely, after confirming by the signal S2 that the portable radio equipment of your own is not transmitting or receiving, the evaluation circuit 120 sends out to the switch driver 121 a signal instructing make and break of the electrical switch 122 at a predetermined interval, and the respective input signals S1 when the electrical switch 122 is opened and the electrical switch 122 is short-circuited are stored as data in a memory within the evaluation circuit 120. For the two states, respective error rates of the input signals are detected and compared so as to evaluate which one is a better transmitting/receiving state.

One whose receiving state is better is chosen based on an evaluation result, and the electrical switch 122 is chosen so as to keep such a state. Then S3 is sent out to the switch driver 121 instructing to send to the electrical switch 122 and hold the signal S4 indicating the chosen state.

Accordingly, after operating at the test mode, the evaluation circuit becomes an evaluation mode for evaluating S1 for a predetermined duration of time and at a predetermined interval. Only when a transfer quality of the input signal S1 is inferior to a predetermined state, the radio terminal becomes the test mode again. It shall be appreciated that the transfer quality may be examined routinely after the predetermined duration of time elapses.

Even when the information quality deteriorates, switching the high-frequency electrical switch 122 makes possible that the portable radio equipment terminal is used with the radiation pattern being switched in accordance with the quality.

Figure 45:
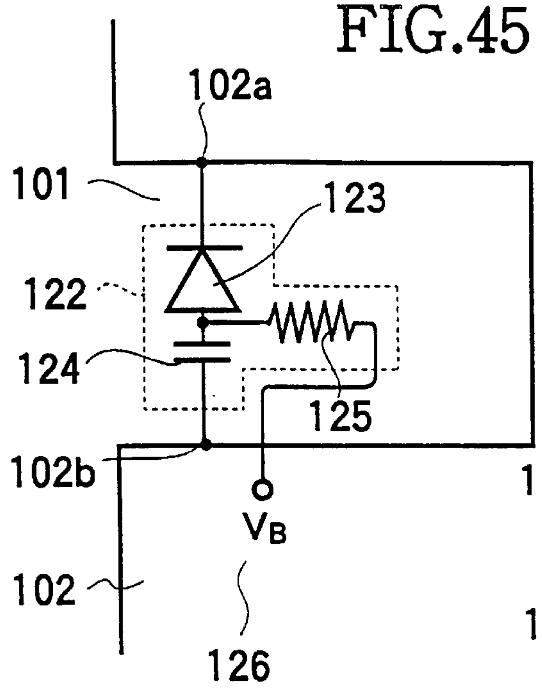
FIG. 45 shows a specific construction for the electrical switch 122.

FIG. 45 shows a specific construction for the electrical switch 122. FIG. 45 shows an enlarged view of the notch 101 provided in the housing 102. With reference to FIG. 45, a diode 123 is connected to an end of an open end of the notch 102-_a_. A resistor 125 and a capacitor 124 are connected in parallel to the diode 123. The other end of the resistor 125 is connected to a controlled potential 126 and the other end of the capacitor 124 is connected to the other end of the open end of the notch 102-_b_.

When a direct current flows through the electrical switch 122, a resistance value of the diode 123 is decreased, so that the radio-frequency current flows and the open end 102-_a_ of the notch 101 is short-circuited to the other open end 102-_b_ of the notch 101 through the capacitor 124. Moreover, the capacitor 124 prevents the direct current from flowing to the housing 102, and the capacitor 124 operates to be short-circuited against the radio-frequency current. Assuming that a voltage of the controlled potential is at a level of approximately 5 V, a value of the resistor 125 may be approximately 1K Ω and a value of the capacitor 124 may be approximately 10 pF.

Figure 46:
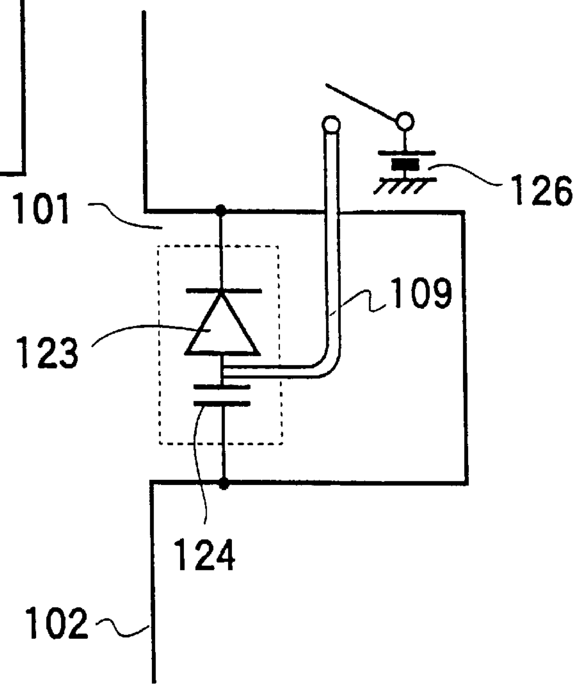
FIG. 46 shows another example of the electrical switch 122 where the resistor 125 shown in FIG. 45 is replaced with the high-resistance wire 109.

FIG. 46 shows another example of the electrical switch 122 where the resistor 125 shown in FIG. 45 is replaced with the high-resistance wire 109.

Figure 47:
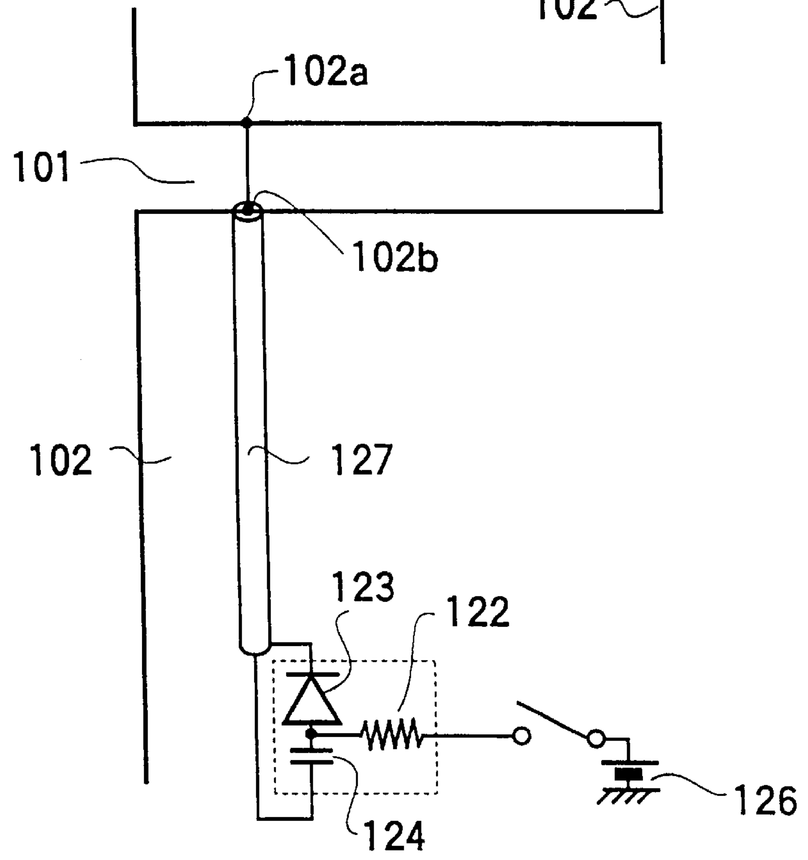
FIG. 47 shows still another example utilizing the electrical switch 122 where there is provided the radio-frequency cable 127 with length thereof being an integral multiple of λ/4.

FIG. 47 shows still another example utilizing the electrical switch 122 where there is provided the high-frequency cable 127 with length thereof being an integral multiple of λ/4. An inner conductor of the high-frequency cable is placed close to an open end 102-*a* of the notch 101, and an outer conductor of the high-frequency cable 127 is grounded at a corresponding point in the open end 102-*b* of the notch 101.

By this configuration illustrated in FIG. 47, the operation of the electrical switch 122 can be changed according to the length of the high-frequency cable 127. Namely, when the length of the high-frequency cable 127 equals to an odd-integral multiple of quarter wavelength of the frequency used for transmission or receive, the notch 101 is opened when the electrical switch 122 is short-circuited whereas the notch 101 is circuited when the electrical switch 122 is opened. When the length of the high-frequency cable 127 equals to an even-integral multiple of quarter wavelength of the frequency used for transmission or receive, the notch 101 is short-circuited when the electrical switch 122 is short-circuited while the notch 101 is opened when the electrical switch 122 is opened. As far as the electrical switch 122 is located in the vicinity of the open end of the notch 101, an effect thereof can be maintained.

Figure 48:
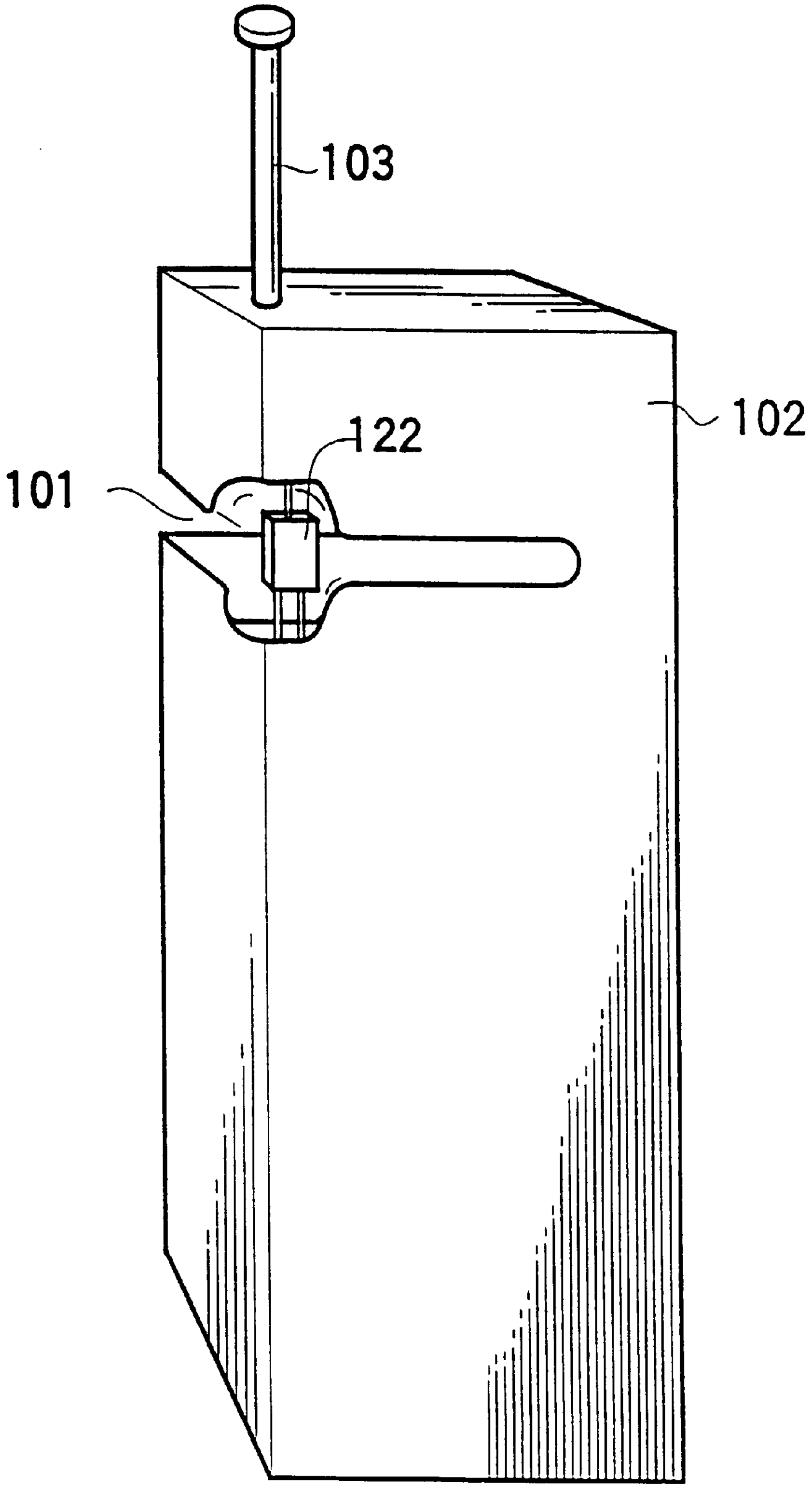
FIG. 48 shows an arrangement of the electrical switch 122.

FIG. 48 shows an arrangement of the electrical switch 122. When the electrical switch is relatively a large-sized, a part of the notch 101 may be extended in a vertical direction as illustrated in FIG. 48 so that the electrical switch 122 can be positioned within the notch 101. However, even though the electrical switch 122 is not fit perfectly within the notch 101, the operation of the electrical switch 122 may not be affected.

Embodiment No. 7

There have been shown the portable radio equipment having the notch or notches therein in order to alter the radio-frequency current distribution and improve the radiation pattern of the electric wave.

Figure 49:
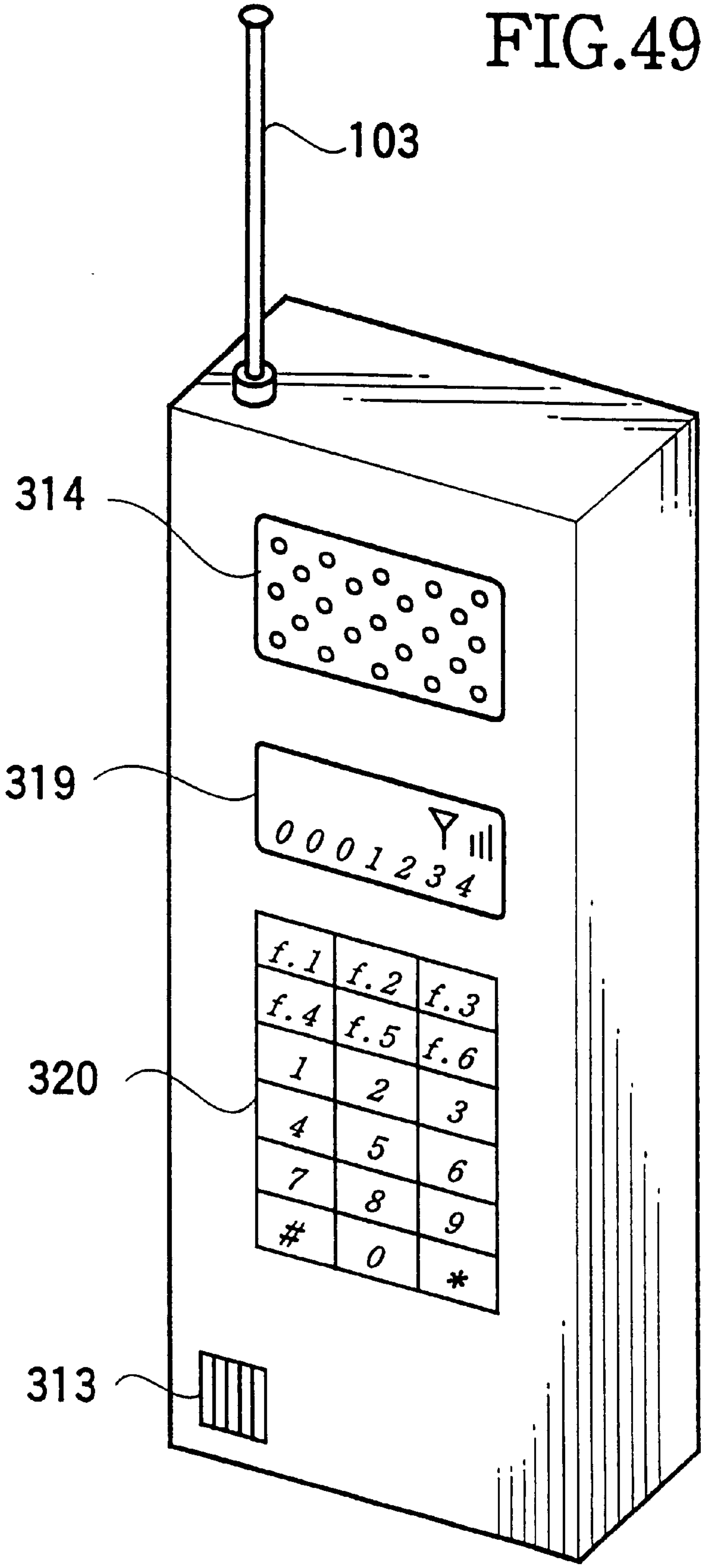

However, the portable radio equipment in practical use must be equipped with a display 320, a speaker 314, a microphone 313, a numeric key pad 320 and so on as shown in FIG. 49. The display 320 and the numeric keys 320 particularly require relatively many set of signal wires. Thus, when the notch 101 is covered with such signal wires, there may be a case where it is rather difficult to alter the distribution of the radio-frequency current by providing the notch 101 alone. However, taking action to avoid such inconvenience may result in a complicated and time-consuming task. Moreover, besides a problem of the signal wires, that such components as the display 320, speaker 314, microphone 313, numeric keys 320 and so on may cover the notch 101 may significantly reduce the effect of the notch 101.

In order to solve such problems, there are provided means for shielding the electromagnetic wave by means of a double construction which is electrically insulated and wherein the notch is not provided in the inner electromagnetic shield while there is the notch in the outer electromagnetic shield, in this seventh embodiment.

Figure 50:
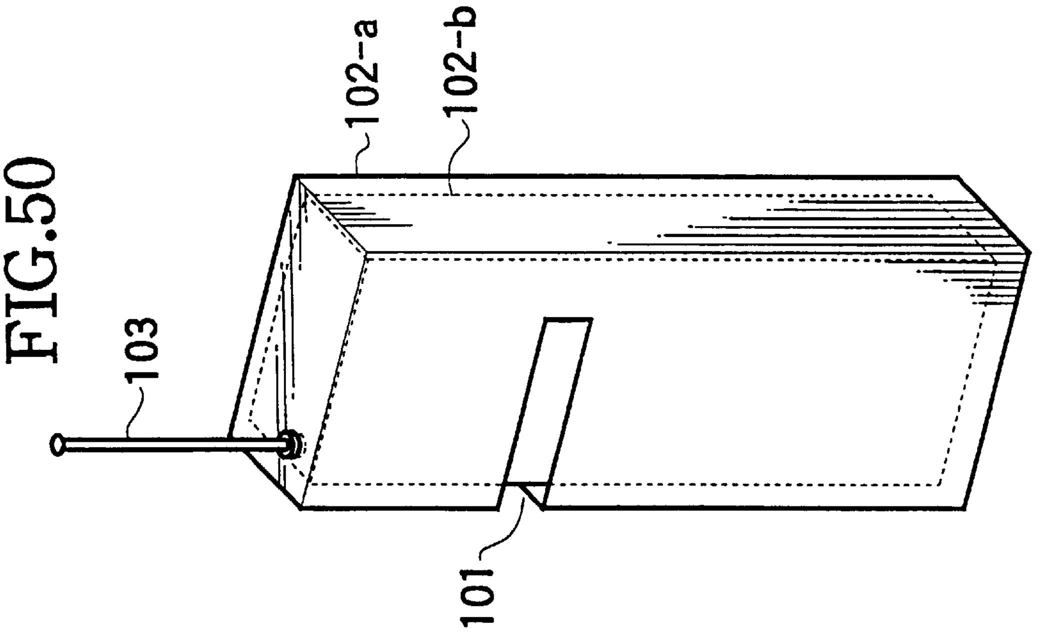
FIG. 50 shows a portable radio equipment with a double construction where there are provided an inner electromagnetic shield without the notch and an outer electromagnetic shield having notch 101.

FIG. 50 shows a portable radio equipment with a double construction where there are provided an inner electromagnetic shield without the notch and an outer electromagnetic shield having notch 101. In the same figure, there are provided a metal body 102-*a* and a metal body 102-*b* so as to form the double construction. There is provided the notch 101 in the outer metal body 102-*a*. It shall be appreciated that the metal bodies 102-*a*, 102-*b* can be anything having a shielding effect, for example, there can be considered metal with conductive coating and plating (aluminum plating, nickel plating, etc), copper, aluminum and so on, or material combined. A bag-like thing made of a metal thin film may be utilized as the inner metal body 102-*b*, and a plastic frame or the like may be utilized as the outer metal body 102-*a*.

Figure 51:
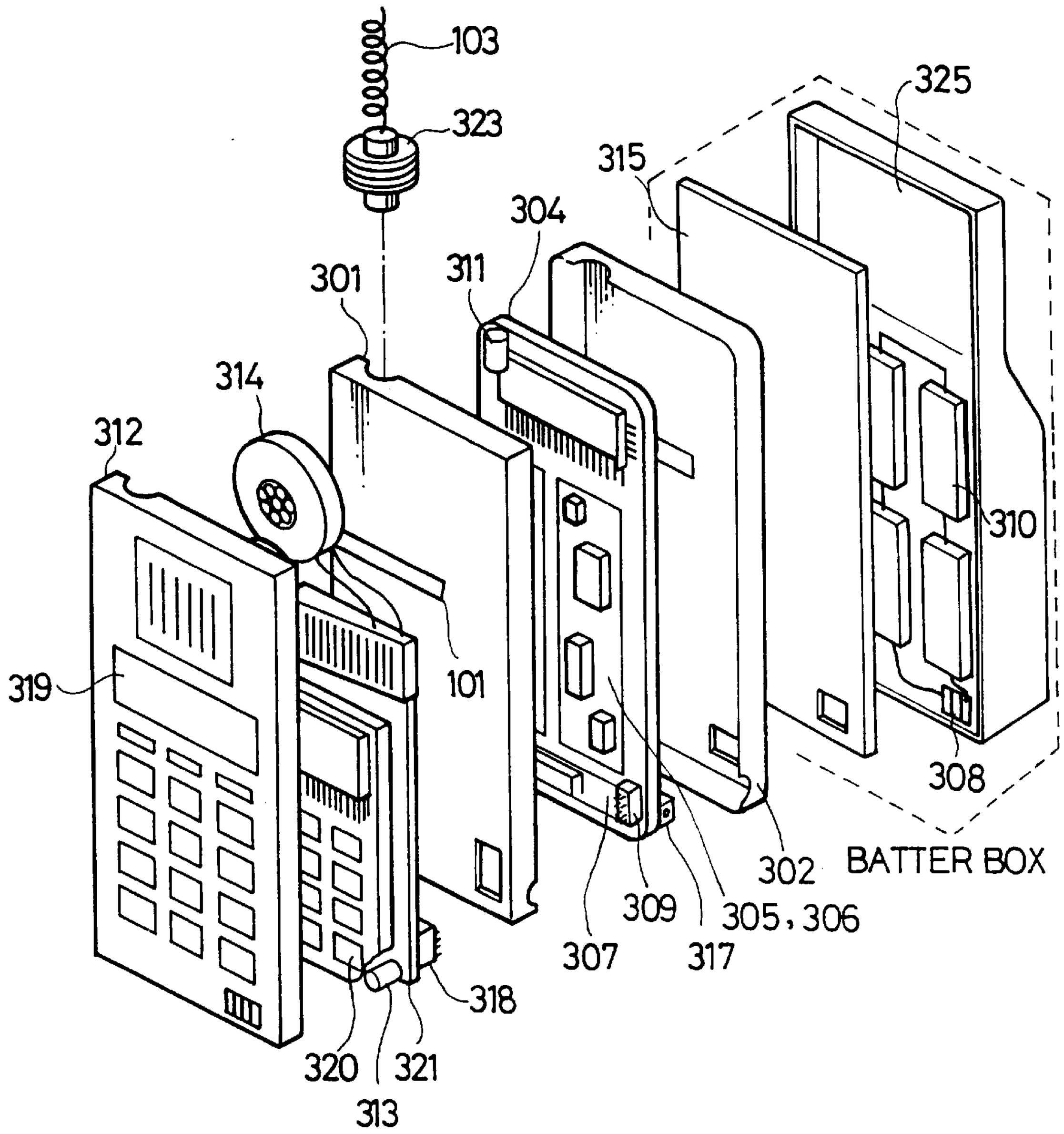
FIG. 51 shows a detailed example for the seventh embodiment shown in FIG. 50.

FIG. 51 shows a detailed example for the seventh embodiment shown in FIG. 50. With reference to FIG. 50, an internal circuit board 304 is enclosed by the metal body 301 and 302. In the circuit board 304, there are mounted a transmitting portion 305 and a receiving portion 306, a control circuit, low-frequency circuit, a power supply portion 307 and a feed portion to the antenna. The notch 101 is provided in the metal body 301, 302. The metal body 302 may be such that, for instance, the conductive coating is applied to a frame formed by a plastic and thereon the nickel is plated. The notch 101 can be formed by masking on the plastic frame when applying the conductive coating. The notch 101 can be formed in the metal body 301 in the same manner. No plating is performed on mounting portions for a connector, the antenna, the microphone and so on. The conductive coating is applied to a hole for the feed portion of the antenna 103. Accordingly, the plated conductive portions in the metal bodies 301, 302 are electrically insulated in non-conductive coated portions of Junction of the metal bodies 301, 302.

Figure 52:
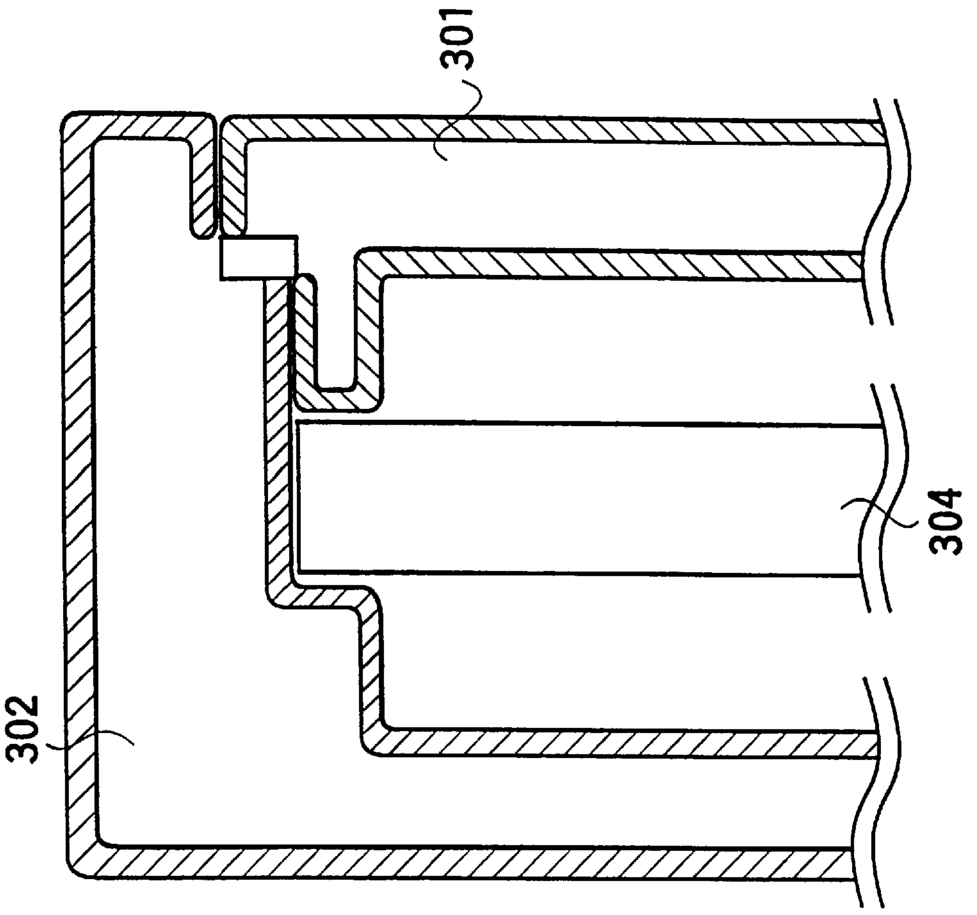
FIG. 52 shows a cross section of the junction of the metal bodies 301 and 302.

FIG. 52 shows a cross section of the Junction of the metal bodies 301 and 302. The inner part and outer part of the metal body which is constructed by the metal bodies 301 and 302 are covered with conductive members such as plating, and the these conductive members are electrically insulated. Therefore, the metal bodies 301 and 302 must be connected so that the inner part and the outer part thereof remain insulated to each other (see FIG. 53).

With reference to FIG. 51, on the body 301 there is provided a board 321 in which the display 319 and an electrical line of a key pad 320 are mounted. The board 321 is arranged so as not to interfere with the effect realized by the notch 101 and in a manner that the board 321 is not overlapped with the position of the notch 101. In a similar way, the speaker 314 is mounted to the body 301 so that the speaker 314 is not overlapped with the position of the notch 111.

There are provided some holes in the body 301, so that connectors connecting the board 321 and a control circuit 307 and jacks 37 connecting external plugs such as an earphone and a head set can be connected to the control portion 307. In particular, the antenna 103 is also connected to a feed point through a hole provided in the body 301.

In this embodiment, there is used a λ/4 monopole antenna of a spring-type device having a very thin radius. The antenna is fixed on the conductive body by the connector 323. The reference numeral 311 indicates an antenna connector.

The reference numeral 325 and 315 construct a battery box, and the conductive member such as plating is applied up to and point of the notch 101 so as to be electrically shielded. The battery box is connected to the bodies 301, 302 through a power connector 308. The bodies 301 and 302 are covered with a plastic body 312 and a battery box panel 325 so as to constitute a portable radio equipment.

Figure 54:
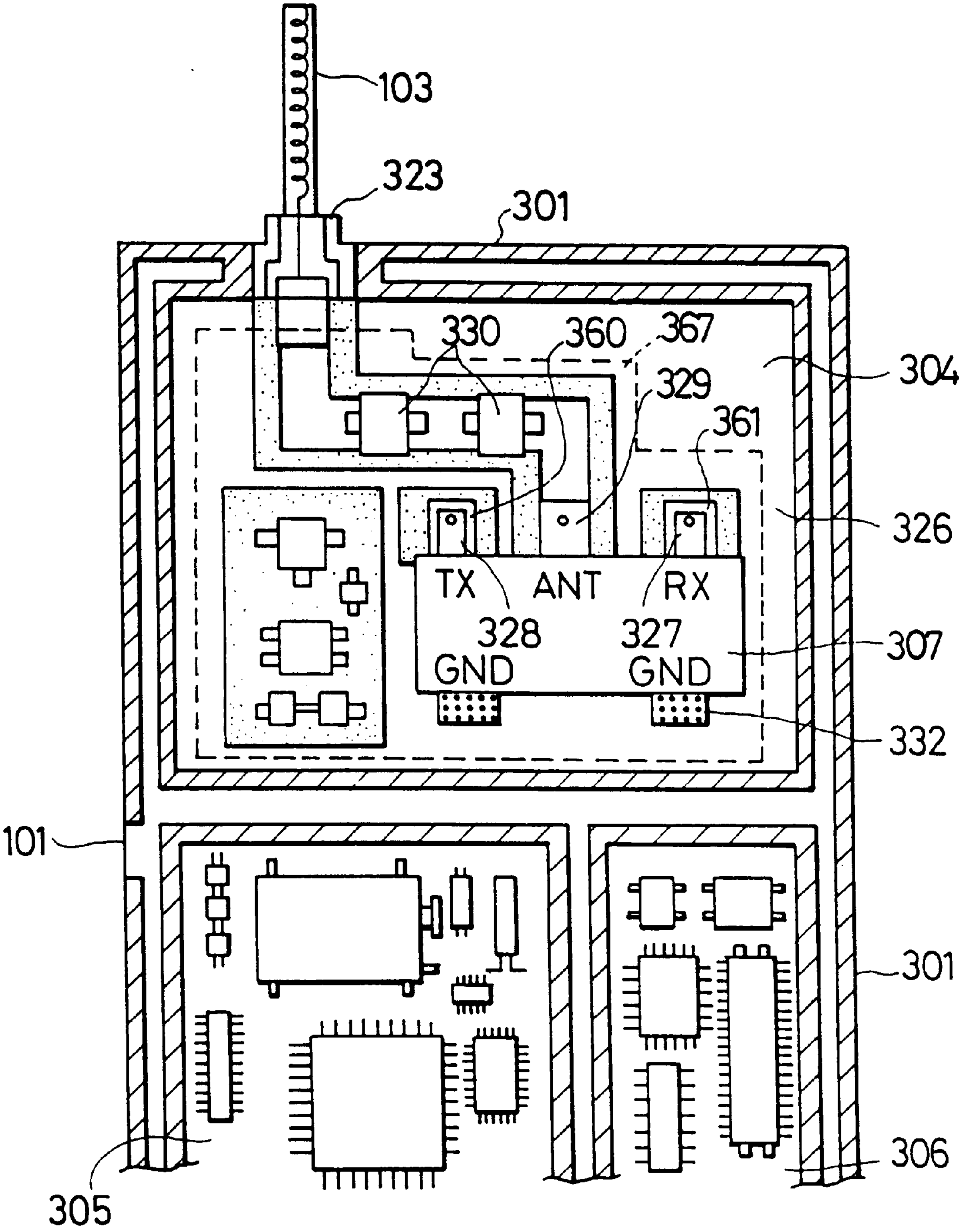
FIG. 54 shows an enlarge view of the antenna and the vicinity of high-frequency portion shown in FIG. 51.

FIG. 54 shows an enlarge view of the antenna and the vicinity of high-frequency portion in the seventh embodiment shown in FIG. 51.

A ground terminal 332 of an antenna duplexer or switch 307 is short-circuited to a ground 326 of the board, and a circuit 367 in the vicinity of the antenna 103 and the antenna duplexer or switch 307 is enclosed by the metal body 302 mounted on the back of a ground 326, the metal body 301 and the board 304 so as to be shielded. The board 304 is a multiple layer type board, and in order to increase the shield effect of the board there are provided through holes around the ground 326.

A transmit terminal 328 and a receive terminal 327 of the antenna duplexer or switch 307 are connected to a transmitting portion 305 and a receiving portion 306, respectively, through terminals 360, 361 on the board and wires on a board below the ground 326. Other wires used for other control pass through these through holes. It is to be noted that when an interval is set to a distance sufficiently smaller than the wavelength, there will be caused no influence over the shielding effect. The ground 326 has contact with an internal conductor of the metal body 302 but does not have contact with an external conductor of the metal body 302. The antenna 103 is connected to an antenna terminal 327 of the antenna shared device 307 through a matching circuit 330 for the antenna and feeder.

Figure 53A:
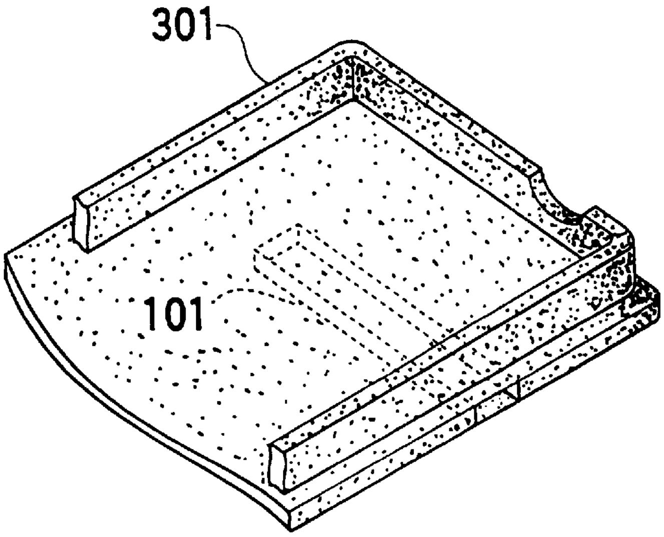
FIG. 53 shows a development illustrating double shields.
Figure 53B:
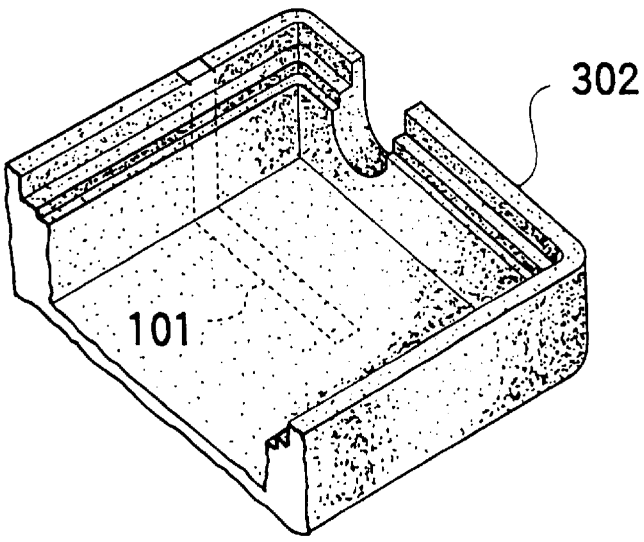

FIG. 53 shows a detailed figure to show the bodies according to the above seventh embodiment.

The bodies 301 and 302 are made of dielectric such as a plastic, and an electric conductive material is fixed, applied or plated on a surface thereof so as to serve as an electromagnetic shield. Especially in this seventh embodiment, the electromagnetic shield is provided in double construction so as to improve the radiation pattern effectively. In the double construction of the electromagnetic shield, a conductive portion in each double shield is not electrically connected to each other. A portion a and portion a' shown in the cross section and a notch portion, that are, portion shown with no hatching in the figure are such that plating is not performed by means of a masking or the like.

The body 302 is designed to be inserted to the body 301, and when inserted the body 302 is divided into an internal plating portion and a notch-made external plating portion by the portion a and the portion a' in terms of the high frequency; the plating is carried out in a manner that the internal portion comes in contact with the external portion in a portion where the antenna is inserted. The notches 101 are made on the body 301 and the body 302 so that the notches are combined together when inserted.

In this seventh embodiment, the electrical insulation between the internal conductor and the external conductor is not absolutely necessary, and a part thereof may be electrically contacted as will be described below.

Figure 55A:
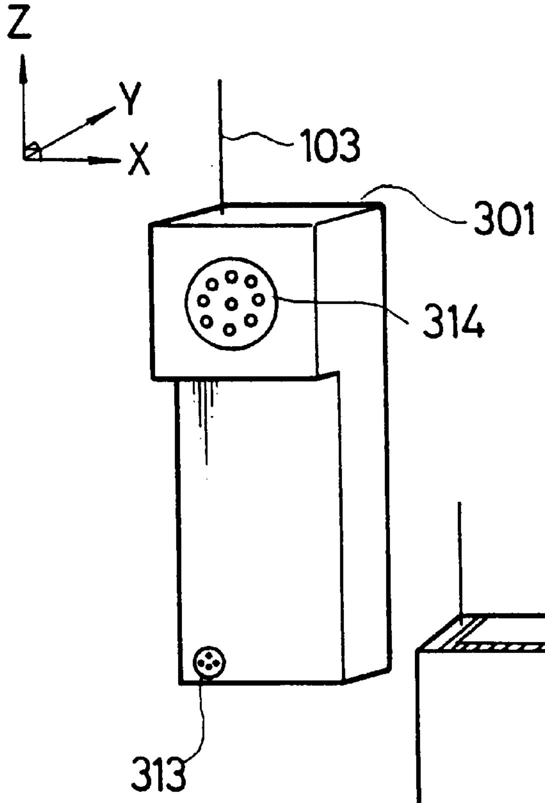
FIG. 55A shows a portable radio equipment having the metal body and internal circuits therein.
Figure 55B:
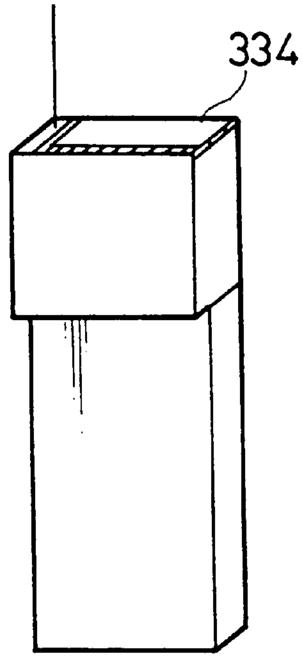
Figure 55C:
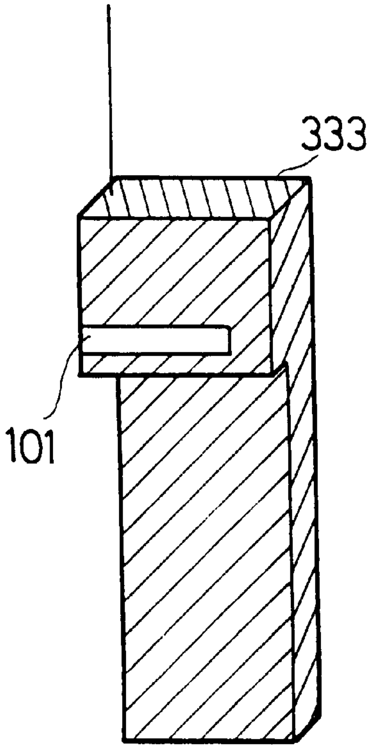
FIG. 55C shows the portable radio equipment having the notch.
Figure 56A:
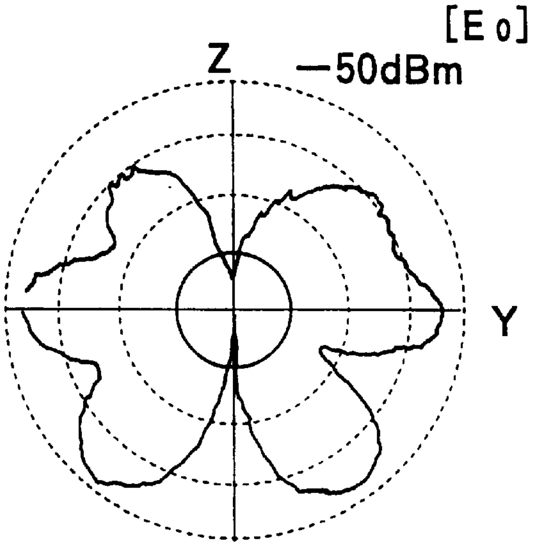
FIG. 56A and FIG. 56C show the result for the portable radio equipment having notch therein and FIG. 56B and FIG. 56D show the result for the portable radio equipment having no notch.
Figure 56B:
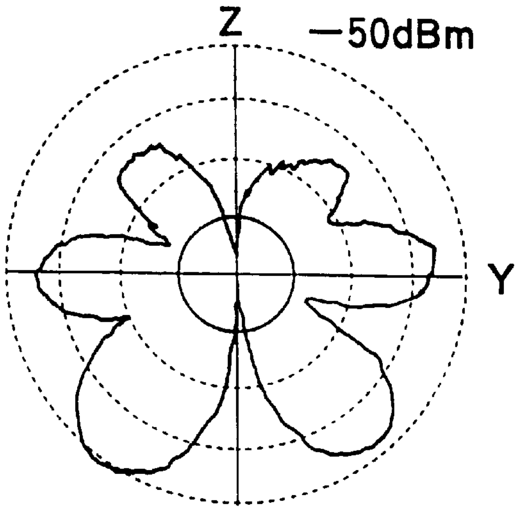
Figure 56C:
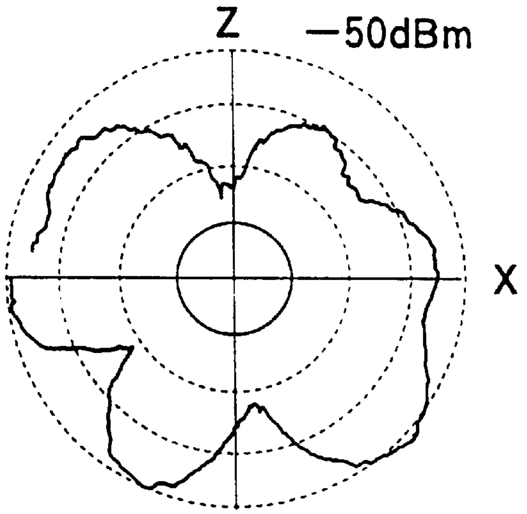
Figure 56D:
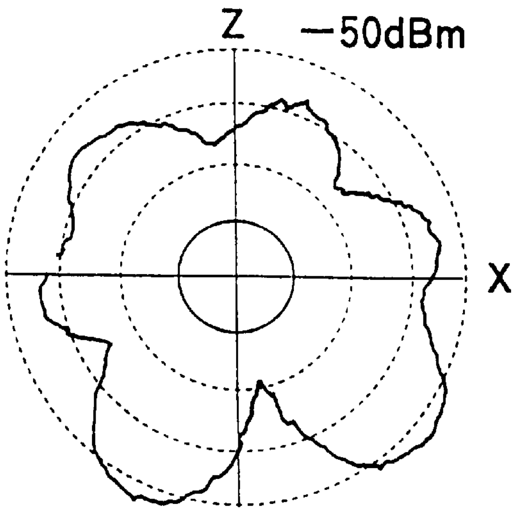

FIG. 55 shows a model, used in an experiment carried out by the applicants, where there is provided the notch in the metal body containing the metal body having radio circuits therein. FIG. 55A shows a portable radio equipment having the metal body and internal circuits therein; FIG. 35B shows the portable radio equipment where the external body is wrapped with a paper board with copper foil on; FIG. 35C shows the portable radio equipment having the notch. Assume that there is no radio-frequency point between the external body and the internal body.

FIG. 56 shows results of the radiation pattern for the portable radios shown in FIG. 55. FIG. 56A and FIG. 56C show the result for the portable radio equipment having notch therein and FIG. 56B and FIG. 56D show the result for the portable radio equipment having no notch. Observing the results, the maximum directional gain comes closer to the horizontal direction. Accordingly, it is observed that the radiation pattern can be improved by providing the notch and without changing the internal circuits at all. It shall be appreciated that even though the external conductor comes in contact with the internal conductor at an antenna feed portion, radiation from the internal metal body is reduced on account of Faraday effect and there can be obtained the effect of having the notch in the external body.

Figure 71:
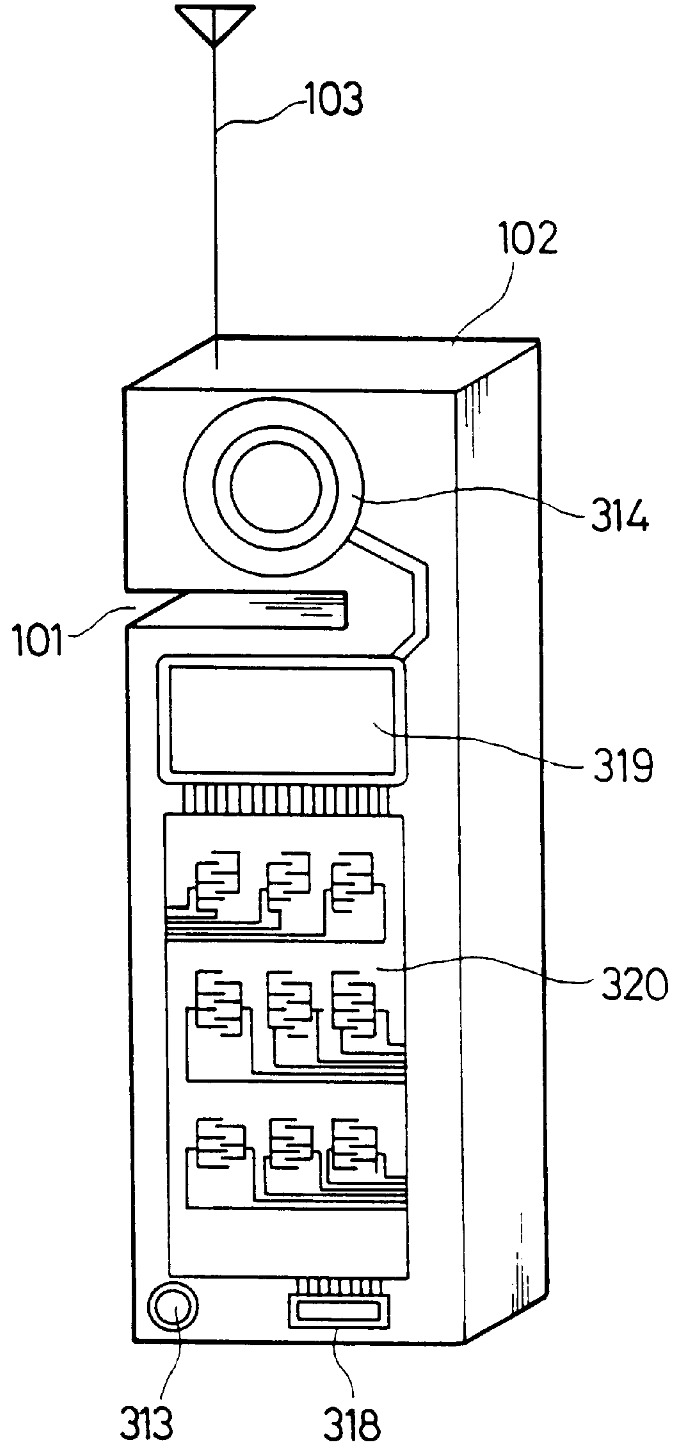
FIG. 71 shows an example of the portable radio equipment combining the notch 101 and the internal circuits.

FIG. 71 shows an example of the portable radio equipment combining the notch 101 and the internal circuits. The notch 101 is provided Just below the speaker 314 in which there are relatively fewer signal wires as compared to the display 319 and the switch 320 for the numeric keys. The signal wires are gathered together to be guided into the conductive body by way of a connector 318.

Figure 72:
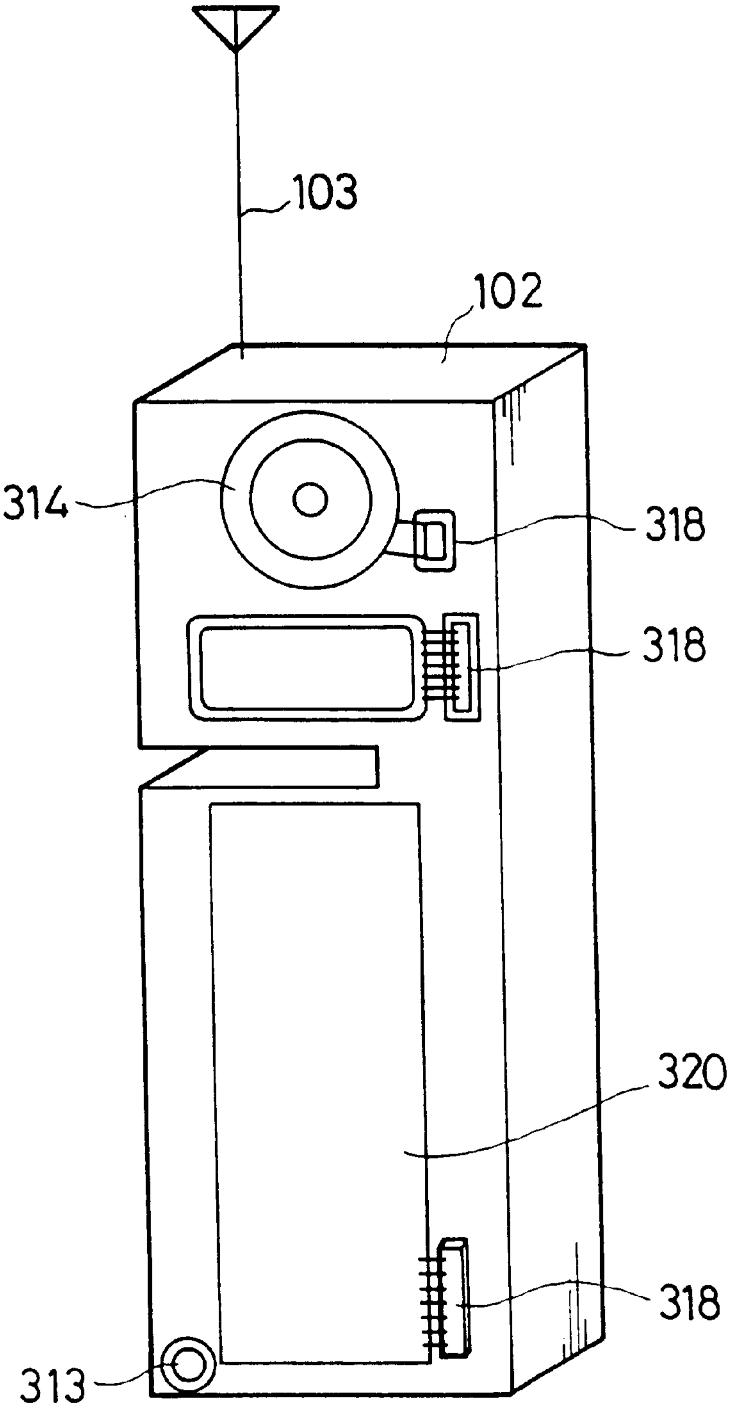
FIG. 72 shows another example of the portable radio equipment combining the notch 101 and the internal circuits.

FIG. 72 shows another example of the portable radio equipment combining the notch 101 and the internal circuits. The signal wires for the display 319 and the the numeric keys switch 320 are guided into the conductive body in the vicinity thereof by way of respective connectors thereof 318. The notch 101 is provided between the display 319 and the numeric keys switch 320.

Embodiment No. 8

In the future, there will be an occasion that the portable radio equipment is so compact-sized and oftentimes is placed and carried in a chest pocket. However, the portable radio equipment is susceptible to a human body and thus a radiation characteristic of the equipment fluctuates significantly. It is already known by a study result carried out by the inventors of the present invention that a radiation efficiency of an electric-field antenna decreases when the antenna approaches to the human body. Thus, there is a problem where the radiation characteristic deteriorates due to an influence of the human body when the portable radio equipment is carried in the chest pocket or the like.

Though the antenna is designed to be placed further away from the human body, the antenna may accidentally faces up closer to the human body instead as far as the portable radio equipment is placed in the chest pocket. In this connection, a direction of the antenna need be kept in a determined direction. However, it is not realistic to force a user to put the portable radio equipment in one fixed direction every time the equipment is put in the chest pocket of the user. Moreover, when the portable radio equipment becomes more and more compact-sized the antenna approaches ever close to the head of the human body. In this case, it is already confirmed by the inventors of the present invention that the radiation characteristic of the equipment is greatly influenced by the human body.

When communicating information using the portable radio equipment having a display thereon, conventionally the display is often located near a center of the equipment so that the portable radio equipment must be taken out of the chest pocket to see the display. To alleviate such troublesome action, there are considered the following embodiments.

Figure 57A:
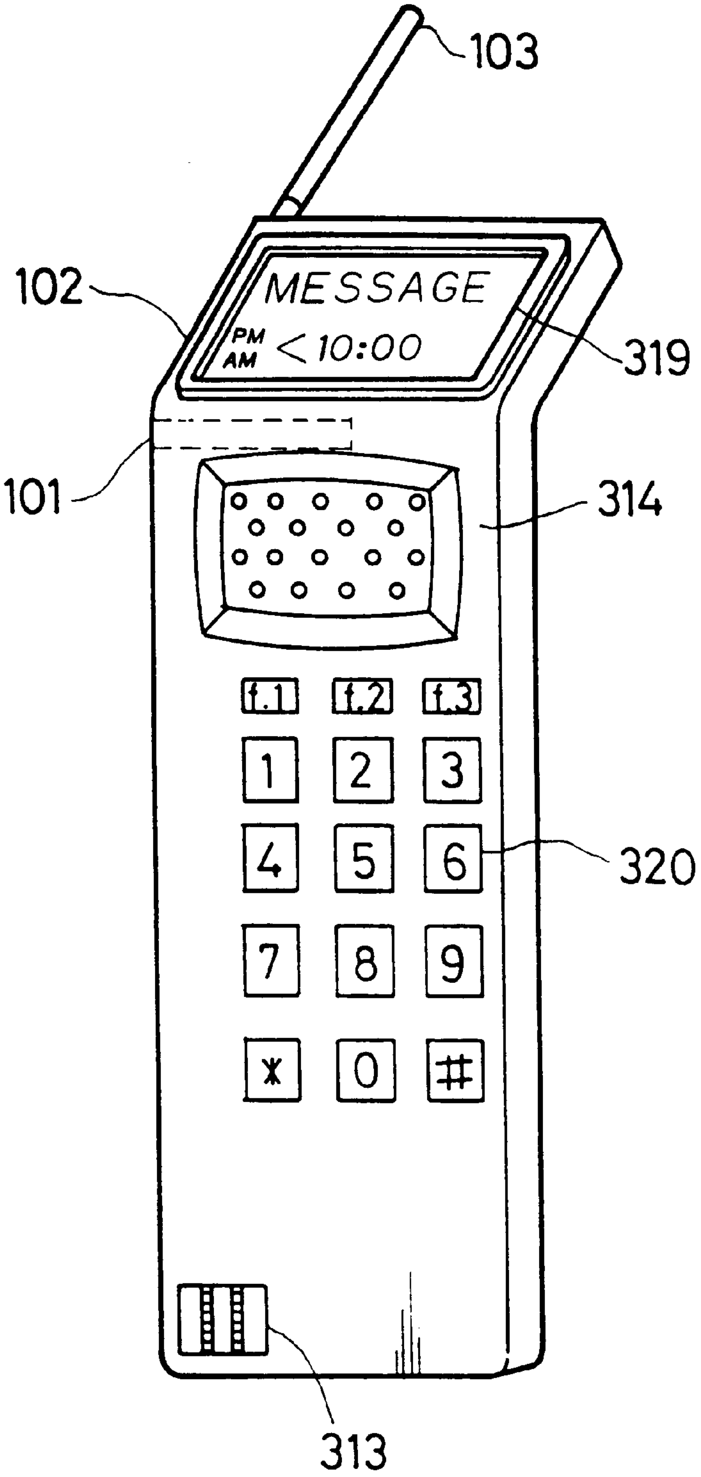
FIG. 57A shows an example of the eighth embodiment using a monopole antenna which is approximately λ/4 long; a cover frame of the portable radio equipment is bent between a speaker 314 and a display 319 and the notch 101 is provided therebetween.
Figure 57B:
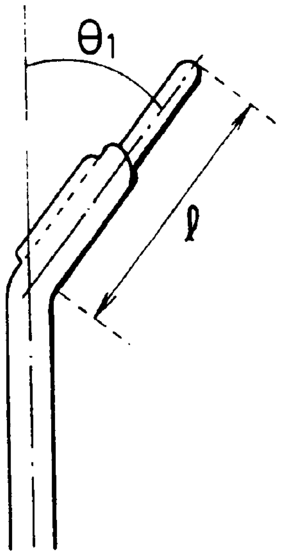
FIG. 57B shows a side view of the portable radio equipment shown in FIG. 57A.

FIG. 57 shows an example of the eighth embodiment using a monopole antenna which is approximately $\lambda/4$ long. A cover frame of the portable radio equipment is bent as illustrated in the figure between a speaker 314 and the display 319 and the notch 101 is provided therebetween. As shown in FIG. 57B, an angle bent $\theta$ is for example an approximately 30 degrees from the vertical line. The antenna 103 is mounted on top of the housing along the same bent direction with the display 319 mounted on the conductive body. The antenna 103 is covered with an elastic dielectric such as vinyl radome and an element in the monopole antenna is made of a very thin spring or wire whose diameter is, say, approximately λ/100. A distance between a transmitting unit and a receiving unit is approximately 15 cm though the distance shall vary depending on a shape of the portable radio equipment.

Figure 58A:
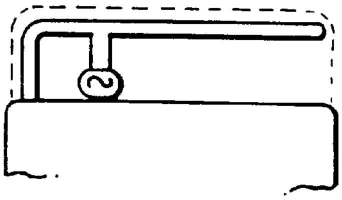
FIG. 58A shows a top view thereof.
Figure 58B:
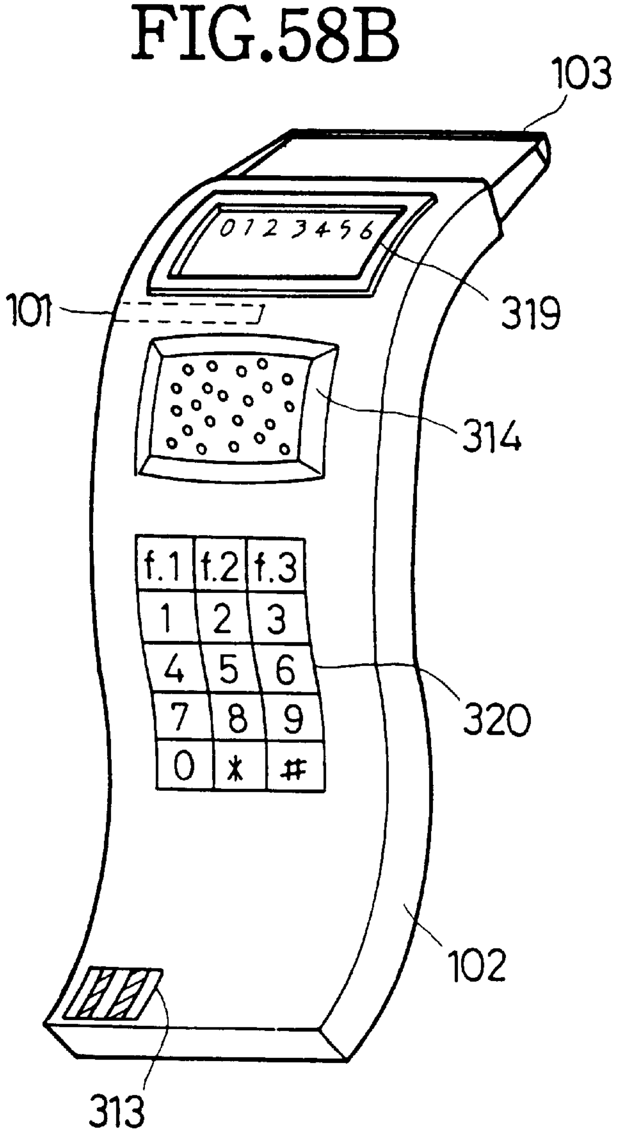
FIG. 58B shows a perspective view thereof.
Figure 58C:
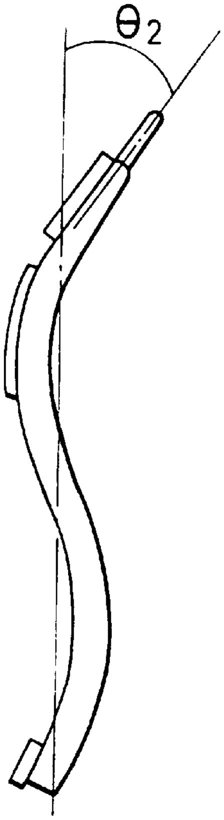
FIG. 58C shows a side view thereof.

FIG. 58 shows a portable radio equipment having the notch 101 and a meandering shape viewed from a side thereof. FIG. 58A shows a top view thereof; FIG. 58B shows a perspective view thereof; FIG. 58C shows a side view thereof. The antenna 103 may be an inverted F antenna for instance. The antenna 103 can be made of a conductor wire whose diameter is approximately 1/100 of antenna diameter, or can be made by constructing a strip line on the dielectric board by means of etching or the like.

Figure 59A:
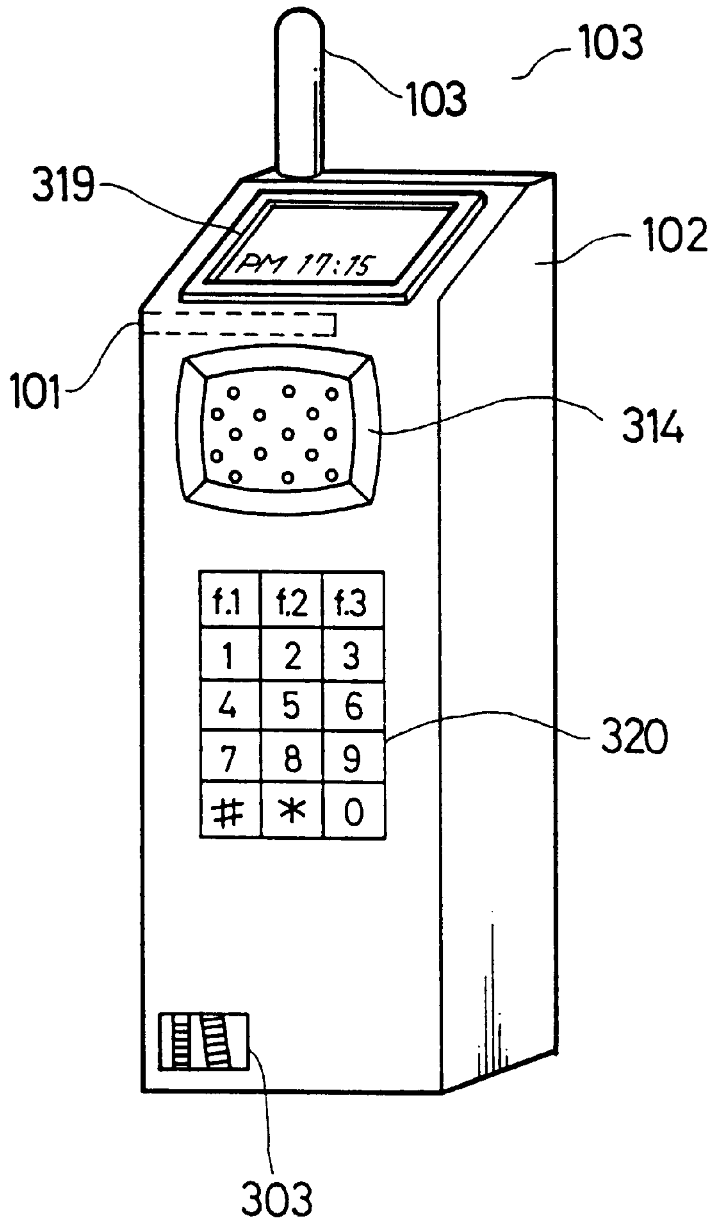
FIG. 59A shows a portable radio equipment having the notch 101 where the top surface thereof is tilted and the display 319 is mounted on the tilted top surface.
Figure 59B:
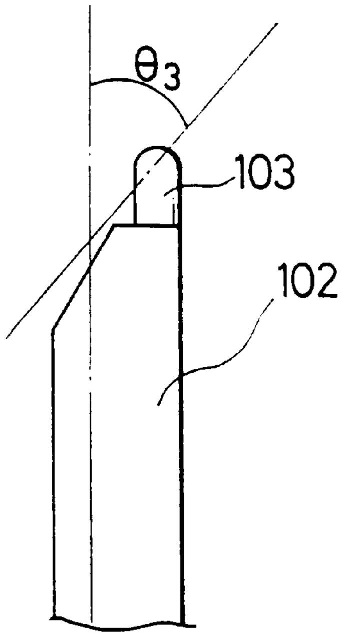
FIG. 59B shows a side view of the portable radio equipment shown in FIG. 59A.

FIG. 59A shows a portable radio equipment having the notch 101 where the top surface thereof is tilted and the display 319 is mounted on the tilted top surface. FIG. 59B shows a side view of the portable radio equipment shown in FIG. 59A. The antenna 103 utilizes, for instance, a helical antenna covered with the radome and is disposed parallel to a longitudinal axis of the housing.

Figure 60A:
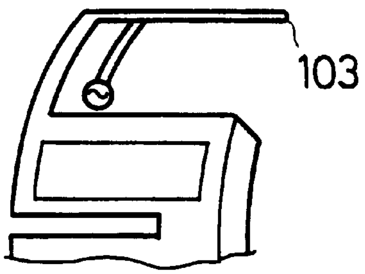
FIG. 60A shows a portable radio equipment having the notch 101 where the housing thereof can be folded.
Figure 60B:
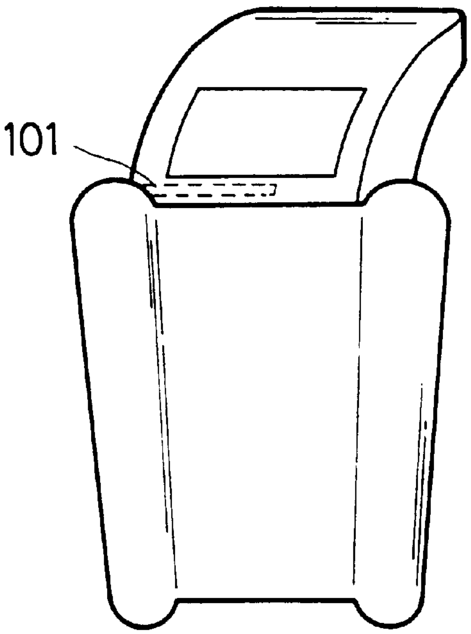
FIG. 60B shows when the portable radio equipment is folded.
Figure 60C:
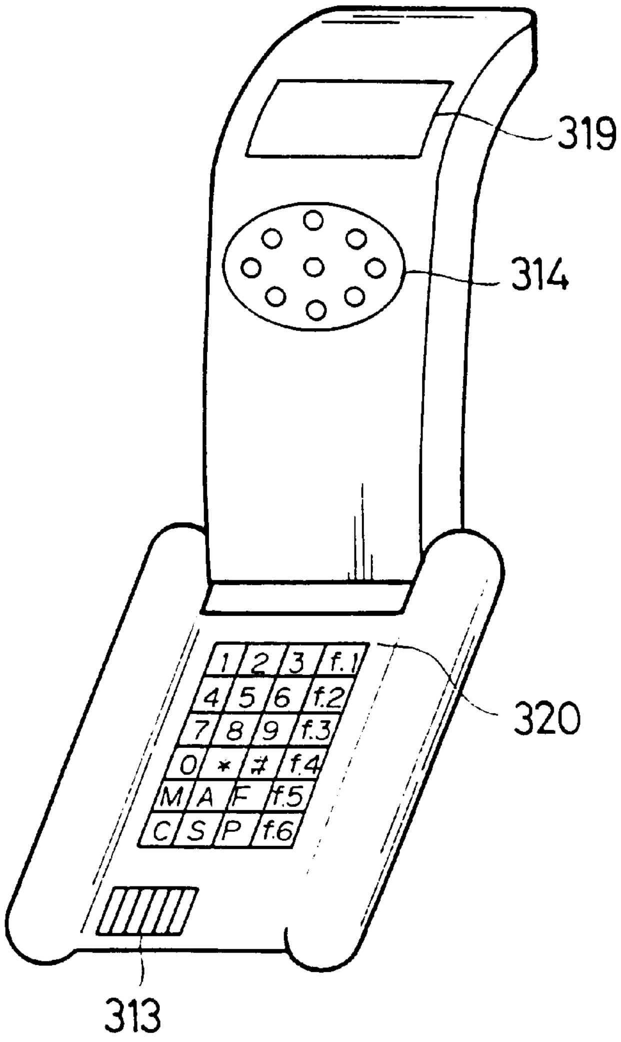
FIG. 60C shows when the portable radio equipment is opened.

FIGS. 60A to 60C show a portable radio equipment having the notch 101 where the housing thereof can be folded. FIG. 60B shows when the portable radio equipment is folded; FIG. 60C shows when the portable radio equipment is opened. In this embodiment illustrated in FIG. 60, there is employed the inverted F antenna. In FIG. 60B and FIG. 60C, a pair of inflated cylindrical-shape portion at both sides of a lower portion of the housing is a battery box.

Though transmit and receive portions are becoming further compact and light thanks to the ever-advancing integration technology, while the integration is hard to be realized in a battery serving as a power source for the portable radio equipment and a weight thereof occupies most of a total weight of the equipment. In this embodiment represented by FIGS. 60A to 60C when the fold-type radio equipment with the housing thereof open is placed on a flat surface, the equipment can sit in quite a stabilized manner. Since the antenna is placed on an upper position of the equipment and the equipment sits stabilized, it is convenient to transmit and receive the electric wave through the antenna. Moreover, when the fold-type portable radio equipment is held by a hand, the equipment is naturally held at the lower portion having the battery by the hand so that the antenna is in a position away from the human body especially from the hand, thus influence of the hand against the antenna being reduced.

Figure 61A:
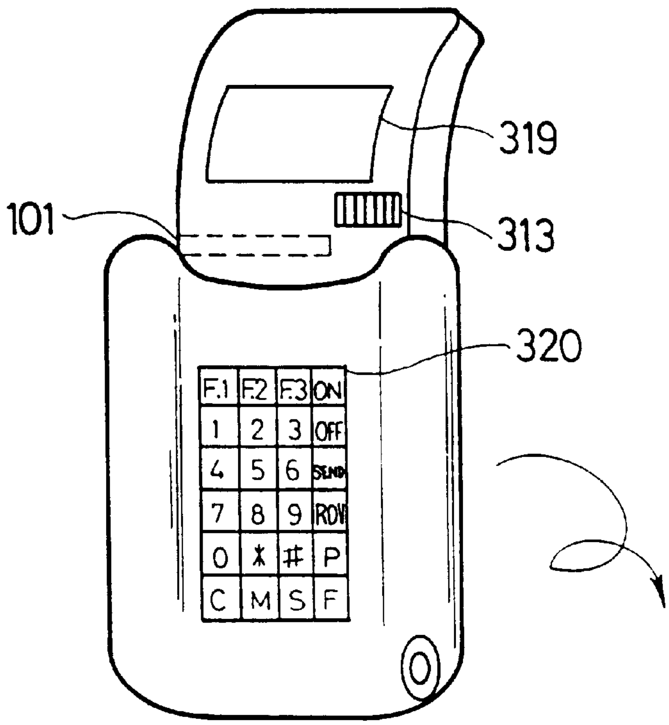
FIGS. 61A and 61B shows another example of the fold-type portable radio equipment where the battery box is arranged next to the keyboard 320.
Figure 61B:
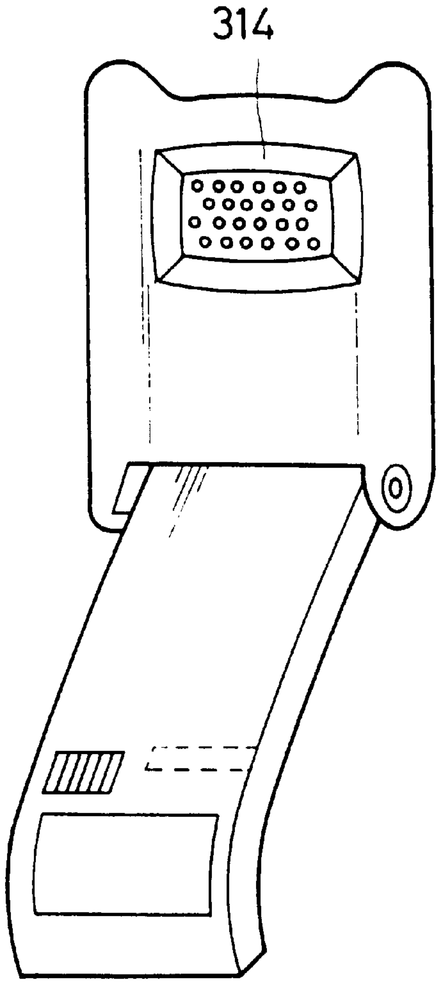

FIG. 61 shows another example of the fold-type portable radio equipment where the battery box is arranged next to the keyboard 320. With reference to FIG. 61, the position of the microphone and speaker is opposite compared to the previous embodiments. In this embodiment, dialing is performed in a folded position. The antenna used is the inverted F antenna and is provided on a printed board by etching.

By configuring the microphone and speaker in a reverse position, a content of the display can be confirmed without folding a folding portion of the body of the equipment and even the equipment is held parallel to the human body, thus giving the same effect as in the previous embodiments.

Embodiment NO. 9

There is a case where an external input-output terminal such as a earphone terminal, an external power terminal and an external microphone terminal is provided on the body of the portable radio equipment. When an external system is connected to the terminal, it is confirmed by the inventors of the present invention that the radiation characteristic deteriorates since the radio-frequency current flows through the external system.

In order to solve such a problem, the following configuration is considered.

Figure 62:
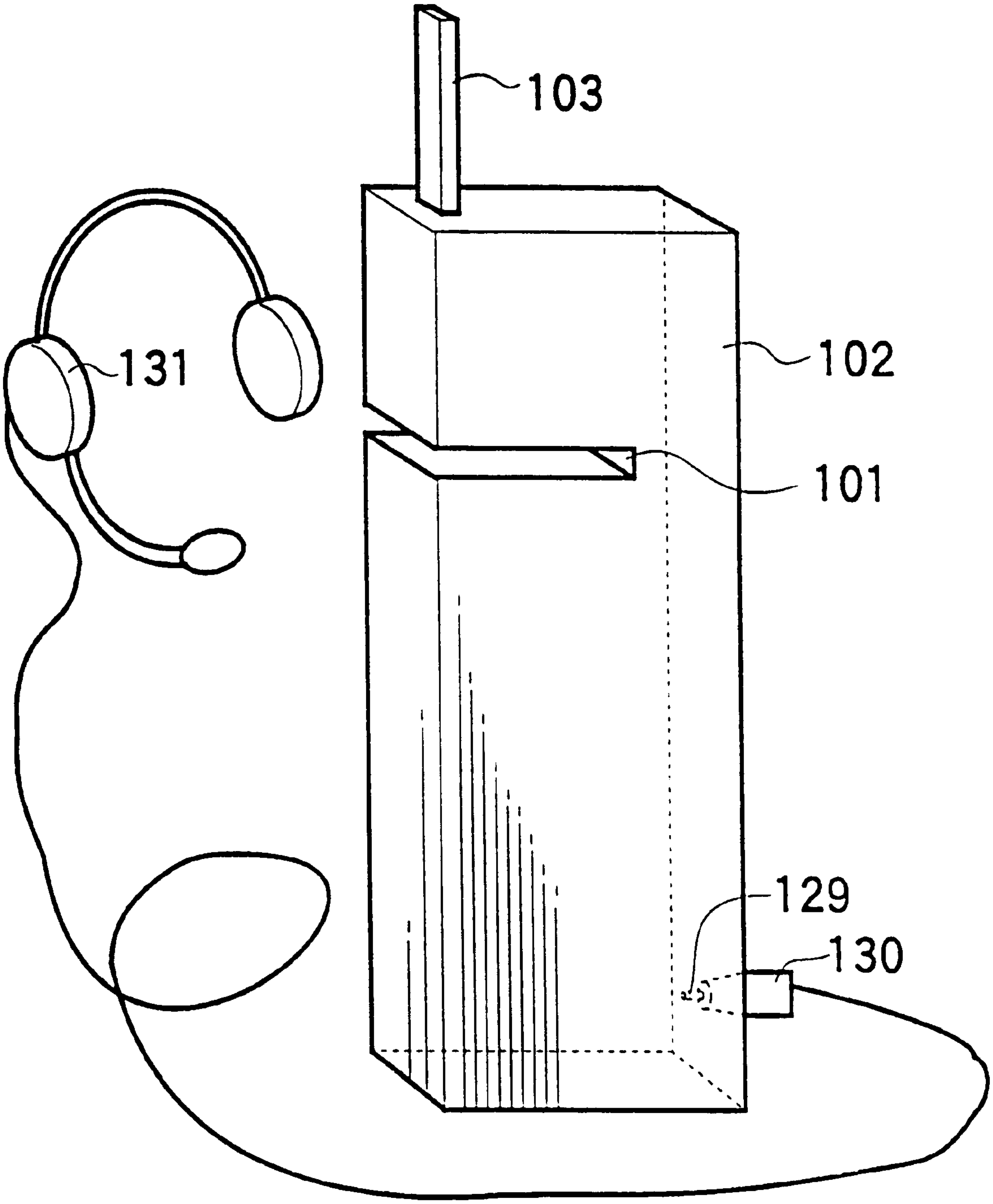
FIG. 62 shows a portable radio equipment having an external input-output terminal therein where a plug 129 thereof is provided below the notch 101 and at a lower side of the housing.

FIG. 62 shows a portable radio equipment having an external input-output terminal therein where a plug 129 of the earphone and headphone or the like is provided below the notch 101 and at a lower side of the housing if the longitudinal direction of the equipment is held vertically. When there are provided a transmitting piece and a receiving piece on the portable radio equipment body, a jack 130 which is plugged in the plug 129 not only sends the transmit-receive signal but also serves as a switch by which the signal to the transmitting-receiving pieces mounted on the portable radio equipment body can be cut off.

Figure 63A:
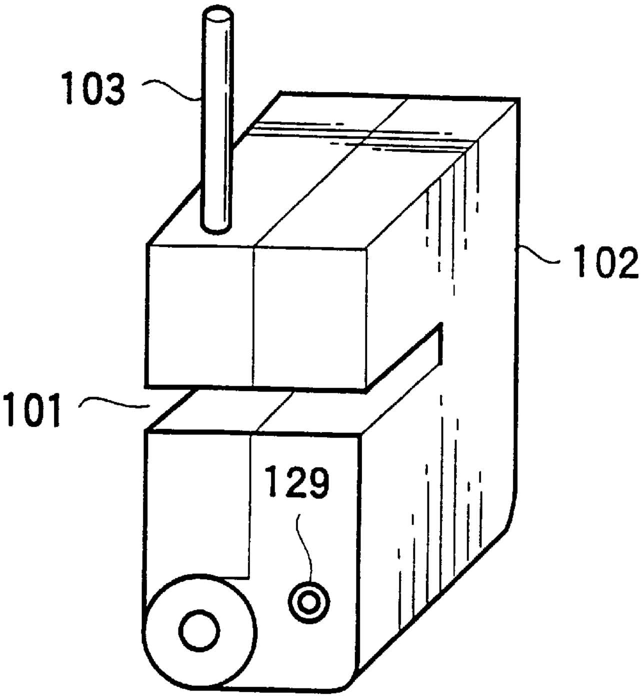
FIG. 63A and FIG. 63B show still another example of the fold-type portable radio equipment having the external input-output terminal.
Figure 63B:
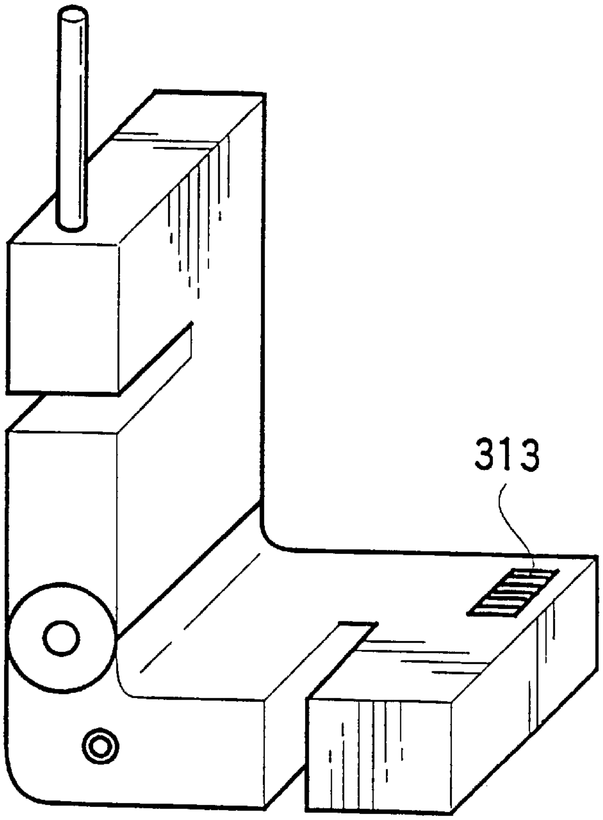

FIG. 63A and FIG. 63B show still another example of the fold-type portable radio equipment having the external input-output terminal. The Jack 129 is provided in an opposite side of the body having the notch 101 against the antenna 103, regardless of the folded or open positions. If the notch 101 is provided in an upper-half portion of the fold-type portable radio equipment and a second notch is not provided in a corresponding lower-half portion, the radio-frequency current may be distributed over the corresponding portion in the lower-half portion of the housing so that the radiation pattern unwantedly fluctuates. Thus, by providing such notch 101 in the lower-half portion too as in FIG. 63B, such a problem can be solved when the fold-type portable radio equipment is in a folded position. Then, the communication is carried out using the earphone or microphone 313.

Embodiment No. 10

Figure 64:
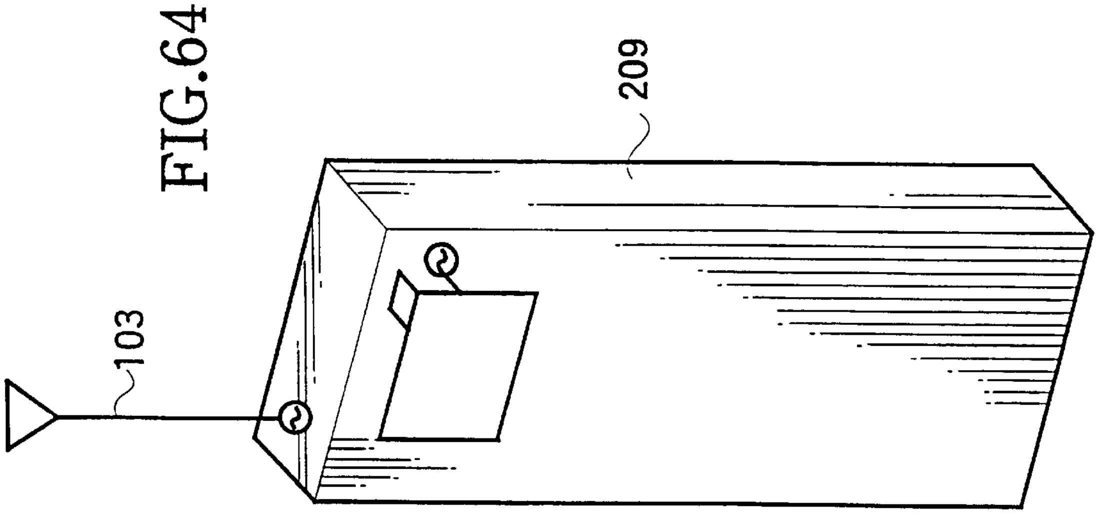
FIG. 64 shows a portable radio equipment where there is utilized a built-in miniature antenna such as the inverted F antenna suitable for a strong electric field and a waiting state, and there is also utilized a monopole antenna which is approximately a half-wavelength long and is pulled up for usage thereof at a weak electric field and for a communication purpose.

FIG. 64 shows a portable radio equipment where there is utilized a built-in compact (miniature) antenna such as the inverted F antenna suitable for a strong electric field and a waiting state, and there is also utilized a monopole antenna which is approximately a half-wavelength long and is pulled up for usage thereof at a weak electric field and for a communication purpose. In this case, a direction of the minimum directional gain is known to be directed downwardly, thus causing a problem considering the fact that the electric wave generally arrives from a horizontal direction.

A diversity antenna branch in current use is such that one is the monopole antenna which is approximately quarter-wavelength long and the other is the inverted F antenna, as shown in FIG. 64. In this case, each operational gain between the two antenna differs from the other's, so that even if a correlation factor between the antennas is low a high diversity gain can not be obtained.

Figure 65:
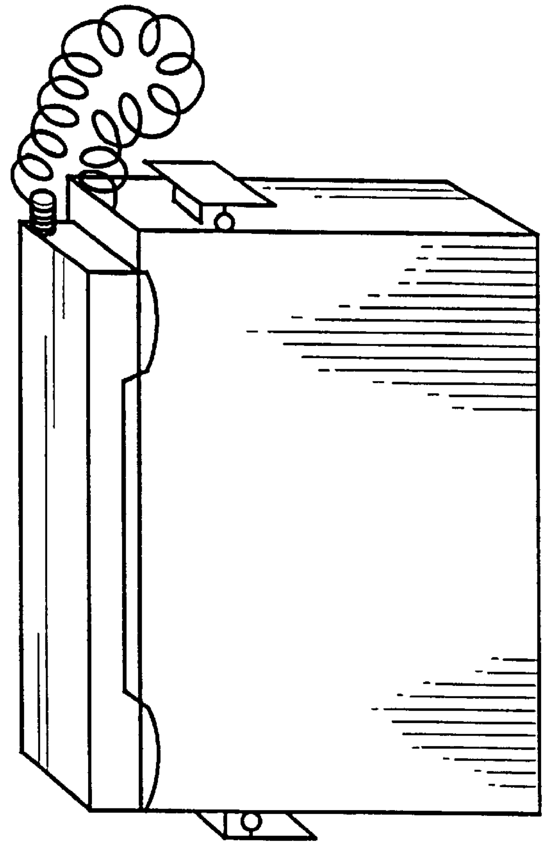
FIG. 65 shows a typical diversity-branch type portable radio equipment.

In conventionally diversity-branch portable radio equipment, the two small antennas are disposed at quite a distance from each other, as shown in FIG. 65. This is because the radiation from the conductive body is relatively large when the small antenna is utilized and thus the correlation factor for the antenna does not come down and because influence by the human body is greater compared to the half-wavelength monopole antenna. In view of the foregoing problem, there can be considered that the radiation pattern can be changed so as to realize the diversity function by means of interaction between the two antennas caused by locating the monopole antenna closer to the other antenna. However, in this case, an impedance thereof is changed due to the interaction between the antennas, so that a matching circuit will be required to solve such an extra problem, thus being an unrealistic solution.

In an antenna-switching diversity in the conventional portable radio equipment, a plurality of antennas are provided in the close proximity, so that mutual impedance must be taken into consideration since interaction between the antennas is not negligible. Therefore, though there has been a suggestion that a matching circuit shall be mounted at the feed point, it is very difficult to have an identical radiation efficiency among respective antennas so as to obtain a high diversity gain, since various types of antenna are often used to construct the diversity branch so that the influence of the human body against respective different antennas differs by each antenna and a matching loss for the antenna and feeder also differs by each antenna. To make the problem worse, a value of the matching circuit must be changed in terms of a conductor loss of the matching circuit and the influence of the human body.

Figure 66:
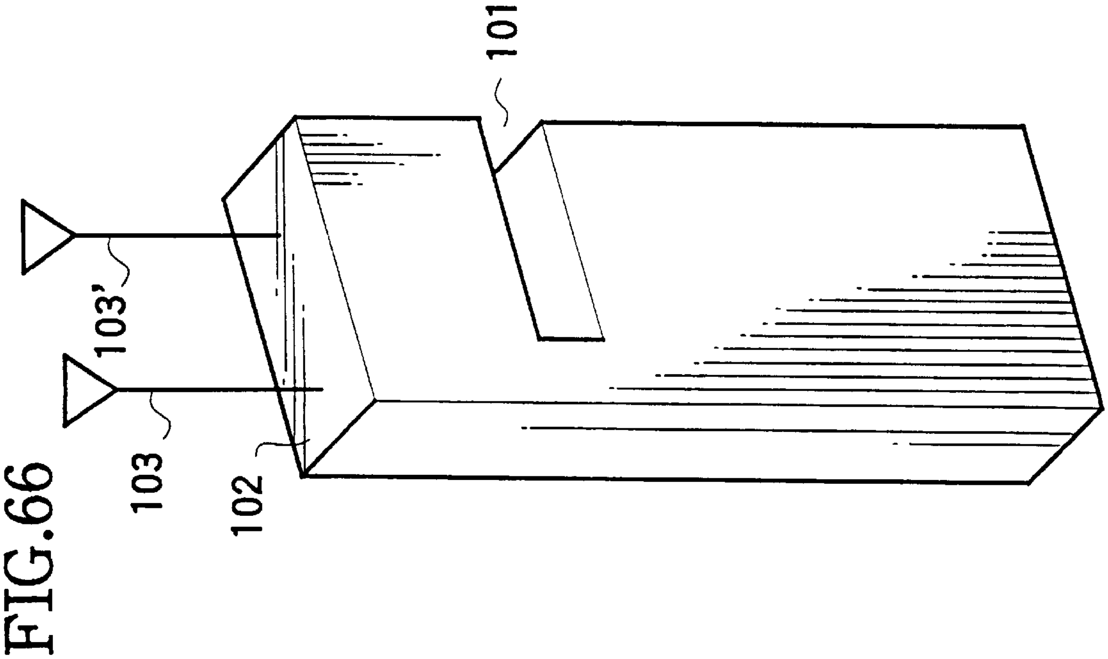
FIG. 66 shows a diversity-branch portable radio equipment according to the tenth embodiment.

In view of the above drawbacks, with reference to FIG. 66, there is provided a portable radio equipment having the notch 191 therein with a plurality of antennas.

In FIG. 66, there are provided an antenna 103 and an antenna 103' disposed next to the antenna 103 both of which are mounted on the top surface of the housing 102. By providing the notch 101 on the side of the body 102 close to the antenna 103, the radio-frequency current flowing from the notch to the bottom on this side is reduced. As a result, an electromagnetic radiation from the conducting body decreases. In other side of the body 102 in the vicinity of the antenna 103, by not providing the notch on this side there is distributed a radio-frequency current from the top of the conducting body to the bottom, and the radiation of the antenna is affected by the current, thus the radiation thereof being significantly present indicating that the effect of providing the notch is rarely present. Knowing accordingly, a proper use can be realized between a diversity of the antennas and a plurality of antennas, so that the radiation pattern can be freely changed.

Figure 67B:
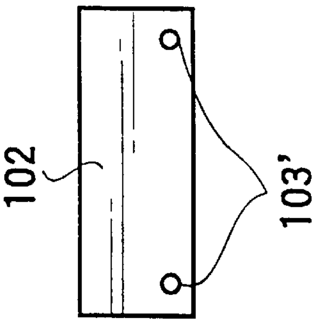
FIG. 67B shows a top view of the equipment shown in FIG. 67A.
Figure 67A:
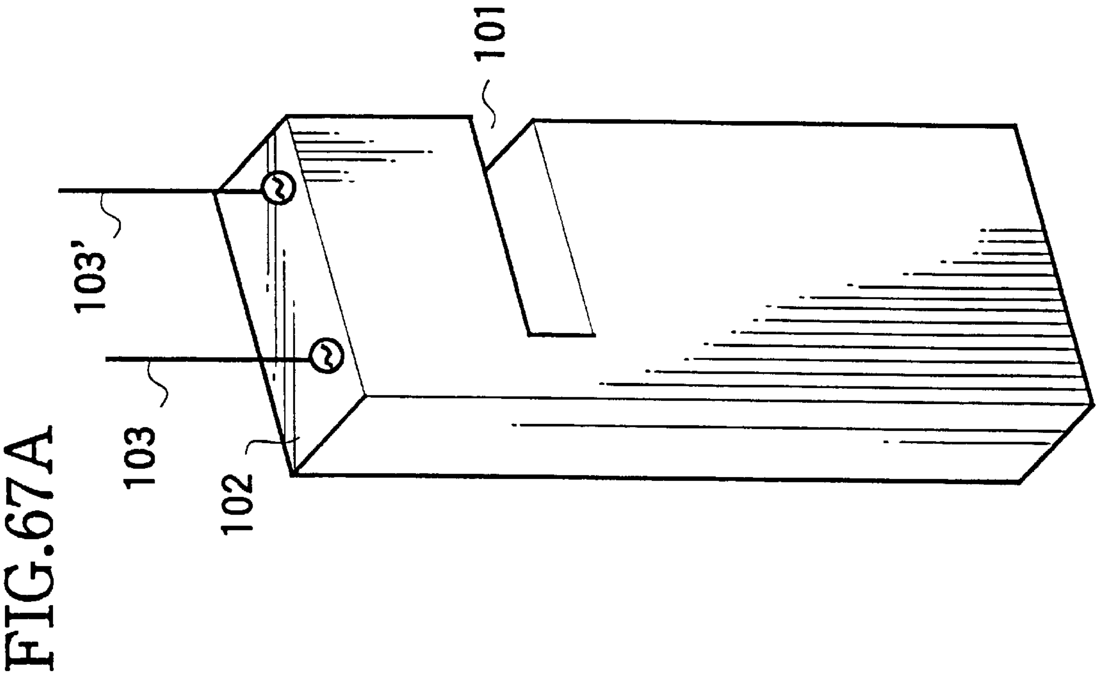
FIG. 67A shows a diversity-branch portable radio equipment where the antennas 103 and 103' are monopole antennas of quarter wavelength.

FIG. 67A shows a diversity-branch portable radio equipment where the antennas 103 and 103' are monopole antenna of quarter wavelength. The reason for selecting such length is because the current flowing through the conductive body mounting the antennas with such length is relatively large and the provision of the notch plays an important role. Accordingly, since the correlation factor of the antenna is small and the maximum actual gains thereof are substantially equal, the diversity antenna branch can be constructed having an increased diversity gain. The each antenna may be arranged in a position so that the interaction between the antennas remains weak. The antennas 103 and 103' may be mounted in a different side of the conductive body from one where the transmitting or receiving pieces are mounted, so that the influence caused by subjecting the equipment to the head of the human body can be minimized. Moreover, the diversity method may be applied such that the equipment becomes a diversity after detecting the electric wave, thus improving practicality of this tenth embodiment. Moreover, in the similar manner, the circuit required for a radio portion can be merely one circuit, thus realizing in further compactness of the equipment.

Figure 68A:
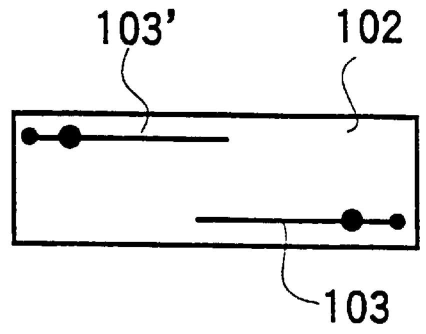
FIG. 68A shows a top view of the equipment shown in FIG. 68B.
Figure 68B:
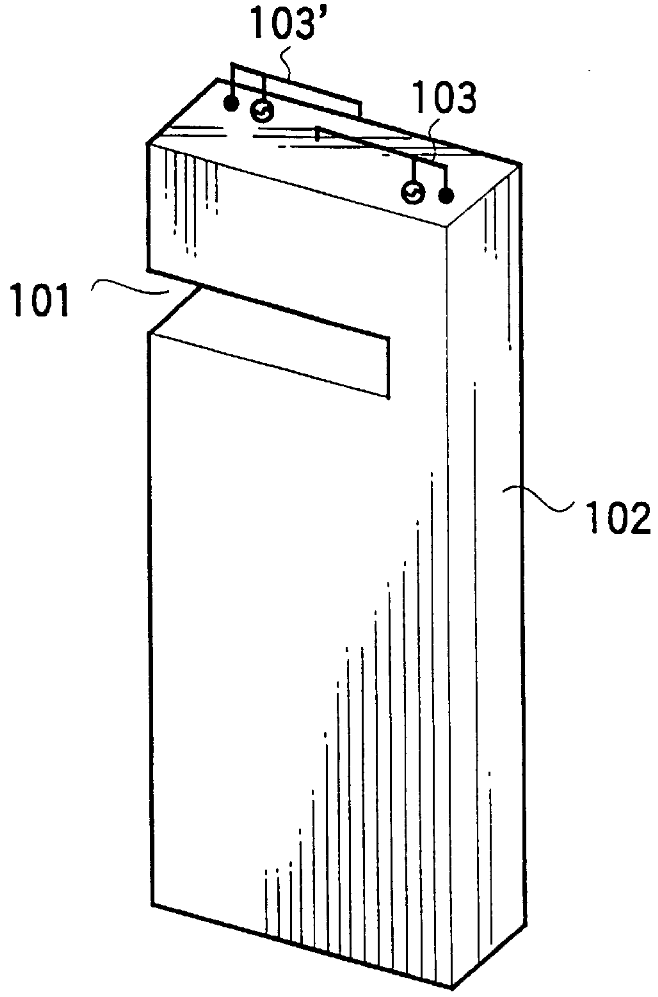
FIG. 68B shows a variation, based on the embodiment shown FIG. 67, characterized in that there are utilized the inverted F antenna in place of the quarter-wavelength monopole antenna.

FIG. 68 shows a variation, based on the embodiment shown FIG. 67, characterized in that there are utilized the inverted F antenna in place of the quarter-wavelength monopole antenna. Since the current flowing through the conductive body is considered to be large, the notch plays an important role. Moreover, the tips of the antennas 103 and 103' may be bent so as to economize a space required for the antennas and to reduce interaction therebetween by avoiding being too close to each other. This embodiment is suitable for realizing the built-in antennas since height of the antennas is made comparatively short.

Figure 69A:
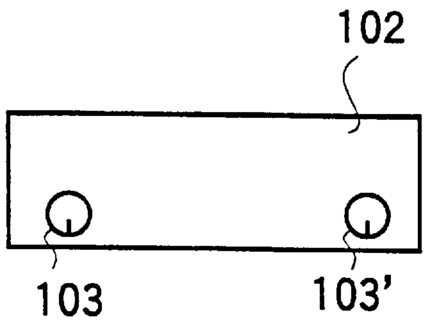
FIG. 69A shows another variation, based on the embodiment shown in FIG. 67, characterized in that there are utilized normal-mode helical antennas.
Figure 69B:
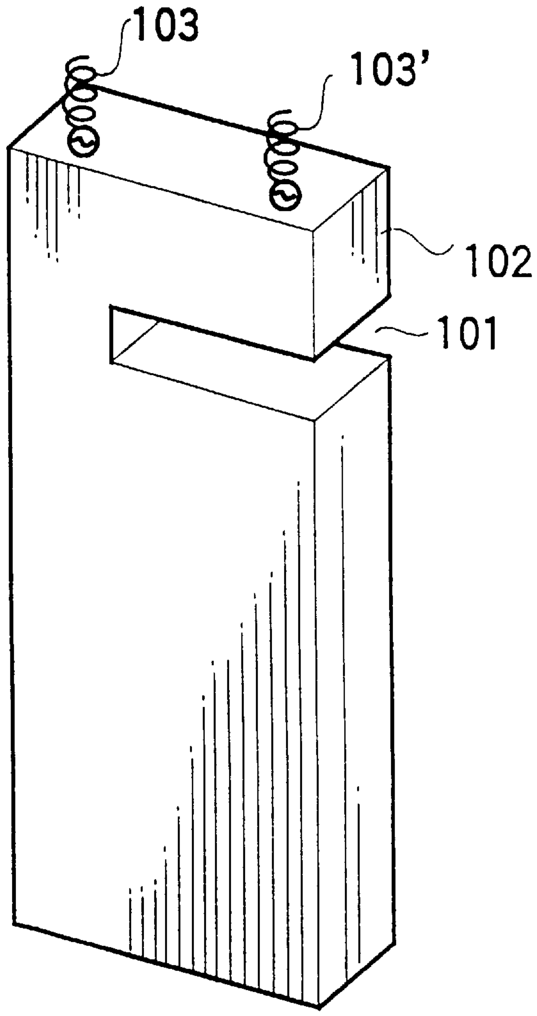
FIG. 69B shows a top view of the equipment shown in FIG. 69A.

FIG. 69 shows another variation, based on the embodiment shown in FIG. 67, characterized in that there are utilized normal-mode helical antennas. In the portable radio equipment according to the embodiment shown in FIG. 69, the antennas can be made compact-sized and can be placed away from the human body.

Figure 70:
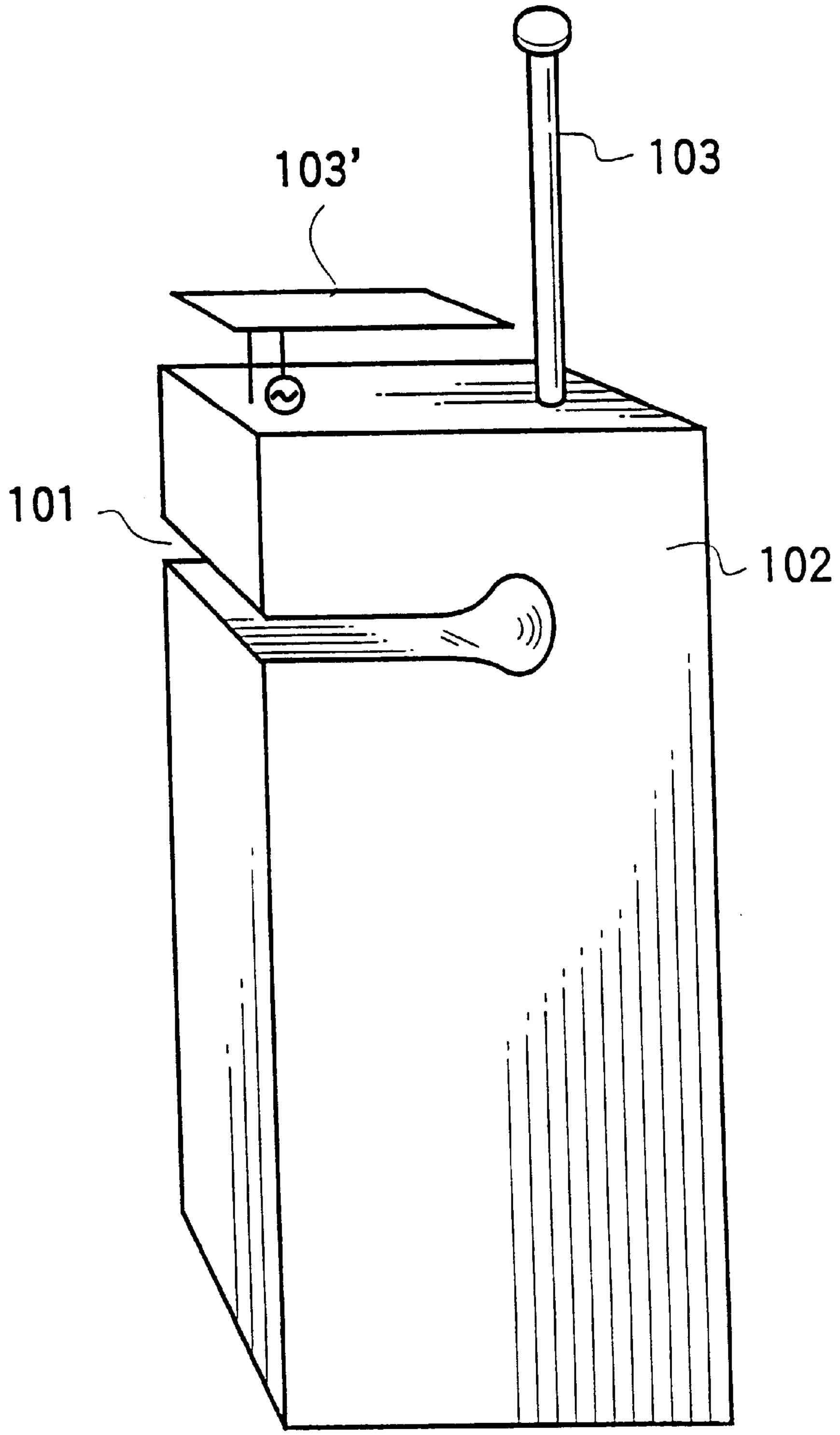
FIG. 70 shows a portable radio equipment having retractable monopole antennas 103 and 103'.

FIG. 70 shows a portable radio equipment having retractable half-wavelength antenna 103 and and inverted F antenna. A half-wavelength monopole antenna on the conducting body radiates a close field of the half-wavelength dipole antenna, since the current flowing on the conducting body is less than than that of a quarter-wavelength monopole antenna. However, the radiation from the inverted-F antenna is affected by the current on the conducting body as in the case of the quarter-wavelength monopole antenna. Therefore, the gain of the inverted-F antenna is weaker than that of the half-wavelength monopole antenna in the absence of a notch on the conducting body. By providing the notch on the conducting body at a side near the inverted-F antenna, a undesirable current on the conducting body is reduced and the difference of the gains between two types of antennas are minimized. The equipment represented by FIG. 70 is used for a telephonic communication since there is caused less influence from the head of the human body as compared to the built-in type antennas. The antenna 103' is the inverted F antenna which is suitable and utilized for a waiting state. It shall be appreciated that there may be provided an electrical switch for automatically switching the feed circuit from the antenna 103 to the inverted F antenna 103' when the antenna 103 is pushed down to be contracted.

The antenna to be used for the above all embodiments may be the monopole type antenna, the inverted F antenna, the normal-mode helical antenna or other antennas used widely for the portable radio equipment. The present invention can also be applied to other radio equipment including a housing serving as electromagnetic shield, an antenna attached to the housing and transmit-receive circuits therein such as radio-type card, radio-type personal computer, radio LAN, various compact radio base station.

As described above, by employing the present invention, the influence of the radio-frequency currents flowing through the shield means can be minimized, thus improving significantly the radiation pattern of the portable radio equipment Besides those already mentioned above, many modifications and variations of the above embodiments may be made without departing from the novel and advantageous features of the present invention. Accordingly, all such modifications and variations are intended to be included within the scope of the appended claims.

What is claimed is:

1. A portable radio device, comprising:

a housing, electrically divided along a horizontal plane into an upper portion and a lower portion in order to lessen influence of the housing exerted upon electromagnetic waves surrounding the housing;

an antenna for transmitting and receiving an electromagnetic wave, the antenna being connected to the upper portion of the housing and extending in a vertical direction; and conductor wires provided between the upper portion and the lower portion of the housing for electrically coupling the upper and lower portions, wherein the upper portion and the lower portion of the housing are spatially separated from each other by a horizontal gap, and wherein the upper portion is approximately a quarter wavelength long in the vertical direction, and the conductor wires are disposed at a distance of approximately a quarter wavelength from a side edge of the lower portion.

2. The portable radio device according to claim 1, further comprising:

an electric element located between the upper portion and the lower portion of the housing for exchanging signals between systems inside of the upper portion and the lower portion of the housing.

3. The portable radio device according to claim 2, wherein:

the electric element is considered to be electrically opened when a radio frequency of the electromagnetic waves become high.

4. The portable radio device according to claim 3, wherein:

the electric element is a coil.

5. The portable radio device according to claim 3, wherein:

the electric element is a ferrite ring.

* * * * *